United States Patent
Baek

(10) Patent No.: US 9,854,323 B2
(45) Date of Patent: *Dec. 26, 2017

(54) DEVICE AND CONTROL METHOD FOR THE DEVICE

(71) Applicant: LG Electronics Inc., Seoul (KR)

(72) Inventor: Sanghyun Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/227,733

(22) Filed: Aug. 3, 2016

(65) Prior Publication Data

US 2016/0345071 A1 Nov. 24, 2016

Related U.S. Application Data

(63) Continuation of application No. 14/561,326, filed on Dec. 5, 2014.

(30) Foreign Application Priority Data

Aug. 11, 2014 (KR) .................. 10-2014-0103884

(51) Int. Cl.
*H04N 7/00* (2011.01)
*H04N 11/00* (2006.01)
(Continued)

(52) U.S. Cl.
CPC ......... *H04N 21/4884* (2013.01); *G06F 3/017* (2013.01); *G06F 3/0346* (2013.01); *G06F 3/048* (2013.01); *G06T 3/40* (2013.01); *H04N 5/4403* (2013.01); *H04N 5/445* (2013.01); *H04N 5/44508* (2013.01); *H04N 21/42222* (2013.01); *H04N 21/4312* (2013.01); *H04N 21/4858* (2013.01); *H04N 21/6125* (2013.01);
(Continued)

(58) Field of Classification Search
USPC ....... 348/468, 473, 445, 441, 554, 555, 556, 348/558, 563, 564, 569, 570, 580, 581, 348/582, 584, 588, 607, 697; 715/800; 725/34
See application file for complete search history.

(56) References Cited

U.S. PATENT DOCUMENTS 5,353,065 A 10/1994 Katsumata et al.
5,467,142 A * 11/1995 Ichinokawa ........... H04N 5/445
348/468
(Continued)

FOREIGN PATENT DOCUMENTS

EP 2 750 377 A1 7/2014
WO WO 00/46988 A1 8/2000
(Continued)

*Primary Examiner* — Jefferey F Harold
*Assistant Examiner* — Mustafizur Rahman
(74) *Attorney, Agent, or Firm* — Birch, Stewart, Kolasch & Birch, LLP

(57) ABSTRACT

An electronic device, including a display; and a controller capable of displaying, via the display, an image being reproduced, a letterbox and subtitles positioned at the letterbox; receiving a control signal for enlarging a display size of the image; controlling the display to enlarge the image in response to the control signal, further the subtitles is positioned at the enlarged image.

10 Claims, 47 Drawing Sheets

(a)

(b)

(51) Int. Cl.

| | | |
|---|---|---|
| *H04N 21/488* | (2011.01) | |
| *G06T 3/40* | (2006.01) | |
| *H04N 5/445* | (2011.01) | |
| *H04N 5/44* | (2011.01) | |
| *G06F 3/01* | (2006.01) | |
| *H04N 21/485* | (2011.01) | |
| *G06F 3/048* | (2013.01) | |
| *G06F 3/0346* | (2013.01) | |
| *H04N 21/431* | (2011.01) | |
| *H04N 21/61* | (2011.01) | |
| *H04N 7/01* | (2006.01) | |
| *H04N 21/422* | (2011.01) | |
| *H04N 21/4402* | (2011.01) | |

(52) U.S. Cl.
CPC .... *G06F 2203/04806* (2013.01); *H04N 7/007* (2013.01); *H04N 7/0122* (2013.01); *H04N 21/4221* (2013.01); *H04N 21/440272* (2013.01); *H04N 2005/4412* (2013.01); *H04N 2005/4428* (2013.01)

(56) References Cited

U.S. PATENT DOCUMENTS

| | | | |
|---|---|---|---|
| 5,546,131 A * | 8/1996 | Terry | H04N 21/4884 348/468 |
| 5,673,086 A | 9/1997 | Fukuoka et al. | |
| 5,737,123 A | 4/1998 | Donohoe | |
| 6,256,045 B1 * | 7/2001 | Bae | H04N 19/40 348/445 |
| 6,486,900 B1 * | 11/2002 | Shen | H04N 7/0122 345/618 |
| 6,535,688 B1 | 3/2003 | Kawamura et al. | |
| 6,678,009 B2 | 1/2004 | Kahn | |
| 7,057,640 B2 | 6/2006 | Bellwood et al. | |
| 7,099,570 B2 | 8/2006 | Itani | |
| 7,224,401 B2 | 5/2007 | Ackley et al. | |
| 7,619,619 B2 * | 11/2009 | Iwaki | G06F 3/14 345/204 |
| 7,756,360 B2 * | 7/2010 | Ishii | H04N 5/772 348/231.99 |
| 7,911,536 B2 | 3/2011 | Dunton | |
| 8,459,805 B2 * | 6/2013 | Nakagawa | G09G 3/002 345/204 |
| 2002/0009295 A1 * | 1/2002 | Itani | H04N 7/012 386/233 |
| 2002/0019989 A1 | 2/2002 | Enomoto | |
| 2002/0118299 A1 * | 8/2002 | Kahn | H04N 5/21 348/569 |
| 2003/0189669 A1 | 10/2003 | Bowser | |
| 2004/0223745 A1 * | 11/2004 | Sawabe | G11B 20/1262 386/246 |
| 2005/0001931 A1 | 1/2005 | Kahn | |
| 2005/0041146 A1 * | 2/2005 | Lee | H04N 5/44513 348/468 |
| 2005/0179817 A1 | 8/2005 | Kida | |
| 2006/0061687 A1 * | 3/2006 | Dunton | H04N 5/44513 348/564 |
| 2006/0146190 A1 | 7/2006 | Ahn et al. | |
| 2006/0184966 A1 | 8/2006 | Hunleth et al. | |
| 2007/0147770 A1 * | 6/2007 | Kawachi | G11B 27/11 386/291 |
| 2008/0052742 A1 * | 2/2008 | Kopf | H04N 5/44591 725/34 |
| 2008/0084503 A1 * | 4/2008 | Kondo | G09G 5/005 348/556 |
| 2009/0027552 A1 * | 1/2009 | Yang | G11B 27/034 348/465 |
| 2010/0253862 A1 * | 10/2010 | Takahashi | G03B 21/00 348/745 |
| 2010/0299627 A1 * | 11/2010 | Kenagy | G06T 3/40 715/800 |
| 2011/0285764 A1 * | 11/2011 | Kimura | G09G 3/3426 345/697 |
| 2011/0304536 A1 * | 12/2011 | Chen | G06F 1/3203 345/157 |
| 2012/0075417 A1 * | 3/2012 | Chang | H04N 13/0059 348/43 |
| 2012/0075526 A1 * | 3/2012 | DeHaan | H04N 5/445 348/445 |
| 2012/0092622 A1 * | 4/2012 | Hirayama | A61B 3/08 351/240 |
| 2013/0169627 A1 * | 7/2013 | Jeon | G06T 17/00 345/419 |
| 2015/0356058 A1 * | 12/2015 | Jwa | G06F 17/212 715/252 |

FOREIGN PATENT DOCUMENTS

| | | |
|---|---|---|
| WO | WO 2011/128829 A2 | 8/2000 |
| WO | WO 2008/125897 A2 | 10/2008 |

* cited by examiner (a)

(b)

(a)

(b)

(c)

(a)

(b)

(c)

(a)

(b)

(c)

(a)

(b)

(a)

(b)

(c)

(a)

(b)

(c)

(a)

(b)

(a)

b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

DEVICE AND CONTROL METHOD FOR THE DEVICE

CROSS-REFERENCE TO RELATED APPLICATIONS

This application is a Continuation of copending application Ser. No. 14/561,326, filed on Dec. 5, 2014, which claims priority under 35 U.S.C. §119(a) to Application No. 10-2014-0103884, filed in the Republic of Korea on Aug. 11, 2014, all of which are hereby expressly incorporated by reference into the present application.

BACKGROUND OF THE INVENTION

1. Field of the Invention

The present invention relates to an electronic device and corresponding method for intuitively controlling a letterbox contained in an image.

2. Description of the Related Art

Electronic devices include devices for recording and reproducing a moving image and devices for recording and reproducing audio. The devices for recording and reproducing the moving image include a TV set, a PC, a project, a mobile terminal, and so forth.

The electronic device increasingly has multiple functions. In the recent years, the image display device has been realized in the form of a multimedia player equipped with multiple functions including photographing, shooting of video, and gaming, in addition to basic functions of receiving broadcast and playing audio and video files.

However, with the increase in the complexity of functions, the user interfaces are also more and more complex, which is inconvenient for the user

SUMMARY OF THE INVENTION

Accordingly, one object of the present invention is to address the above-noted and other problems with the related art.

Another object of the present invention is to provide an electronic device and corresponding method for intuitively controlling a letterbox contained in an image.

To achieve these and other advantages and in accordance with the purpose of the present invention, as embodied and broadly described herein, the present invention provides in one aspect an electronic device including a display unit configured to display a letterbox in a letterbox region and an image in an image display region; and a controller configured to display a guide image at a boundary portion between the letterbox region and the image display region, and change display sizes of the letterbox region and the image display region based on a movement of the guide image. In another aspect, the present invention provides a corresponding method of controlling the electronic device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENTS OF THE INVENTION

Figure 1:
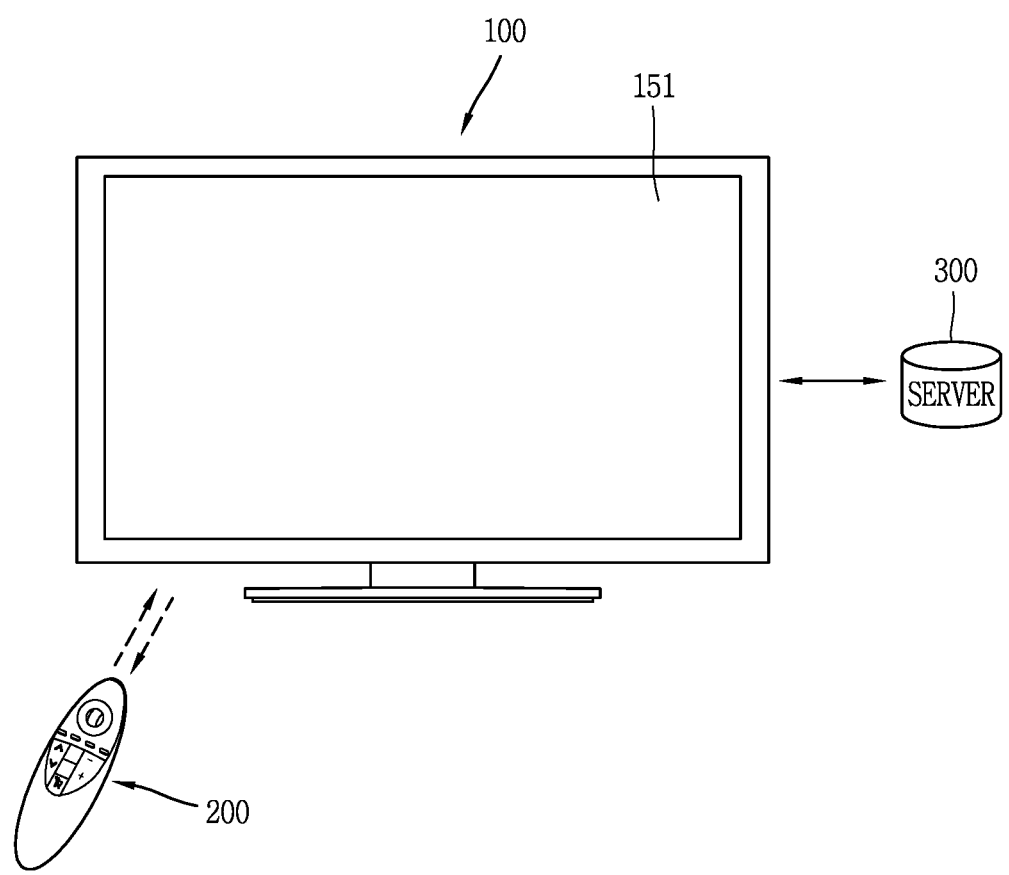
FIG. 1 is a block diagram illustrating an electronic device and a remote control device (or remote control) according to an embodiment of the present invention.

Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function.

In addition, the accompanying drawings are merely illustrated to easily explain the concept of the invention, and therefore, they should not be construed to limit the technological concept disclosed herein by the accompanying drawings, and the concept of the present invention should be construed as being extended to all modifications, equivalents, and substitutes in addition to the accompanying drawings.

Although the terms first, second, etc. may be used herein to describe various elements, these elements should not be limited by these terms. These terms are only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context. Terms "include" or "has" used herein should be understood that they are intended to indicate an existence of several components or several steps, disclosed in the specification, and it may also be understood that part of the components or steps may not be included or additional components or steps may further be included.

FIG. 1 is a diagram schematically illustrating a system including an electronic apparatus 100 according to one embodiment of the present invention, a remote control device 200, a server 300. The electronic apparatuses here include a television set, a smartphone, a laptop computer, a digital-broadcast-dedicated terminal, a personal digital assistant (PDA), a portable multimedia player (PMP), a navigation system, a slate PC, a tablet PC, a high-end subnotebook computer such as a Ultrabook (a registered trademark) subnotebook computer, and a wearable device (for example, a watch-type terminal (smart watch), a glass-type terminal (smart glass), and a head mounted display).

Further, the remote control device 200 and the electronic apparatus 100 transmit and receive a wireless signal according to RF communication standards. A control menu is displayed on a display unit 151 of the electronic apparatus 100 according to a control signal of the remote control device 200. The remote control device 200 includes multiple buttons, and generates an external input signal according to user's operation of the button.

The server 300 is equivalent to a server that is provided in a broadcasting station or a server, a connection to which is established over the Internet. The electronic apparatus 100 receives a broadcast signal from the broadcasting station and outputs the received broadcast signal. In addition, the electronic apparatus 100 includes an apparatus that has access to the Internet using a Transmission Control Protocol/Internal Protocol.

Figure 2:
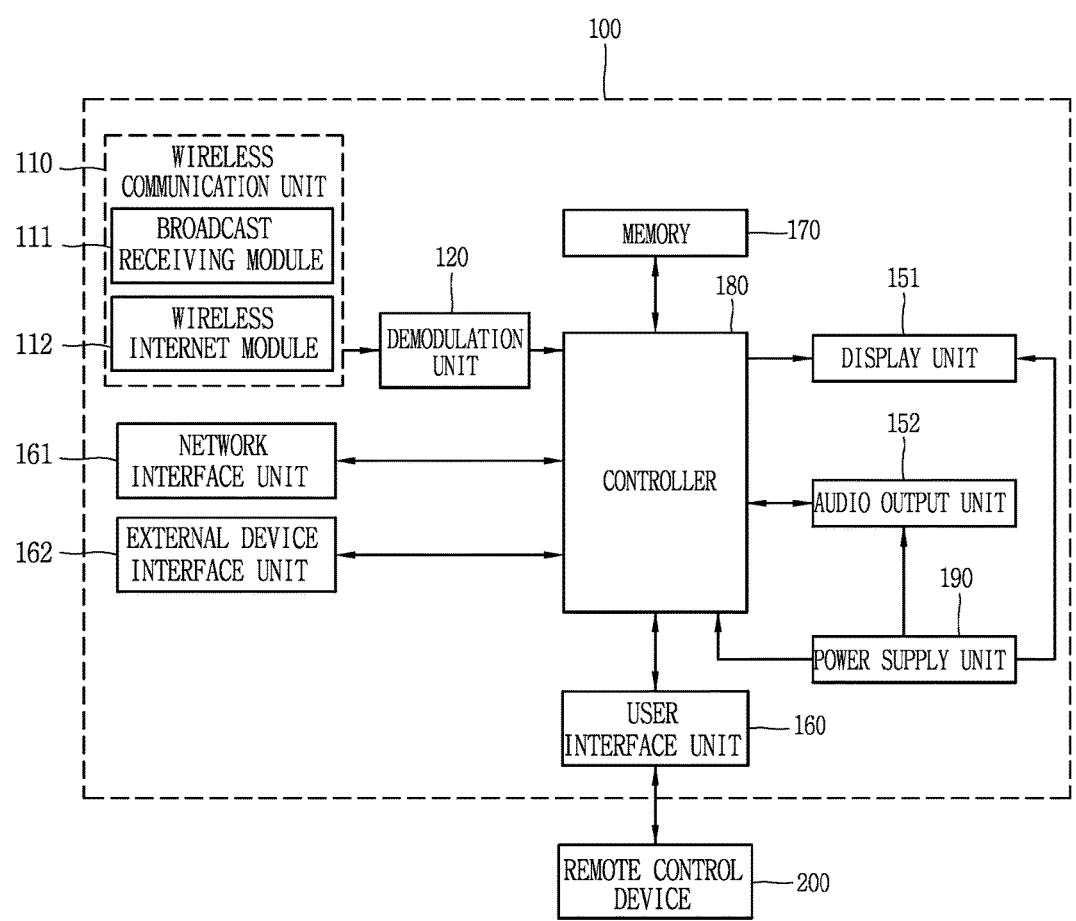
FIG. 2 is a block diagram illustrating the electronic device in FIG. 1 in more detail.

FIG. 2 is a block diagram illustrating in detail constituent elements of the electronic apparatus 100 according to one embodiment of the present invention. Constituent elements of a TV set, as an example of the electronic apparatus, are described below. Further, for an electronic apparatus other than the TV set, some of the constituent elements described below are omitted or some more constituents are included.

As illustrated in FIG. 2, the electronic apparatus 100 according to one embodiment of the present invention includes a wireless communication unit 110, a demodulation unit 120, a network interface 161, an external apparatus interface 162, a memory 170, a controller 180, a display unit 151, an audio output unit 152, a power supply unit 190, a user interface unit 160 and the like. Further, the electronic apparatus 100 is designed so the electronic apparatus 100 performs data communication with the remote control device 200.

A broadcast receiving module 111, for example, is designed as an RF tuner, or as an interface through which to receive broadcast data from an external device such as an STB. The broadcast receiving module 111, for example, receives an RF broadcast signal over a single carrier in accordance with Advanced Television System Committee (ATSC) standards or the RF broadcast signal over multiple carriers in accordance with Digital Video Broadcasting (DVB) standards.

The demodulation unit 120 receives a digital IF signal (DIF) that results from converting in the broadcast receiving module 111 and performs demodulation operation. For example, if the digital IF signal that is output from the broadcast receiving module 111 is of the ATSC type, the demodulation unit 120, for example, performs 8-Vestigial Side Band (8-VSB) demodulation. In addition, the demodulation unit 120 may perform channel decoding.

The external apparatus interface 162 enables the data communication between an external apparatus and the electronic apparatus 100. The external apparatus interface 162 is connected, in a wire or wireless manner, to the external apparatus, such as a digital versatile disk (DVD) player, a Blu-ray disk player, a game apparatus, a camera, a camcorder, or a personal computer (notebook computer) or an STB. The external apparatus interface 162 transfers to the controller 180 an image, audio or data signal input externally through the connected external apparatus. In addition, the image, the voice, or the data signal that is processed in the controller 180 is output to the external apparatus.

The external apparatus interface 162, for example, includes a USB port, a Composite Video Banking Sync (CVBS) port, a composite port, an S-video port (analog), a Digital Visual Interface (DVI) port, a High Definition Multimedia Interface (HDMI) port, a RGB port, a D-SUB port, and the like. The network interface 161 provides an interface for connecting the electronic device 100 to a wire/wireless network, such as the Internet. The network interface 161 includes, for example, an Ethernet port for the connection to the wire network. For the connection to the wireless network, telecommunication standards are used such as Wireless LAN (WLAN) (Wi-Fi), Wireless broadband (Wibro), World Interoperability for Microwave Access (Wimax), and High Speed Downlink Packet Access (HSDPA).

The network interface 161 transmits or receives data to and from a different user or a different electronic apparatus over a connected network, or over a different network linked to the connected network.

A program for signal processing and control within the controller 180, and the image or the audio or data signal that is signal-processed may be stored in the memory. In addition, the image, the audio, or the data signal input from the external apparatus interface 162 or the network interface 161 may be temporarily stored in the memory 170. In addition, various operating systems (OS), middleware, and platforms are stored in the memory 170.

A signal input by the user is transferred to the controller 180 through the user interface unit 160, or a signal is transmitted from the controller 180 to an external device (for example, the remote control device 200) through the user interface unit 160. For example, the user interface unit 160 is designed in accordance with various communication standards such as Radio Frequency (RF) communication standards, and IR communication standards, and thus the user interface unit 160 receives from the remote control device 200 control signals for power on/off, channel selection, screen setting, and the like and processes the control signals, or transmits a control signal from the controller 180 to the remote control device 200.

Through the broadcast receiving module 111, the demodulation unit 120, and the network interface 161 or the external apparatus interface 162, the controller 180 demultiplexer a stream being input or processes demultiplexed signals to generate and output signals for outputting the image and the audio. The controller 180 is described below in detail referring to the accompanying drawings.

An image signal, a data signal, and an OSD signal that are processed in the controller 180 or an image signal and a data signal that are received through the external apparatus interface 162 are converted into signals for driving RGB light sources for display of colors on the display unit 151. A PDP display, an LCD display, and an OLED display are available for the display unit 151. The display unit 151 can be in the form of a flexible display or can realize a 3D display.

A signal, such as a stereo signal, a 3.1 channel signal, or a 5.1 channel signal, that is audio-processed in the controller 180, is input into the audio output unit 152 to be output as the audio. The audio output unit 152 is realized as various types of speakers. Then, the power supply unit 190 supplies electric power to the entire electronic apparatus 100. Particularly, the electric power is supplied to the controller unit 180 that can be realized in the form of a system-on-chip (SOC), the display unit 151 for the display of the image, and the audio output unit 152 for the output of the audio.

Under the control of the controller 180, the network interface 161 has access to a specific server. Furthermore, IR code values received from the specific server are designed to be stored in the memory 170. Further, the IR code values are values used for controlling an electric device, the connection to which is established through the external apparatus interface 162.

Also, at the request of the remote control device 200, the IR code value corresponding to a specific function of a specific electronic device is transmitted to the remote control device 200 through the user interface unit 160. As described above, at this point, a type of communication in accordance with Bluetooth standards is employed.

Figure 3A:
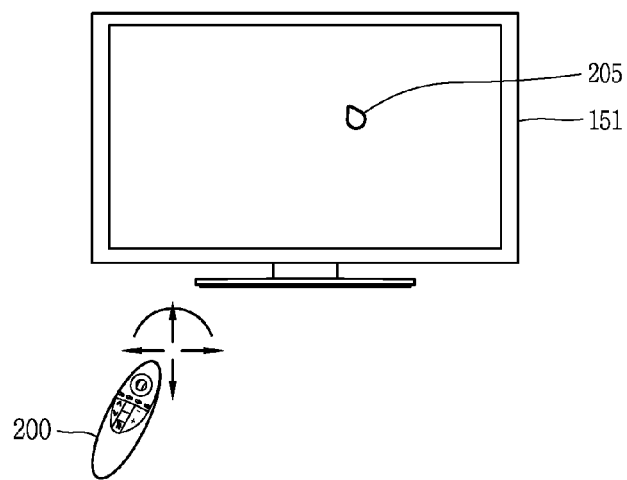
FIGS. 3A, 3B, 3C are conceptual views illustrating an operation between the electronic device and the remote control device.
Figure 3B:
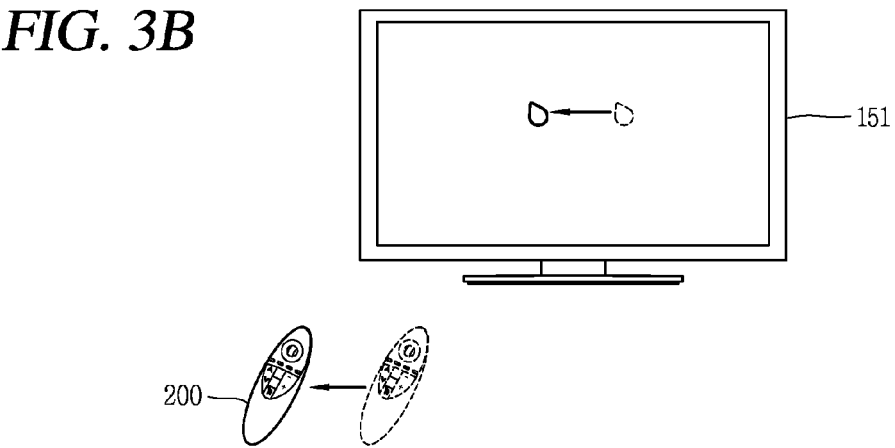
Figure 3C:
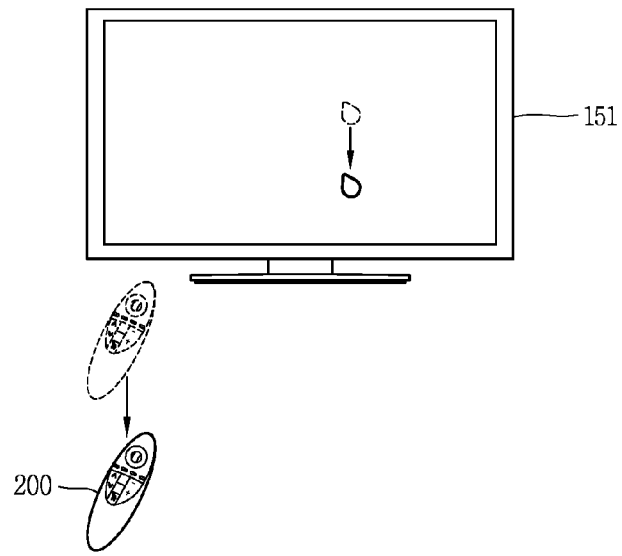

Next, FIGS. 3A-3C are conceptual views illustrating an interaction between the electronic device 100 and the remote control device 200. Here, for the purpose of explanation, a TV receiver is illustrated as an example of the electronic device 100 and a spatial remote control is illustrated as an example of the remote control device 200.

As illustrated in FIG. 3A, a pointer 205 corresponding to the remote control device 200 is displayed on the display unit 151. A user can move or rotate the remote control device 200 in the upward and downward, left and right (FIG. 3B), forward and backward directions (FIG. 3C), etc. The pointer 205 displayed on the display unit 151 of the electronic device corresponds to the movement of the remote control device 200. The remote control device 200 can also be displayed so the relevant pointer 205 moves along the movement in a 3D space as illustrated in the drawing, and thus may be referred to as a spatial remote control (or pointing device).

FIG. 3B illustrates a user moving the remote control device 200 in the left direction, and the pointer 205 also moving in the left direction in response to the movement. Information on the movement of the remote control device 200 sensed through the sensor of the remote control device 200 is transmitted to the electronic device. The electronic device can calculate the coordinate of the pointer 205 from the information on the movement of the remote control device 200. The electronic device can thus display the pointer 205 to correspond to the calculated coordinate.

FIG. 3C illustrates a user moving the remote control device 200 to be far away from the display unit 151 when a specific button within the remote control device 200 is pressed. Thus, a selected region within the display unit 151 corresponding to the pointer 205 is zoomed in and displayed in an enlarged manner. On the contrary, when the user moves the remote control device 200 to be closer to the display unit 151, a selected region within the display unit 151 corresponding to the pointer 205 is zoomed out and displayed in a reduced manner. Meanwhile, the selected region may be zoomed out when the remote control device 200 is far away from the display unit 151, and the selected region may be zoomed in when the remote control device 200 is closer to the display unit 151.

Further, the recognition of the upward and downward, left and right movement may be excluded when a specific button within the remote control device 200 is pressed. In other words, when the remote control device 200 moves to be far away from or closer to the display unit 151, the upward, downward, left and right movement may not be recognized, but only the forward and backward movement may be recognized. When a specific button within the remote control device 200 is not pressed, only the pointer 205 moves along the upward, downward, left and right movement. Further, the moving speed and direction of the pointer 205 may correspond to the moving speed and direction of the remote control device 200.

Hereinafter, a method of controlling a letterbox region in an electronic device according to an embodiment of the present invention will be described in more detail with reference to the accompanying drawings. In more detail, a letterbox denotes black stripes generated at the top and bottom of the screen, respectively, when an image is reduced to match the aspect ratio.

For example, when an image to be reproduced in the electronic device is an image having an aspect ratio of 16:9, and the aspect ratio of the electronic device is 4:3, the image is not displayed as a whole but displayed in a partially cut manner when the image having an aspect ratio of 16:9 is reproduced with no adjustment of the aspect ratio. Accordingly, the electronic device reduces the aspect ratio of 16:9 to a predetermined ratio to provide a non-truncated image, and at this time, letterboxes may be contained at both sides of the display unit, respectively. The letterbox may be typically formed with a black color, but is not limited to this. Meanwhile, the letterbox has an advantage that an image having a different aspect ratio from that of the electronic device is displayed with no truncation, but has a problem that it bothers the user's eyes due to black stripes formed at both sides of the display unit.

Consequently, one embodiment of the present invention adjusts the size of a region containing the letterbox or removes the letterbox based on the user's request, and a method of reproducing an image with no truncation even when the size of the letterbox region is adjusted or removed.

Figure 4:
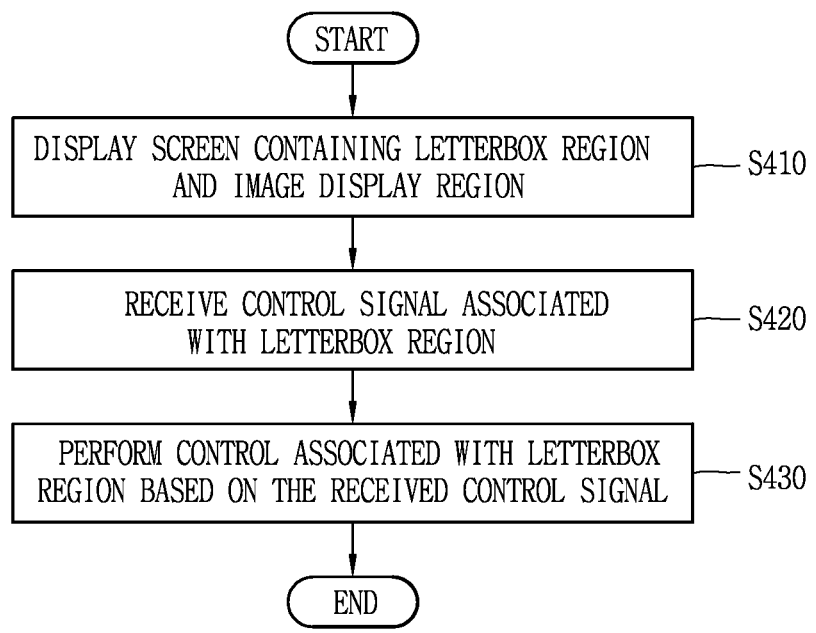
FIG. 4 is a flow chart illustrating a control method of an electronic device according to an embodiment of the present invention.
Figure 5A:
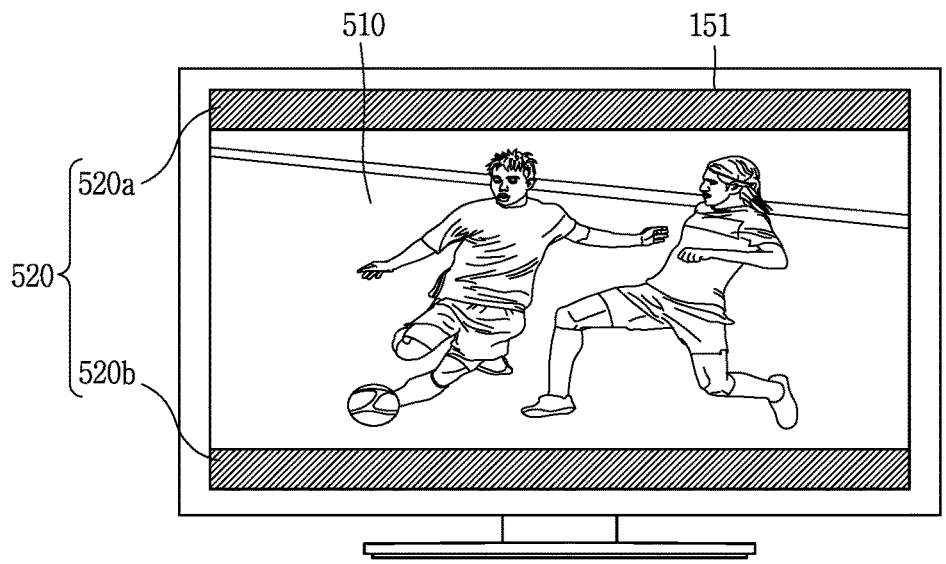
FIGS. 5A and 5B are conceptual views illustrating a control method illustrated in FIG. 4.
Figure 5A:
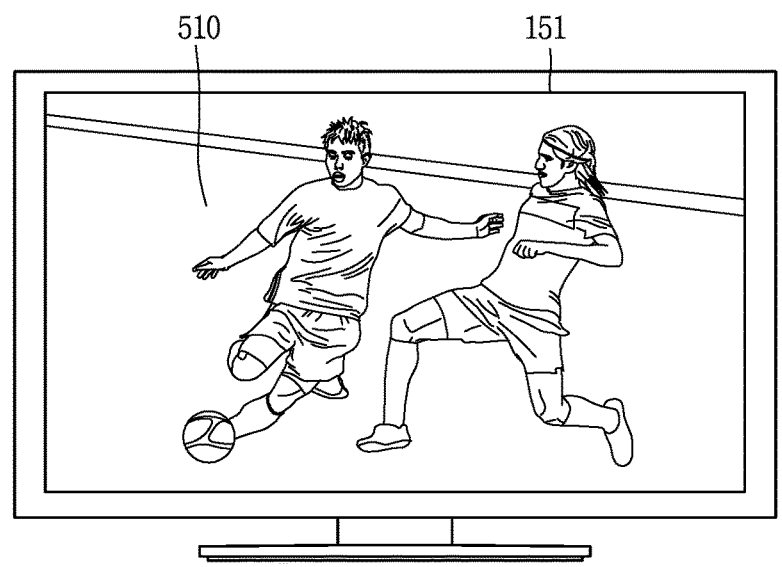
Figure 5B:
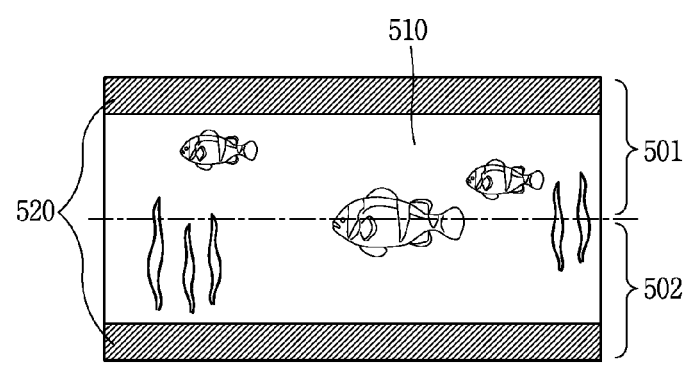
Figure 5B:
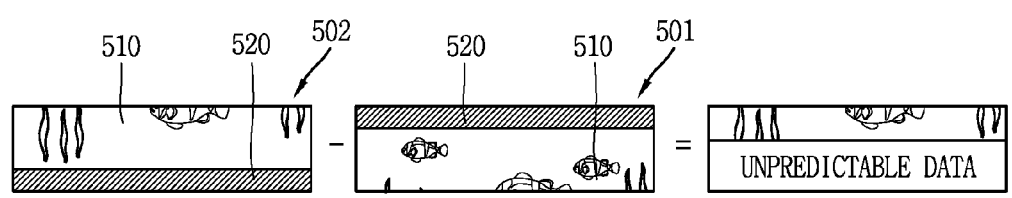
Figure 5B:
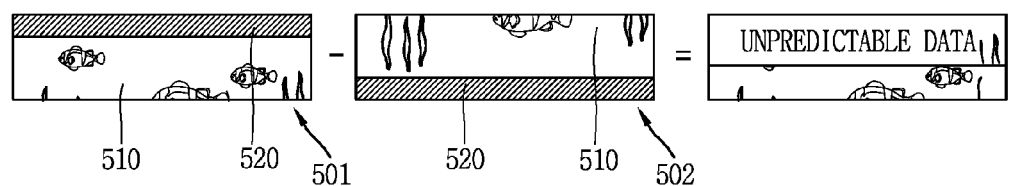

Hereinafter, a representative example associated with the control of the letterbox will be described first. FIG. 4 is a flow chart illustrating a control method of an electronic device according to the present invention, and FIGS. 5A and 5B are conceptual views illustrating a control method illustrated in FIG. 4. First, when an image having a different aspect ratio from that of the display unit included in the electronic device is reproduced, an electronic device according to the present invention performs an operation for enlarging or reducing the image by a predetermined ratio to display the image with no truncation.

As a result of the operation, the process of displaying a screen containing a letterbox region and an image display region is performed (S410). In the present specification, a region displayed with the letterbox is referred to as a "letterbox region," and a region displayed with the image is referred to as an "image display region." The image display region corresponds to a region in which an image desired to be reproduced is reproduced.

Further, the type of image displayed in the electronic device varies, and any type of image may be applicable to an image having a different aspect ratio from that of the electronic device. For example, as illustrated in FIG. 5A(a), when an image having a different aspect ratio from that of the display unit, the display unit 151 displays a letterbox region 520 and an image display region 510.

Here, the letterbox region 520 may include a first letterbox region 520a located at an upper side of the display unit 151 and a second letterbox region 520b located at a lower side of the display unit. As illustrated in the drawing, the letterbox regions 520a, 520b are included at both sides of the display unit 151, but according to circumstances, the letterbox region 520 may include only either one of the upper and lower sides of the display unit 151.

Further, the process of receiving a control signal associated with the letterbox region when the letterbox region 520 and image display region 510 are included therein is performed (S420). The control signal may include information associated with a size change of the letterbox region 520 and image display region 510. The control signal may be received from the remote control device (or remote control 200, refer to FIGS. 1-3). Furthermore, the control signal may be received through a sensing unit provided in the electronic device. Various information are contained in the control signal and its receiving methods, and will be described later.

Further, as illustrated in the step S420, when a control signal associated with the letterbox region is received, the process of executing control associated with the letterbox region is performed (S430). The controller 180 can remove the letterbox region 520 and enlarge the image display region 510 as illustrated in FIGS. 5A(a) and 5A(b) in response to the control signal.

As illustrated in the drawing, when the letterbox region 520 is removed in response to the control signal, the user can receive a full image on the display unit 151 as illustrated in FIG. 5A(b). Accordingly, a user who doesn't want to view the image with the letterbox region can remove the letterbox region, thereby viewing the image in a more concentrated manner.

Further, an image displayed in the image display region 510 may be displayed in an enlarged manner based on only a direction in which the image display region 510 is enlarged. For example, as illustrated in FIG. 5A, when the letterbox regions 520 contained at both sides of the display unit 151, respectively, are removed, the image display region 510 is enlarged in a length direction (or vertical direction) of the display unit 151. Here, the controller 180 can adjust the aspect ratio only in a vertical direction to display an image contained in the image display region 510.

Since the image displayed in the image display region 510 prior to removing the letterbox region 520 is an image for which the aspect ratio is adjusted to display the image on the display unit with no truncation, a display ratio of the image can be adjusted only in a direction in which the image display region 510 is enlarged to provide the image on the display unit 151.

Further, the controller 180 can detect a position of the letterbox region 520 on the display unit 151, and remove the letterbox region 520 corresponding to the detected position, Various methods of detecting the letterbox region are possible.

According to one example of detecting the letterbox region, as illustrated in FIG. 5B(a), the controller 180 can divide an image into a first image 501 and a second image 502. Then, as illustrated in FIGS. 5B(b) and 5B(c), data of the first image 501 and second image 502 are computed in a crossover manner. Since data values corresponding to the letterbox region 520 correspond to "0," the computational result of a portion corresponding to the letterbox region and a portion of the image may have a unique data value of the image or a negative of the unique data value of the image.

Thus, when a unique data value of the image is detected or a negative of the unique data value of the image is detected, the controller 180 can detect that the relevant portion contains a letterbox region. Meanwhile, a computational result between regions that do not contain the letterbox within the divided images can be derived as a computational result of unpredictable data values, and thus the controller 180 can determine a portion having unpredictable values as an image display region.

Thus, the controller 180 can detect a letterbox region through a preset scheme, and perform control over the letterbox region based on a control signal associated with the letterbox region. Meanwhile, a method of controlling the letterbox region according to the present invention is not limited to the foregoing method of detecting the letterbox region, and various schemes can be applicable thereto.

Hereinafter, a specific method of controlling the letterbox region and image display region will be described. A method of controlling the letterbox region may include an automatic mode and a manual mode. The automatic mode controls a letterbox region in a preset manner when a control signal associated with the letterbox region is received.

For example, when a control signal for the letterbox region is received in an automatic mode, the controller 180 can control all the letterbox regions to disappear. In this instance, only an image display region exists on the display unit 151 to provide a full image on the display unit 151. On the contrary, in the automatic mode, when a control signal for the letterbox region is received, the controller 180 can reduce or enlarge the letterbox region to a preset size.

Moreover, in a manual mode, the size of the letterbox region and image display region can be adjusted according to a user's preference. In other words, in the manual mode, a guide image for controlling the letterbox region according to the user's preference can be provided, and the user can view an optimized letterbox region and image display region using the guide image.

Further, the automatic mode or manual mode can be determined based on the user's selection, and the selected information can be contained in a control signal for the control of the letterbox region. In other words, the user can select whether to control the letterbox in an automatic mode or manual mode.

In addition, the selected information on the automatic mode or manual mode can be stored in the electronic device. The selection of such a mode can be performed on an interface screen for setting an environment associated with the entire operation of the electronic device. Hereinafter, the automatic mode and manual mode will be described. First, a method of controlling a letterbox region in an automatic mode will be described with reference to the accompanying drawings.

FIGS. 6A-7C are conceptual views illustrating a control method associated with a letterbox region in an automatic mode. When the letterbox region is controlled in an automatic mode, the controller 180 can control the display unit 151 not to display the letterbox regions in response to a control signal associated with the letterbox region being received.

The control signal associated with the letterbox region in an automatic mode can be received from the remote control device (or remote control 200), or sensed by the sensing unit. First, a method of controlling the letterbox region by the control signal received from the remote control device will be described.

In the automatic mode, the controller 180 receives a control signal or user request associated with the letterbox region. Here, the control signal or user request is received from the remote control (or remote control device 200) illustrated in FIGS. 1 and 3. In other words, the user request or user's selection for control associated with the letterbox region may be performed through a remote control as illustrated in FIGS. 1 and 3.

Figure 6A:
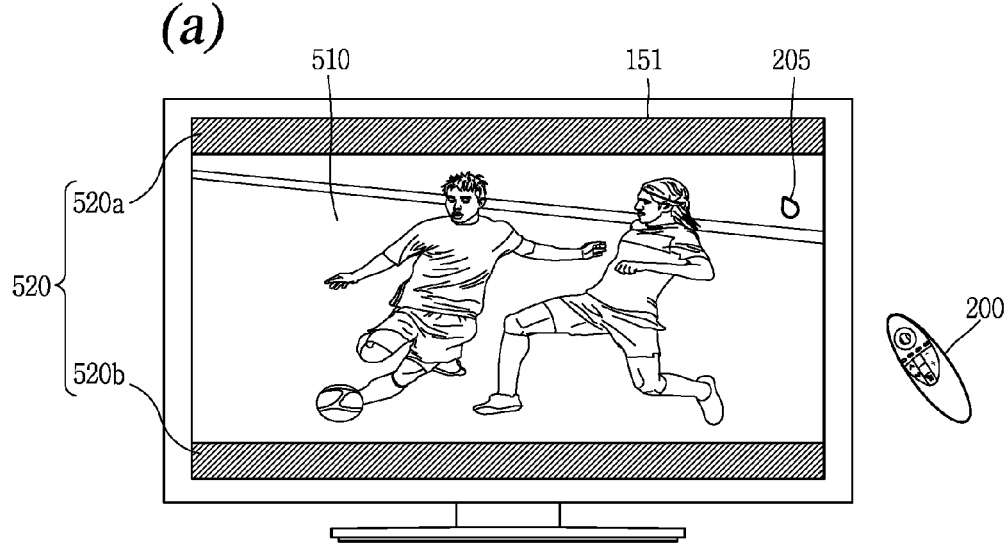
FIGS. 6A-7C are conceptual views illustrating a control method associated with a letterbox region in an automatic mode.
Figure 6A:
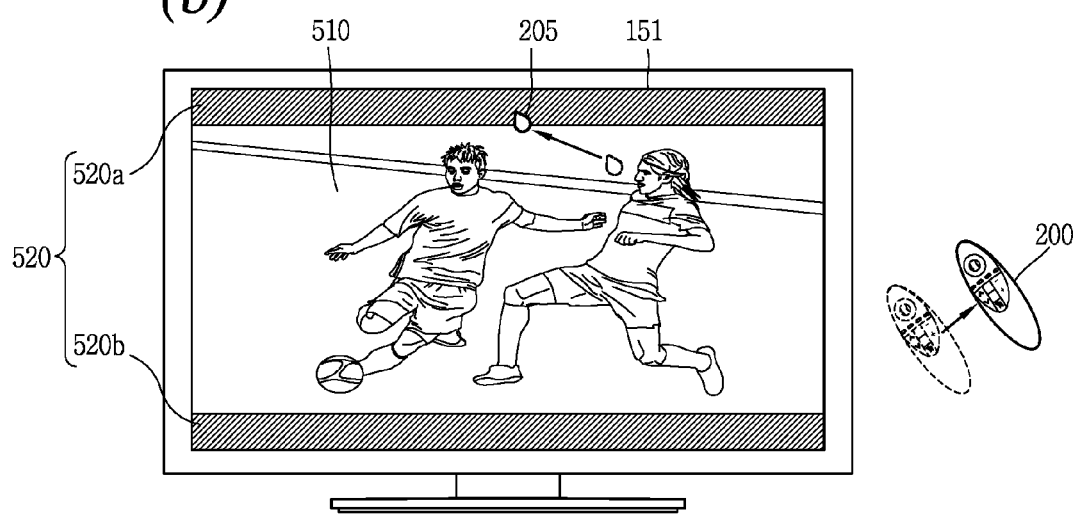
Figure 6A:
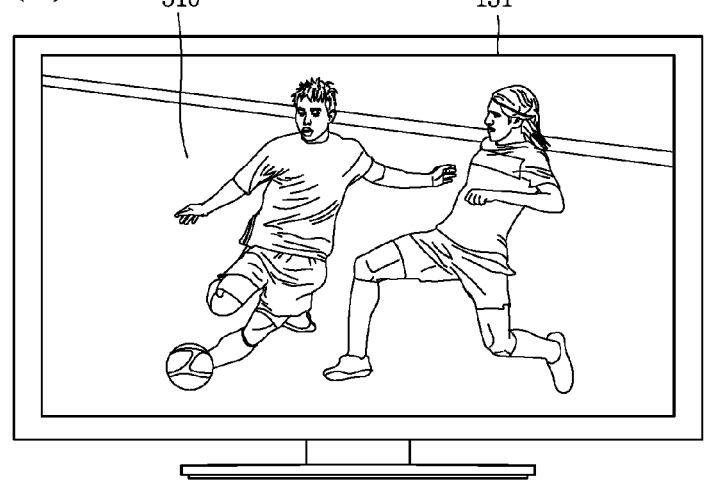

For example, a pointer image 205 can be displayed on the display unit 151 as illustrated in FIG. 6A, and the pointer image 205 moves in response to a control signal received from the remote control 200. Moreover, the controller 180 can perform control associated with a region indicated by the pointer image 205. The pointer image 205 can be displayed by a user's request or displayed when a user's movement (for example, when the remote control 200 moves, when a user's hand holding the remote control is sensed, etc.) desired to use the remote control 200 is sensed.

Further, a control signal for moving the pointer image 205 may be received in response to the movement of the remote control 200. In other words, sensors for sensing the movement of the remote control 200 can be disposed in the remote control 200. The sensor may be at least one of an acceleration sensor, a magnetic sensor, a gravity sensor (G-sensor), a gyroscope sensor and a motion sensor. Accordingly, when the user moves while holding the remote control, the remote control generates a control signal corresponding to the user's movement. Moreover, the controller 180 can control the movement of the pointer image 205 based on the control signal. Thus, it is possible to sense the user's movement in a three-dimensional space using sensors for sensing the movement of the remote control 200, and control the movement of the graphic object in response to this.

In another example, a control signal for moving the pointer image 205 may be generated in response to a user manipulation with respect to a wheel, a touch pad, a direction key button, and the like mounted on the remote control 200. Further, when a mode associated with the control of the letterbox region of the electronic device is an automatic mode, the controller 180 can remove the letterbox region as illustrated in FIG. 6A(c) in response to the pointer image 205 located at a boundary portion between the image display region 510 and letterbox region 520 as illustrated in FIGS. 6A(a) and 6A(b).

Thus, when the letterbox region 520 is removed, an image displayed in the image display region 510 can be displayed in an enlarged manner in proportion to the enlargement of the image display region 510. Further, the controller 180 can remove the letterbox region 520 when there is an additional user's manipulation in addition to the pointer image 205 located at a boundary portion between the image display region 510 and letterbox region 520. For example, when a preset period of time has passed when the pointer image 205 is located at a boundary portion between the image display region 510 and letterbox region 520, the controller 180 can remove the letterbox region 520 as illustrated in FIG. 6A(c).

In another example, when an additional control signal is received from the remote control when the pointer image 205 is located at a boundary portion between the image display region 510 and letterbox region 520, the controller 180 can remove the letterbox region 520 as illustrated in FIG. 6A(c). Here, the additional control signal may be received when a specific button within the remote control 200 is received. In other words, the user can finally determine the removal of the letterbox region by pressing the specific button. Moreover, the additional control signal may be generated based on the motion of the remote control 200. In other words, when a preset motion is applied to the remote control 200 by the user, a control signal corresponding to the preset motion may be transmitted to the electronic device, and as a result, the controller 180 can remove the letterbox region in response to the control signal.

Here, the preset motion includes at least one of a moving pattern, a moving path, a moving direction and a moving speed of the remote control. For example, when the remote control moves in a specific direction at more than a preset speed, a control signal corresponding to the preset motion can be generated.

The present invention is not limited to the method of performing the removal of the letterbox region 520 when the pointer image 205 is located at a boundary portion between the image display region 510 and letterbox region 520. In other words, even when the pointer image 205 is located in the letterbox region 520, the controller 180 can perform control associated with the letterbox region 520 as described above.

Figure 6B:
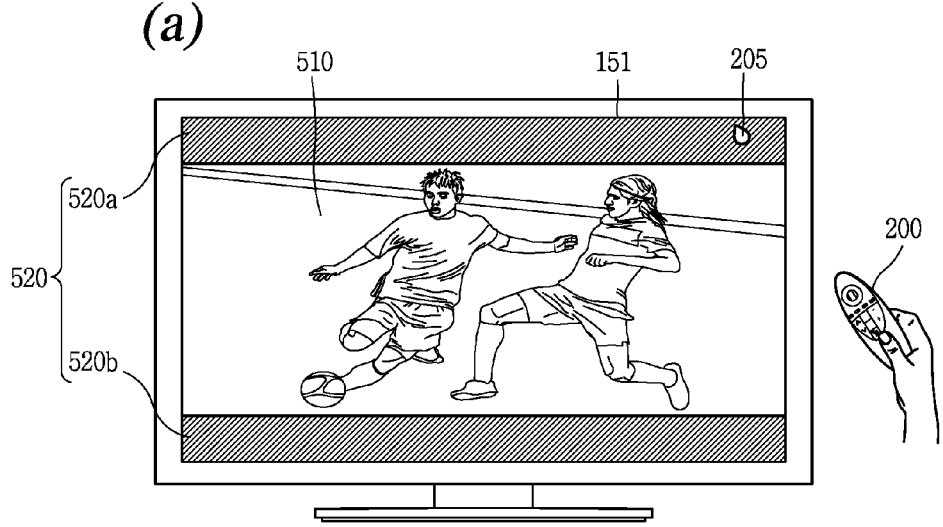
Figure 6B:
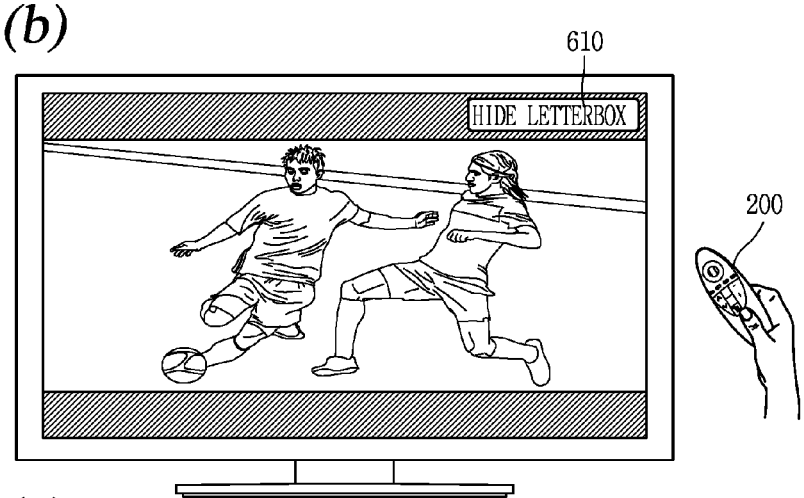
Figure 6B:
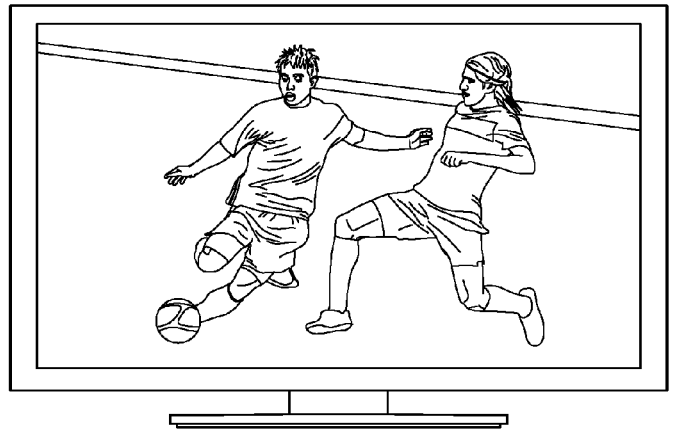

In still another example, when the pointer image 205 is located in a preset region as illustrated in FIG. 6B(a), the controller 180 can display a graphic object 610 for selecting the removal of the letterbox region 520 as illustrated in FIG. 6B(b). When the pointer image 205 is located on the letterbox region 520 as illustrated in FIG. 6B(a), the controller 180 can display the graphic object 610. Furthermore, when the pointer image 205 is located at a boundary portion between the image display region 510 and letterbox region 520, the controller 180 can display the graphic object 610.

Further, when the pointer image 205 is located in the letterbox region 520 or at a boundary portion thereof above a preset period of time, the controller 180 can display the graphic object 610. In addition, when an additional control signal is received from the remote control when the pointer image 205 is located in the letterbox region 520 or at a boundary portion thereof, the controller 180 can display the graphic object 610.

Thus, when the displayed graphic object 610 is selected, the controller 180 can remove the letterbox region 520 as illustrated in FIGS. 6B(b) and 6B(c). Here, the selection of the graphic object 610 can be performed when a specific button within the remote control 200 is selected by the user. In other words, the user can finally determine the removal of the letterbox region by pressing the specific button. When the pointer image 205 is displayed on the graphic object 610 upon receiving a control signal in response to pressing the specific button, the controller 180 can process it as the selection of the graphic object 610.

Figure 6C:
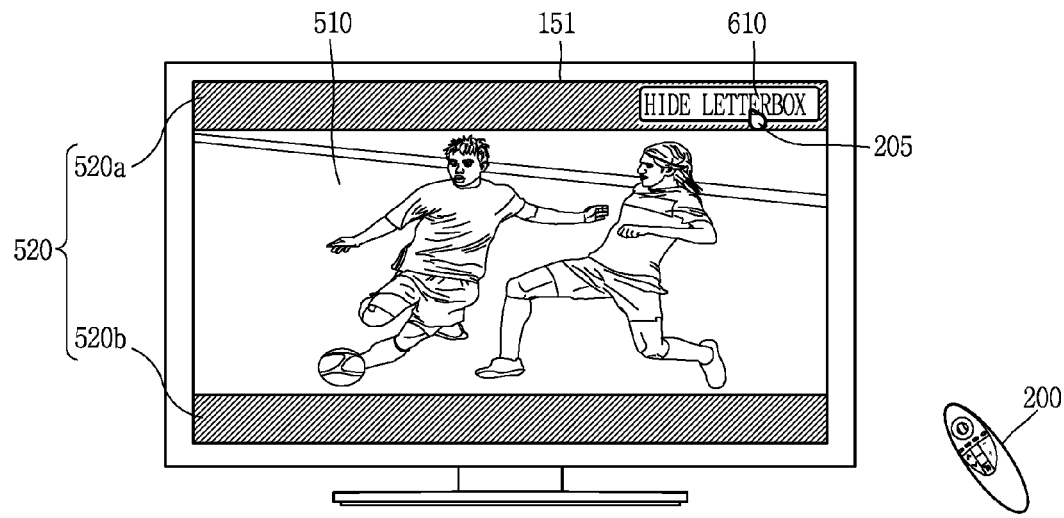
Figure 6C:
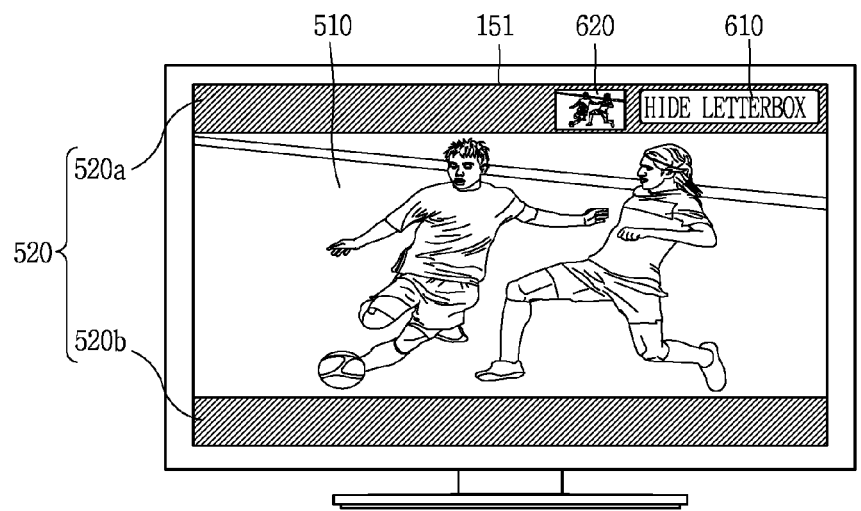

Further, when the letterbox region 520 is removed, the controller 180 can provide preview information on which type of the image is displayed on the display unit 151. For example, when the pointer image 205 is located on the graphic object 610 as illustrated in FIG. 6C(a), the controller 180 can display a preview image 620 at a portion of the display unit 151 as illustrated in FIG. 6C(b). The preview image 620 may include image information for allowing the user to know the extent of enlargement of an image when the letterbox region 520 is removed. Thus, the user can check a display ratio of the image in advance when the letterbox region 520 is removed. When the graphic object 610 for selecting the removal of the letterbox region 520 is selected as illustrated in FIG. 6B(b), the controller 180 can remove the letterbox region 520 as illustrated in FIG. 6B(c).

Figure 6D:
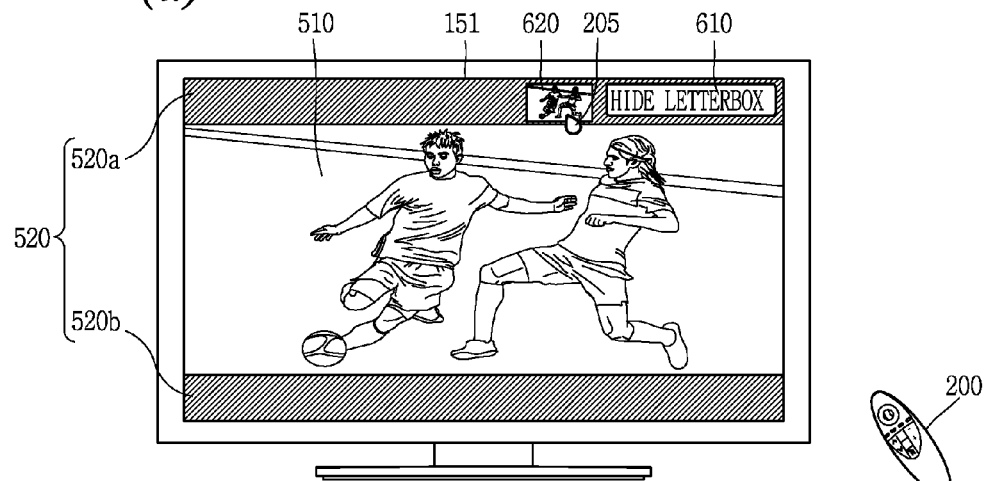
Figure 6D:
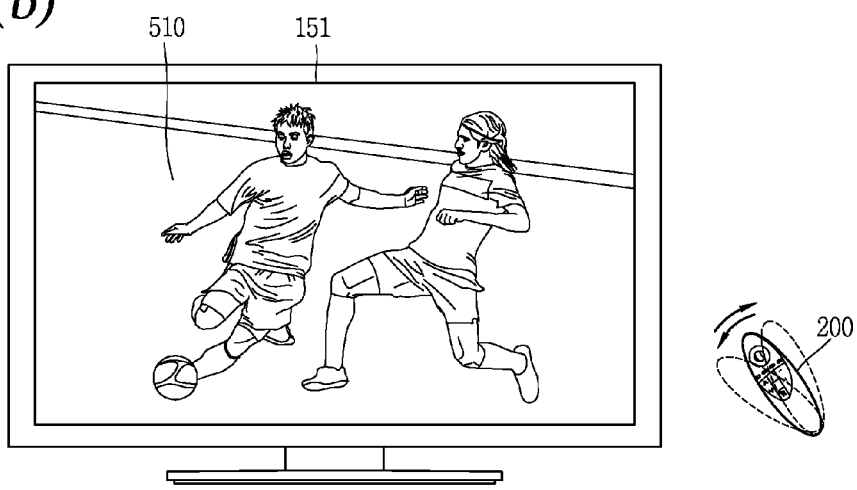
Figure 6D:
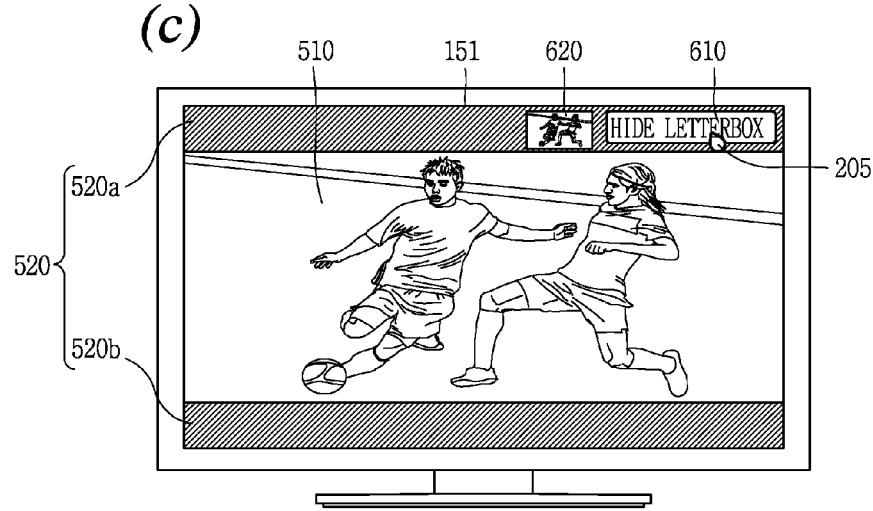

Further, the controller 180 can display preview information on an actual display image from which the letterbox region 520 is removed as illustrated in FIG. 6D(b) in response to selecting the preview image 620 or locating the pointer image 205 on the preview image 620 as illustrated in FIG. 6D(a). In this instance, the preview information may include only the image display region 510, and Thus, the user can view a screen to which the removal of the letterbox region 520 is actually applied. Meanwhile, when a control signal for terminating the display of the preview information is received from the remote control when the preview information is displayed in FIG. 6D(b), the controller 180 can display screen information prior to displaying the preview information as illustrated in FIG. 6D(c).

The control signal for terminating the display of the preview information may be received when a specific button within the remote control 200 is selected by the user. In other words, the user can select the display termination of the preview information by pressing the specific button. Moreover, the control signal for terminating the display of the preview information can be generated based on the motion of the remote control 200. In other words, when a preset motion is applied to the remote control 200 by the user, a control signal corresponding to the preset motion can be transmitted to the electronic device, and as a result, the controller 180 can terminate the display of the preview information in response to the control signal.

Here, the preset motion includes at least one of a moving pattern, a moving path, a moving direction and a moving speed of the remote control. For example, when the remote control moves in a specific direction at more than a preset speed, a control signal corresponding to the preset motion can be generated.

Further, when a control signal for terminating the display of the preview information is not received until a preset period of time has passed, the controller 180 can remove the letterbox region 520 along with the preview information and then continuously display the image. The image contained in the preview information may be an image itself subject to being reproduced. Accordingly, even when the preview information is displayed, the user can continuously use an image that is being used.

In the above, a method of removing the letterbox region using the remote control 200 has been described. Further, it is also possible to remove the letterbox region through a user's gesture in addition to the scheme of using the remote control 200.

In more detail, the user's gesture can be sensed a sensing unit provided in the electronic device 100 itself or sensed through a sensing unit separately provided from the electronic device 100. The sensing unit includes various sensing mechanisms such as a camera, an ultraviolet sensor, a motion sensor or the like configured to sense the user's motion or gesture. The sensing unit separately provided from the electronic device 100 can also sense the user's gesture to transmit the sensed information to the electronic device 100. Such a communication method between the sensing unit separately provided therein and the electronic device 100 may be the same or similar to that between the remote control 200 and the electronic device 100, and thus the detailed description thereof will be omitted.

Figure 6E:
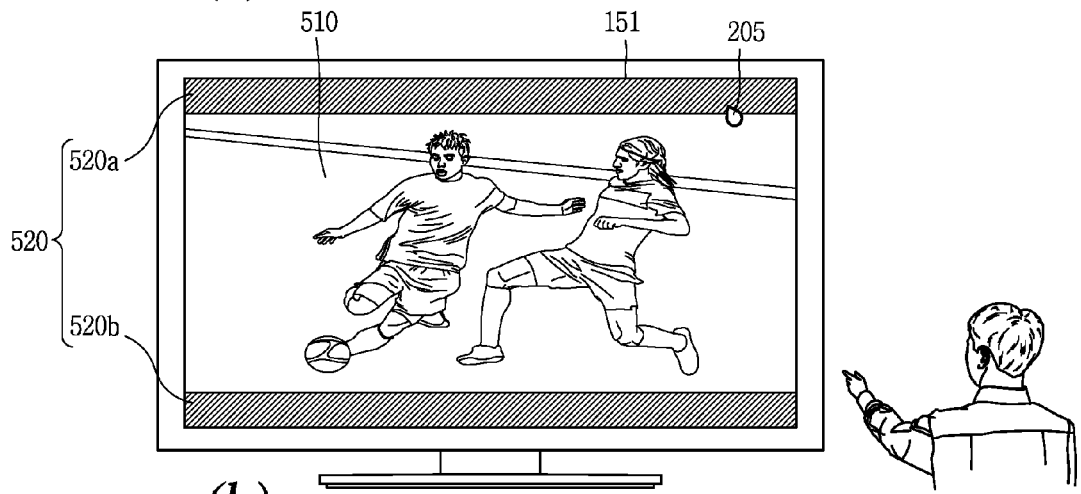
Figure 6E:
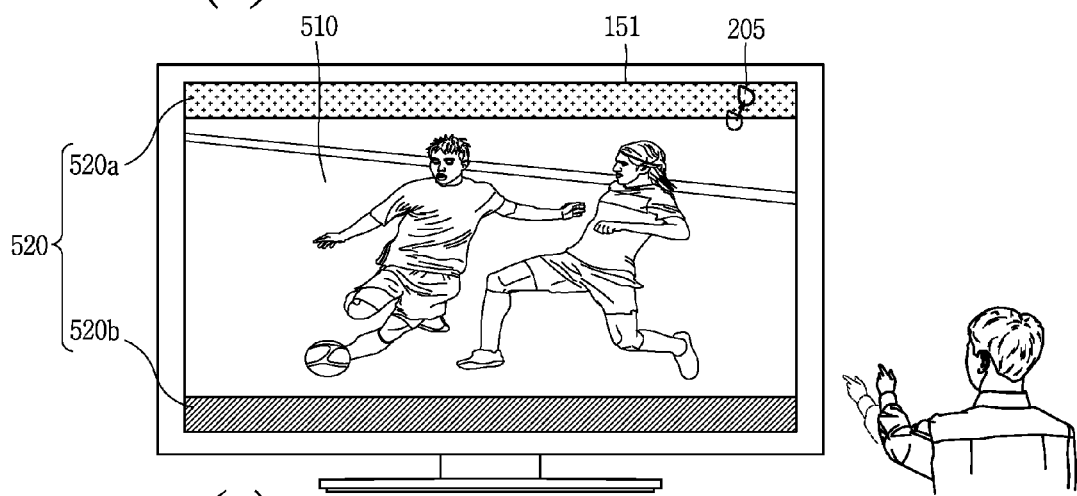
Figure 6E:
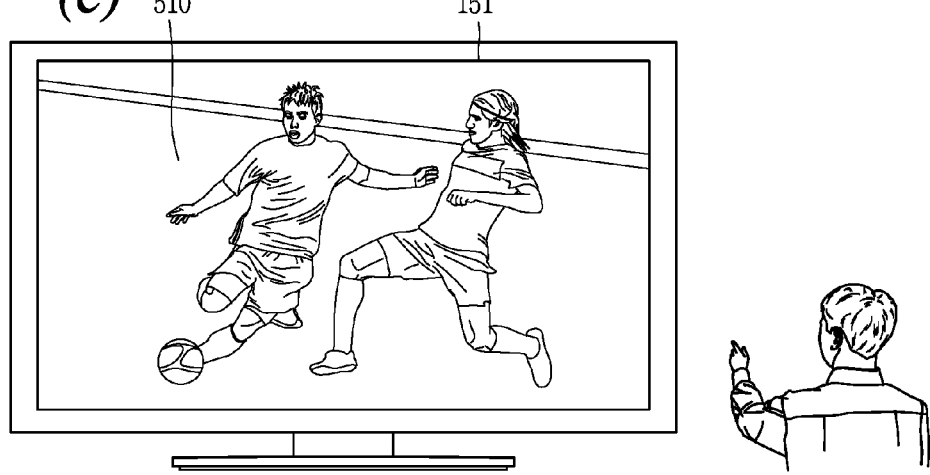

For example, as illustrated in FIG. 6E(a), the pointer image 205 controlled according to the user's gesture is displayed on the display unit 151. The pointer image moves on the display unit 151 according to the user's gesture. When the user's gesture satisfies a preset condition, the controller 180 can remove the letterbox region 520 as illustrated in FIGS. 6E(b) and 6E(c).

For example, the user's gesture may be a gesture for moving the pointer image 205 to an end of the display unit 151 when the pointer image 205 is located at a boundary portion between the letterbox region 520 and image display region 510. Further, the controller 180 can not unconditionally remove the letterbox region 520 in response to the user gesture.

In other words, the controller 180 can remove the letterbox region 520 in response to the gesture only when there is the user's intention to remove the letterbox region 520. The user's intention may be obtained through various schemes, and for example, when the pointer image 205 is located at a boundary portion between the letterbox region 520 and image display region 510 for a preset period of time, the controller 180 can determine that there is the user's intention to remove the letterbox region 520.

Accordingly, the controller 180 can display information indicating that the letterbox region 520 can be removed in response to the movement of the pointer image 205 on the display unit 151. For example, the controller 180 can change the color of the letterbox region 520 to display a guide image indicating that the letterbox region 520 can be removed.

Further, the method of controlling the letterbox region 520 through the remote control 200 as illustrated in FIGS. 6A-6D may be applicable in the same or similar manner to the scheme of controlling the letterbox region 520 in response to a user's gesture. Accordingly, the scheme of controlling the letterbox region 520 in response to a user's gesture will be substituted by the earlier description.

In addition, in the above description, an example in which all the letterbox regions disappear in an automatic mode has been described. However, the present invention is not limited to this, and can also control an electronic device such that all the letterbox regions do not disappear and at least part thereof remains in an automatic mode.

More specifically, the controller 180 can determine whether to allow all the letterbox regions to disappear or part thereof to remain in an automatic mode in consideration of a preset screen display ratio of the currently displayed image. The display ratio of the letterbox region can be suitably controlled to prevent the display ratio of the image from being distorted when all the letterbox regions disappear. More specifically, when all the letterbox regions disappear, the image may be extended in a vertical direction, and the viewer may feel distorted in viewing the image or does not want its extension in a vertical direction, and thus the controller 180 can reduce the size of the letterbox region only up to an undistorted range even though the image is extended in a vertical direction.

In this instance, the controller 180 can calculate the extent of extension without any distortion in a vertical direction of the image in consideration of a preset screen display ratio of the image and an area currently occupied by the letterbox region. Furthermore, the controller 180 can control the letterbox region up to a range undistorted in a vertical direction of the image using the calculated result.

Figure 6F:
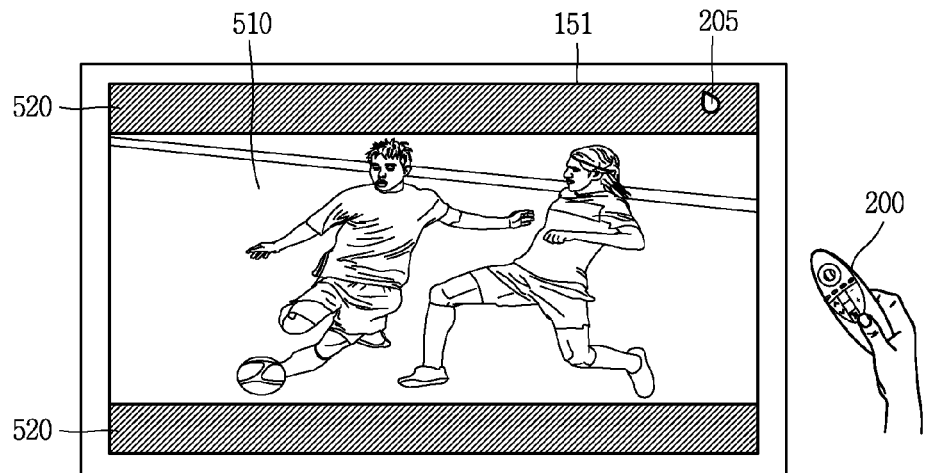
Figure 6F:
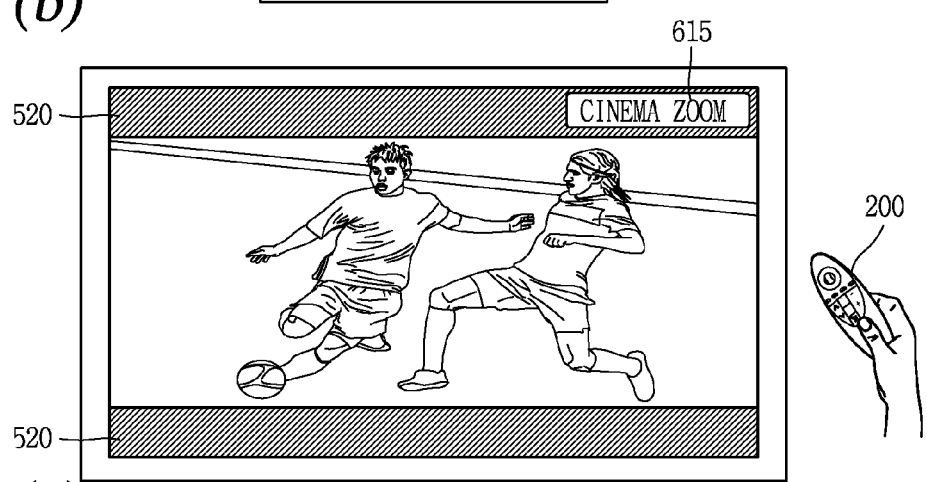
Figure 6F:
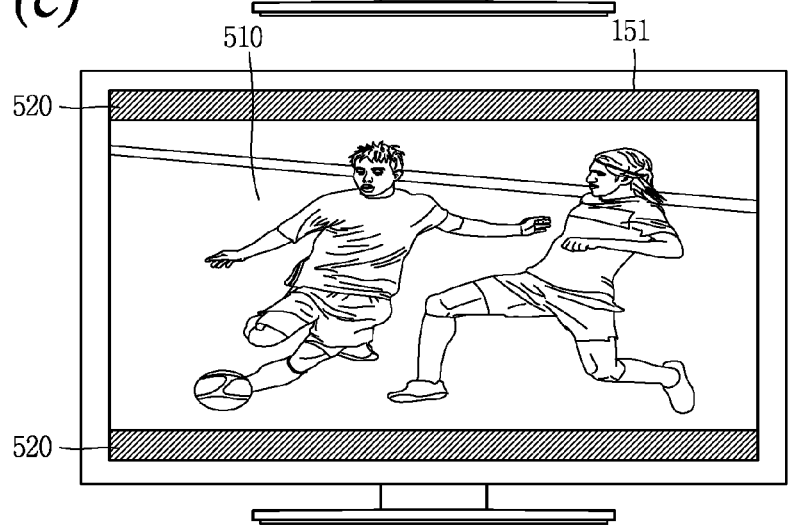

This type of control may be useful particularly when the user watches a movie. For example, the pointer image 205 may be displayed on the display unit 151 as illustrated in FIGS. 6F(a) and 6F(b), and when the pointer image 205 is located in a preset region, a graphic object 615 for selecting the removal of the letterbox region 520 is displayed. The controller 180 can display the graphic object 615 when the pointer image 205 is located in a preset region as illustrated in FIG. 6F(a). Furthermore, the controller 180 can display the graphic object 615 when the pointer image 205 is located at a boundary portion between the image display region 510 and letterbox region 520.

Further, when the pointer image 205 is located in the letterbox region 520 or at the boundary portion for more than a preset period of time, the controller 180 can display the graphic object 615. On the contrary, when an additional control signal is received from the remote control when the pointer image 205 is located in the letterbox region 520 or at the boundary portion, the controller 180 can display the graphic object 615.

Further, when the displayed graphic object 615 is selected, the controller 180 can remove at least part of the letterbox region 520 as illustrated in FIGS. 6F(b) and 6F(c). Here, when a specific button within the remote control 200 is selected by the user, the selection of the graphic object 615 may be performed. In other words, the user can finally determine the removal of the letterbox region due to pressing the specific button. When the pointer image 205 is displayed on the graphic object 615 upon receiving a control signal in response to the pressing of the specific button, the controller 180 can process it as the selection of the graphic object 615.

Further, when the graphic object 615 is selected, the controller 180 can remove at least part of the letterbox region without any distortion in a vertical direction of the image as illustrated in FIG. 6F(c). Also, a function of removing at least part of the letterbox region while preventing distortion in a vertical direction of the image, as described above, is called a "cinema zoom" function according to an embodiment of the present invention.

Moreover, an electronic device according to an embodiment of the present invention can allow all the letterbox regions to disappear or allow at least part thereof to disappear in consideration of distortion in a vertical direction of the image according to the user's selection. A function of allowing all the letterbox regions to disappear is called an "auto zoom" function according to an embodiment of the present invention.

Figure 6G:
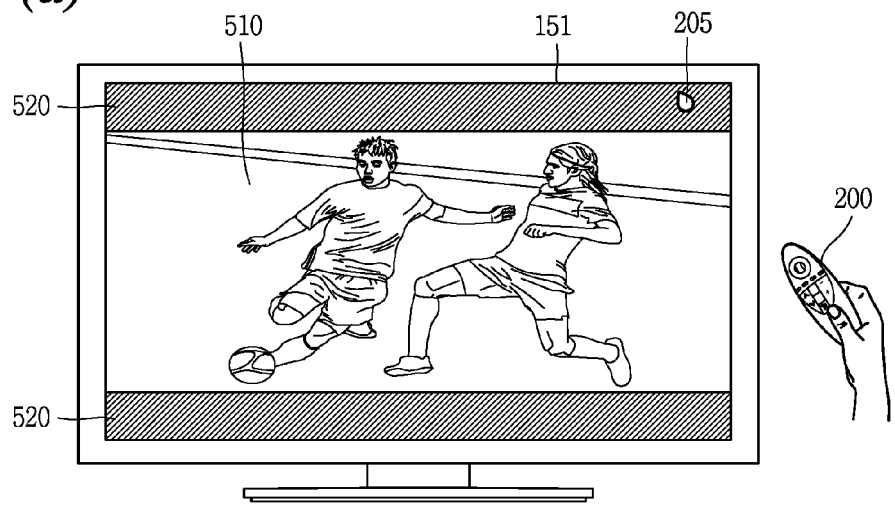
Figure 6G:
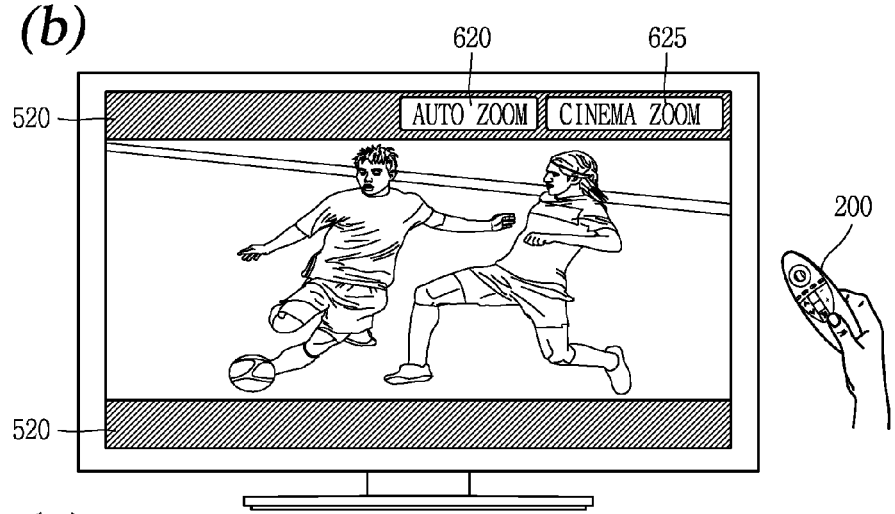
Figure 6G:
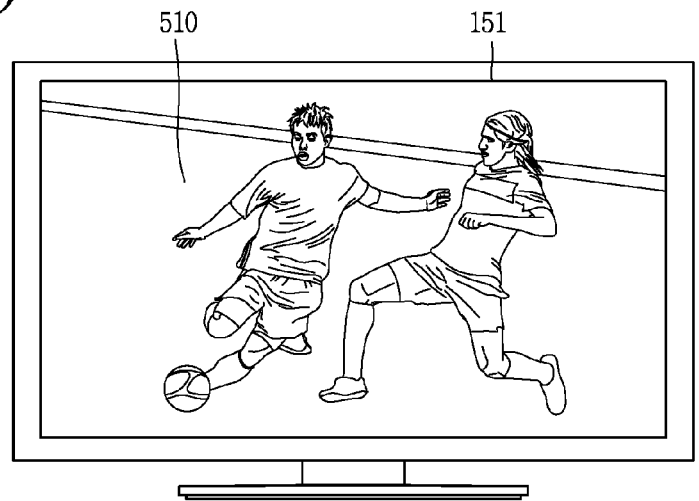

More specifically, when the pointer image 205 is located in a preset region as illustrated in FIG. 6G(a), for example, located on the letterbox region 520, the controller 180 can display the graphic objects 620, 625. Here, the first graphic object 620 is linked with an auto zoom function, and the second graphic object 625 is linked with a cinema zoom function.

Furthermore, when the pointer image 205 is located at a boundary portion between the image display region 510 and letterbox region 520, the controller 180 can display the graphic objects 620, 625. Further, when the pointer image 205 is located in the letterbox region 520 or at the boundary portion for more than a preset period of time, the controller 180 can display the graphic objects 620, 625. Also, when an additional control signal is received from the remote control when the pointer image 205 is located in the letterbox region 520 or at the boundary portion, the controller 180 can display the graphic objects 620, 625.

Further, when any one displayed graphic object 620 or 625 is selected, the controller 180 can control the letterbox region 520 to correspond to the selected object (for example, the first graphic object 620 is selected as illustrated in FIG. 6G(c)).

For example, when the first graphic object 620 is selected, the controller 180 can allow the letterbox region to disappear to correspond to an auto zoom function as illustrated in FIG. 6G(c). Furthermore, when the second graphic object 625 is selected, the controller 180 can remove at least part of the letterbox region to prevent distortion in a vertical direction of the image.

Here, when a specific button within the remote control 200 is selected by the user, the selection of the graphic object may be performed. In other words, the user can finally determine the removal of the letterbox region due to pressing the specific button. The controller 180 can determine which graphic object has been selected according to the pointer image 205 located at which one of the first and the second graphic object 620, 625 upon receiving a control signal in response to the pressing of the specific button.

Further, as described above, subsequent to removing the letterbox region, the controller 180 can display the letterbox region on the display unit 151 in response to the user's request. The user's request associated with the redisplay of the letterbox region may be received through a control signal received from the remote control 200 or a user's gesture sensed through the sensing unit as described above. The size of the letterbox region redisplayed in response to the redisplay request of the letterbox region may be adjusted to a size of the letterbox region initially contained in the display unit when reproducing the image.

Figure 7A:
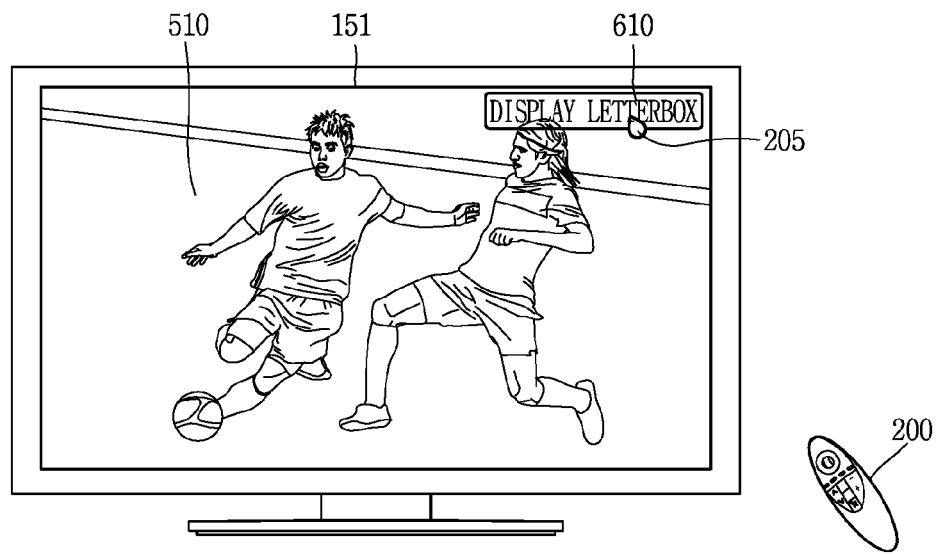
Figure 7A:
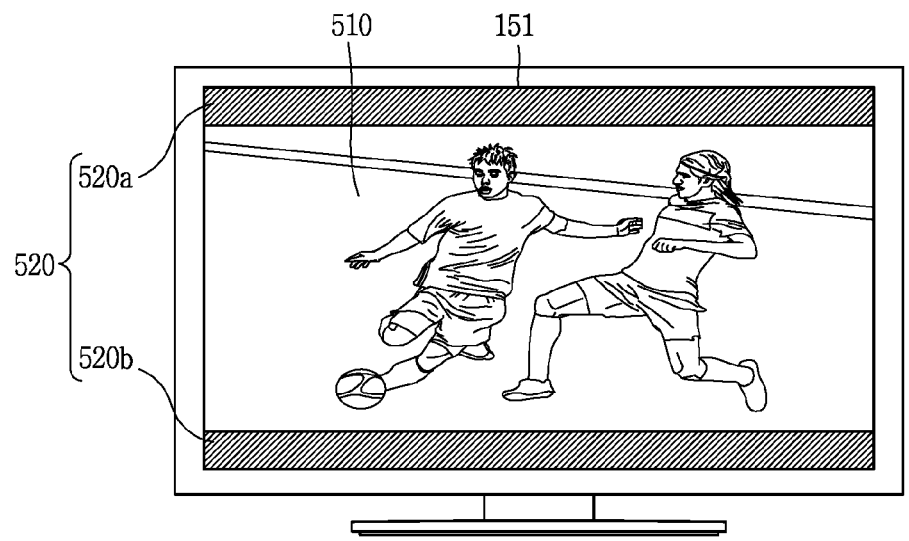

For example, when the pointer image 205 is located in a preset region of the display unit 151 for a preset period of time as illustrated in FIG. 7A(a), the controller 180 can display the graphic object 610 for selecting the display of the letterbox region. Furthermore, when the graphic object 610 is selected, the controller 180 can redisplay the letterbox region as illustrated in FIG. 7A(b).

Figure 7B:
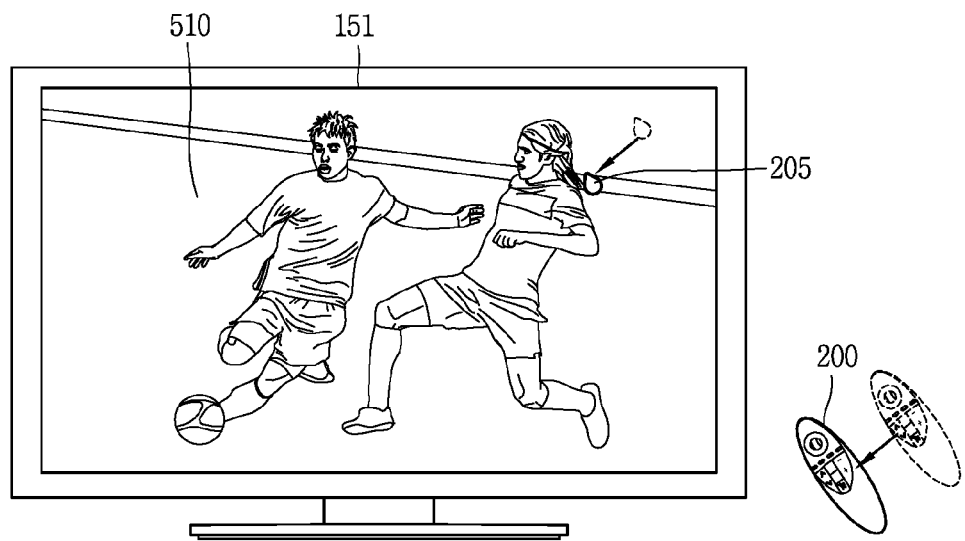
Figure 7B:
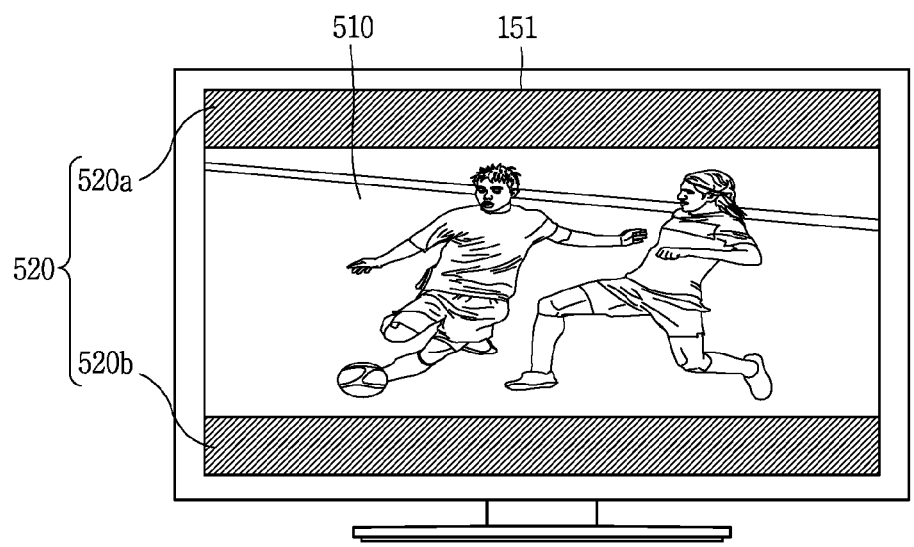

Here, the movement of the preview information and the selection of the graphic object 610 may be performed by a user gesture sensed through the remote control 200 or sensing unit. In another example, when the pointer image 205 is dragged in one direction within a preset region as illustrated in FIG. 7B(a), the controller 180 can redisplay the letterbox region as illustrated in FIG. 7B(b).

Here, the drag of the pointer image 205 may be performed through the remote control 200 or user's gesture. The drag through the remote control 200 may be performed when the remote control moves in a state the a specific button of the remote control 200 is selected. Furthermore, the preset region may be a region in which the letterbox region 520 is displayed, and the direction of the drag may correspond to a direction of pulling down the letterbox region 520 from an end of the display unit 151 to the other end thereof.

Figure 7C:
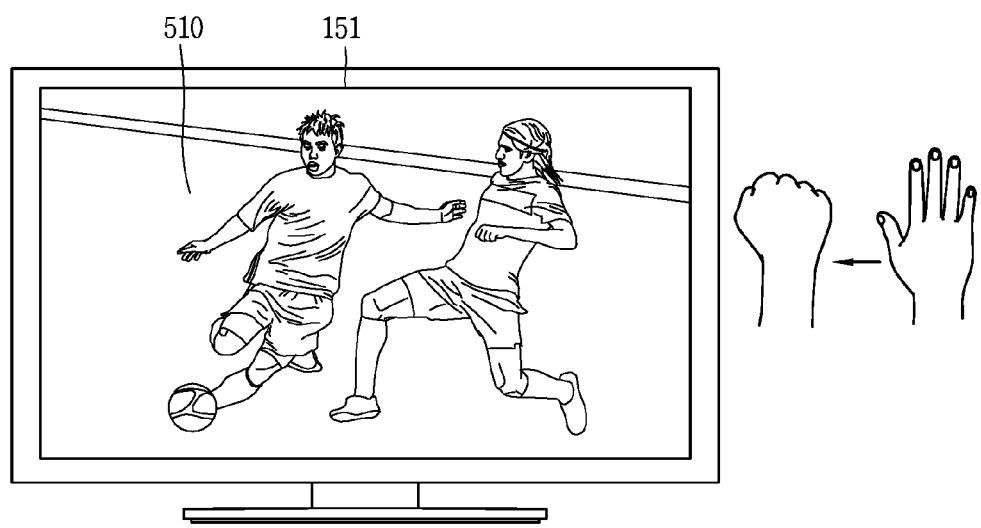
Figure 7C:
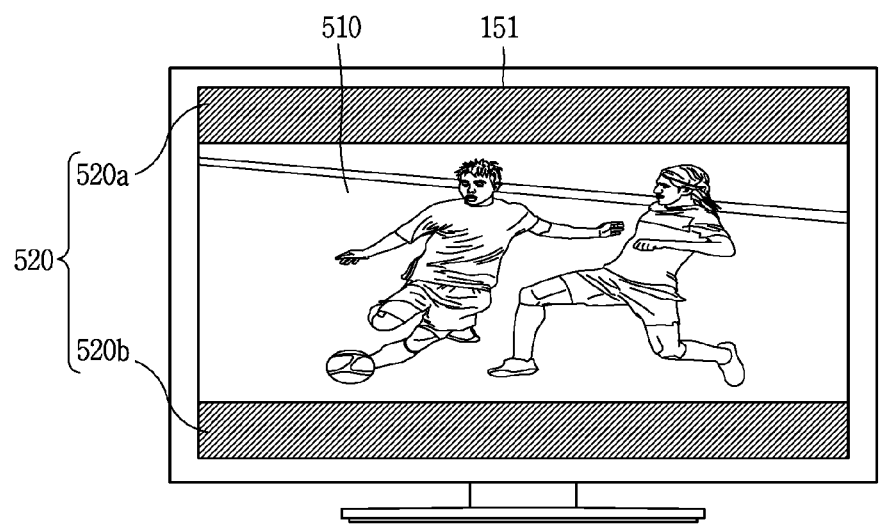

In another example, the controller 180 can control the letterbox region through a user's gesture sensed through the sensing unit without using the pointer image 205. When a user's movement corresponding to a preset motion is sensed as illustrated in FIG. 7C(a), the controller 180 can display the letterbox region 520 along with the image display region 510 as illustrated in FIG. 7C(b). Information on control operations corresponding to motions, respectively, is stored in the memory of the electronic device 100 in a matched manner, and the controller 180 processes a control operation matching the sensed motion with reference to information stored in the memory. For example, as illustrated in the drawing, when the user takes a gesture holding a fist in a state his or her fingers are all unfolded, the controller 180 can search an operation corresponding to the gesture and perform control corresponding to the searched operation.

As described above, when the letterbox region is controlled in an automatic mode, the controller 180 can remove or display the letterbox region at a preset level in response to a user request for removing or displaying the letterbox region. Here, the letterbox region can be completely or partially removed according to the setting.

Hereinafter, a method of controlling the letterbox region in a manual mode will be described in more detail with reference to the accompanying drawings. A common example associated with the control of the letterbox region in a manual mode will be first described, and then a method of controlling the letterbox region through a remote control and a method of controlling the letterbox region through a user gesture will be sequentially described.

FIGS. 8A-8G are conceptual views illustrating a method of using a guide image to control the letterbox region. An electronic device according to an embodiment of the present invention uses a guide image to control the letterbox region. The user can move the guide image to adjust the size of the letterbox region and image display region. The guide image can be controlled through a control signal received from the remote control or a user gesture sensed through the sensing unit.

Hereinafter, a common example of changing the size of the letterbox region and image display region through a guide image will be first described prior to describing a method of controlling a guide image based on a control signal received from the remote control or a user gesture sensed through the sensing unit. Accordingly, the description with FIGS. 8A-8G, it is described that they are all substituted by a "user request" without mentioning a remote control or user gesture.

Figure 8A:
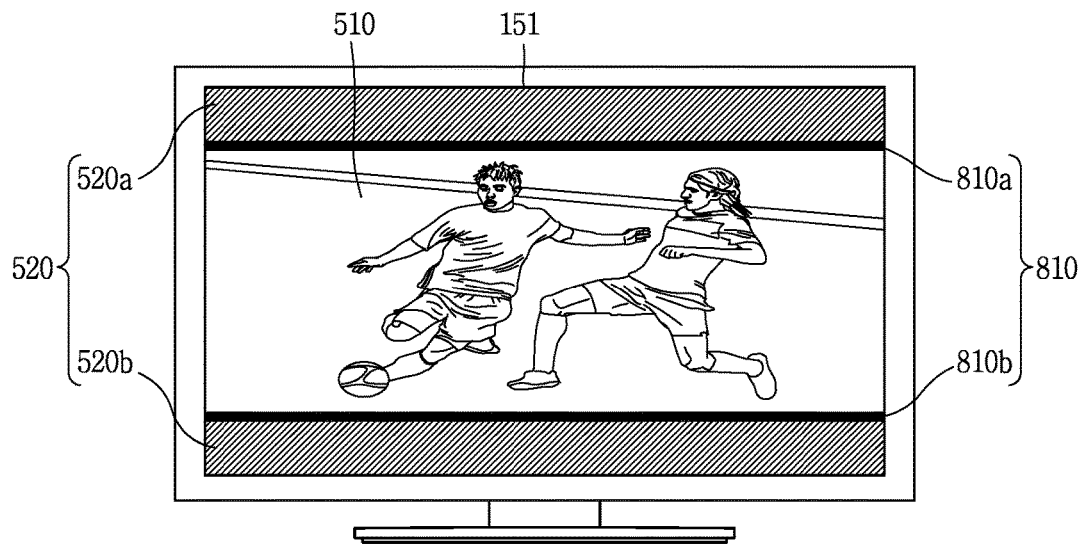
FIGS. 8A-8G are conceptual views illustrating a method of using a guide image to control the letterbox region.
Figure 8A:
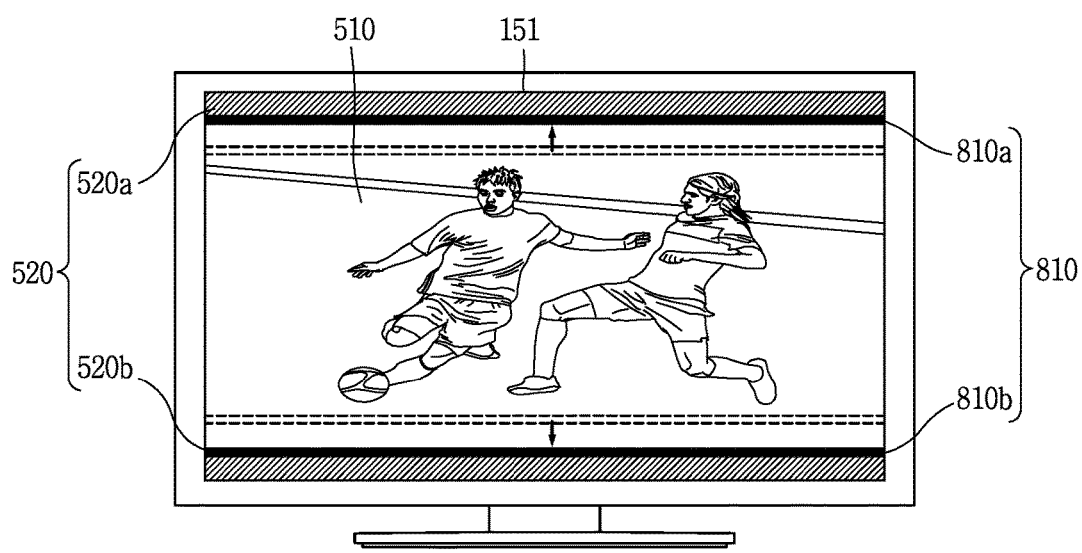

As illustrated in FIG. 8A(*a*), there is a user request associated with the control of the letterbox region 520, and a guide image 810 is displayed at a boundary portion between the image display region 510 and letterbox region 520. As illustrated in the drawing, when the letterbox regions 520 are contained at both sides of the display unit 151, respectively, the controller 180 displays a first guide image 810*a* at a boundary portion between a first letterbox region 520*a* and the image display region 510, and displays a second guide image 810*b* at a boundary portion between a second letterbox region 520*b* and the image display region 510. Thus, when the guide image 810 is displayed on the display unit 151, the user can recognize that the letterbox region 520 is in a controllable state.

The guide image 810 moves within the display unit 151 in response to a user request as illustrated in FIGS. 8A(*a*) and 8A(*b*). The guide image 810 may move only in a length direction (or vertical direction) of the display unit 151. More specifically, the first and the second guide images 810*a* and 810*b* may move away from or closer to each other in response to a user request. FIG. 8A(*b*) illustrates that the first and the second guide images 810*a* and 810*b* moving away from each other.

Thus, the user can move the guide image 810 within the display unit 151 to adjust the size of the letterbox region 520. The controller 180 determines the size of the image display region 510 and letterbox region 520 based on a region in which the guide image 810 has moved. For example, when the guide image 810 moves toward both ends of the display unit, the size of the image display region 510 is enlarged. Furthermore, when the guide image 810 moves away from both ends of the display unit, the size of the image display region 510 is reduced. When the size of the image display region 510 is enlarged, an image displayed in the image display region 510 is displayed in an enlarged manner in proportion to the enlargement of the image display region 510 or is displayed in a reduced manner in proportion to the reduction of the image display region 510.

Figure 8B:
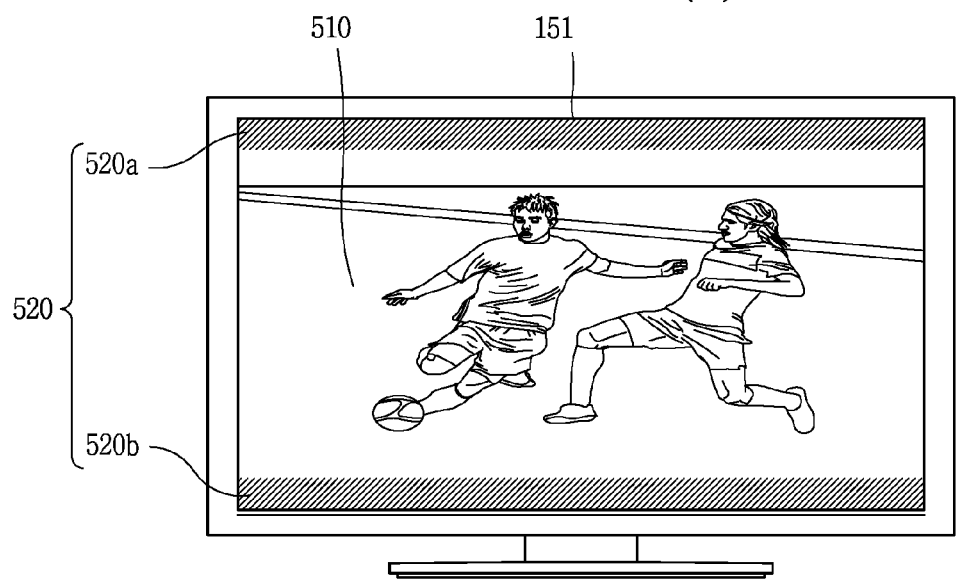
Figure 8B:
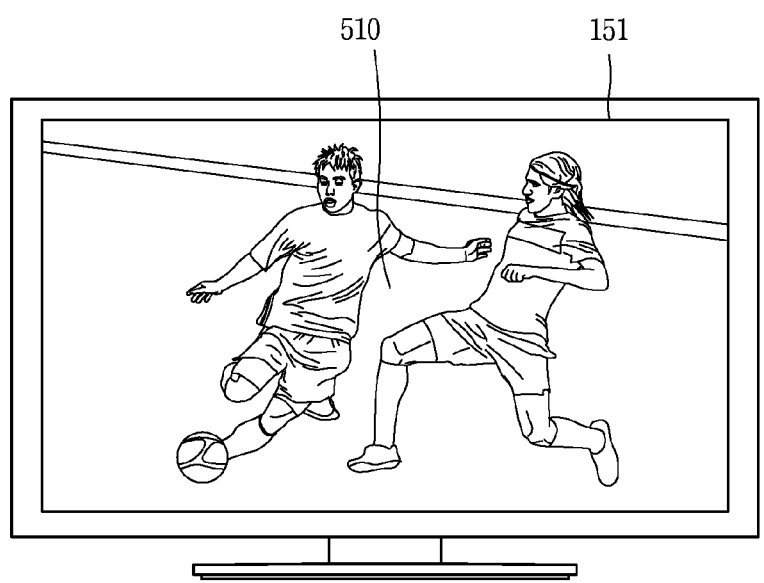

When the size adjustment of the letterbox region 520 is completed through the movement of the guide image 810, the controller 180 can adjust the size of the letterbox region 520 and the size of the image display region 510 as illustrated in FIG. 8B(*a*) in response to the extent of moving the guide image 810.

When the guide image 810 moves to an end of the display region of the display unit 151, the controller 180 can allow only the image display region 510 to remain, and remove the letterbox region 520 as illustrated in FIG. 8B(*b*). Here, a full image can be displayed in the display region on the display unit 151.

Also when a moving distance of the guide image 810 is above a preset distance, the controller 180 can allow only the image display region 510 to remain, and remove letterbox region as illustrated in FIG. 8B(*b*).

When the size adjustment of the image display region 510 and letterbox region 520 is completed, the display of the guide image 810 on the display unit 151 may be terminated. A complete request for the size adjustment of the image display region 510 and letterbox region 520 may be performed by a control signal or user gesture received from the remote control.

Even when the guide image 810 moves as illustrated in FIG. 8A(*b*), the controller 180 can not change the display size of an image displayed in the image display region 510 if it is prior to the completion of the size adjustment of the letterbox region 520. In other words, even when the guide image 810 moves, the controller 180 can display an image in the relevant region while maintaining the size of the image display region 510 prior to displaying the guide image 810.

Figure 8C:
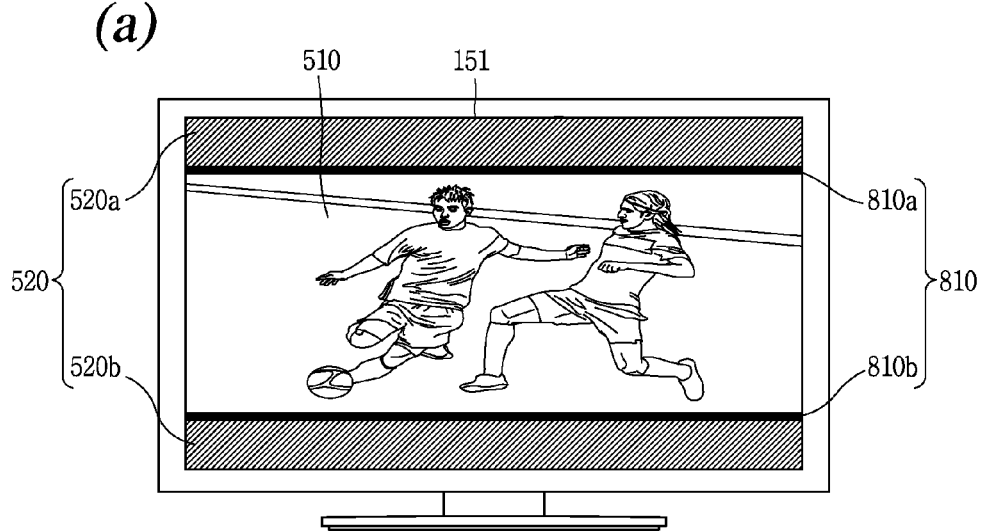
Figure 8C:
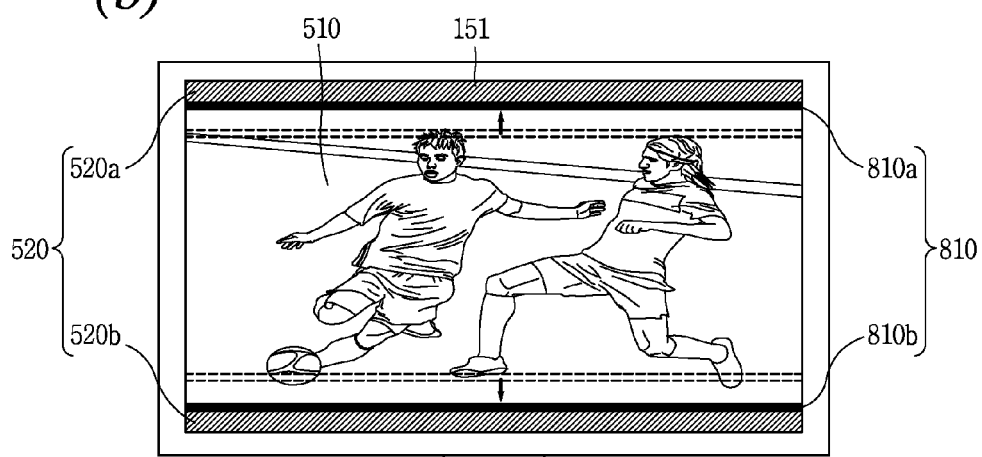
Figure 8C:
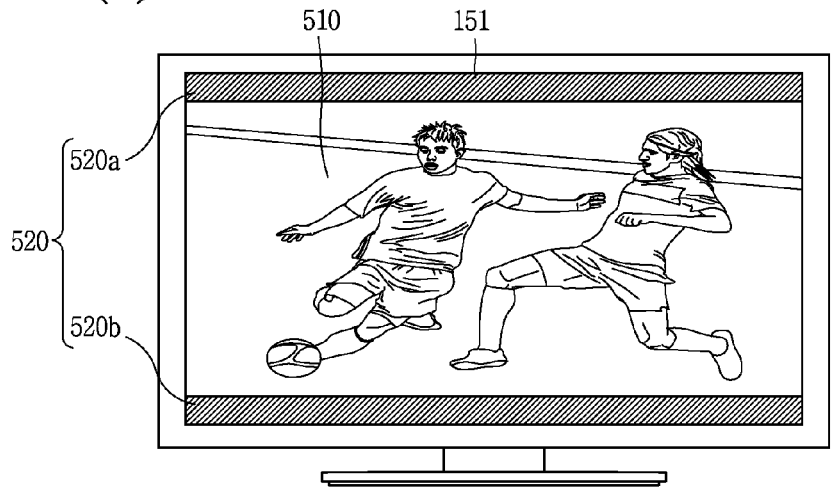

In another example, as illustrated in FIGS. 8C(*a*) and 8C(*b*), the controller 180 can adjust the size of the image display region 510 in conjunction with the movement of the guide image 810 even prior to the completion of the size adjustment of the letterbox region 520, and display an image displayed on the image display region 510 in an enlarged or reduced manner in proportion to the adjusted size. Thus, when the size of the letterbox region 520 is changed, the user can know the extent of enlargement or reduction of the image in advance, and find which size of the letterbox region 520 is an optimized image for himself or herself. The guide 810 can then not be displayed as shown in FIG. 8C(*c*).

Figure 8D:
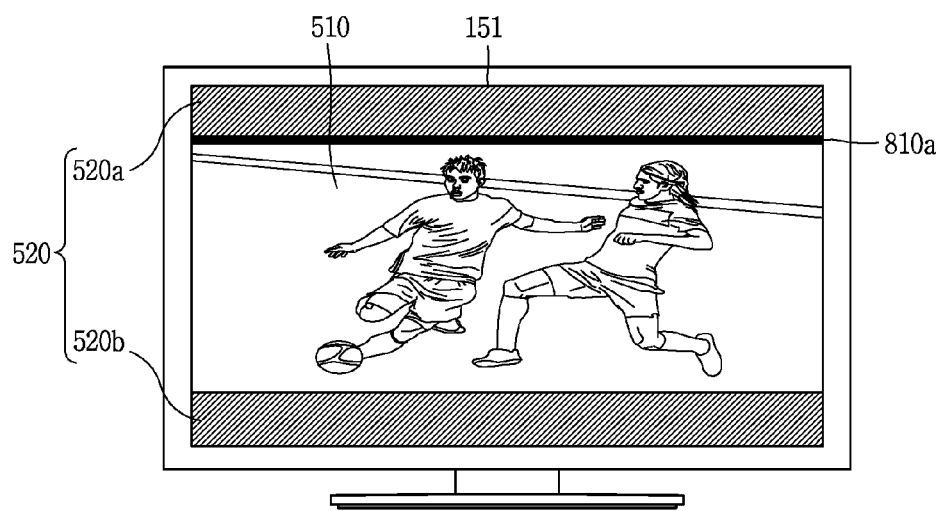
Figure 8D:
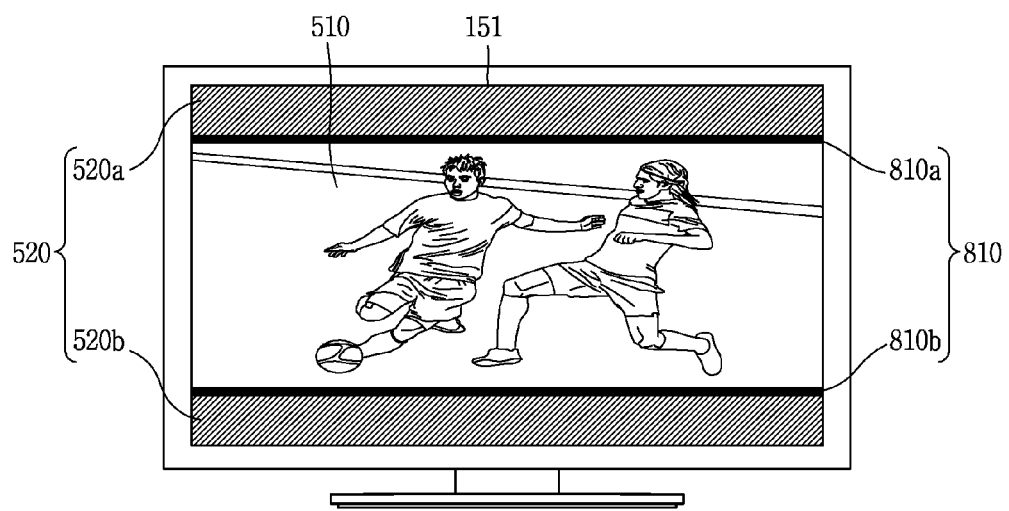

Further, as illustrated in FIG. 8D(*a*) or 8D(*b*), when the first and the second letterboxes 520*a* and 520*b* are contained at both sides of the display unit 151, respectively, and the image display region 510 is contained between the first and the second letterbox 520*a*, 520*b*, the controller 180 can adjust either one size of the first and the second letterboxes 520*a* and 520*b* or adjust the size of both the first and the second letterboxes 520*a* and 520*b* based on the user's selection.

Figure 8E:
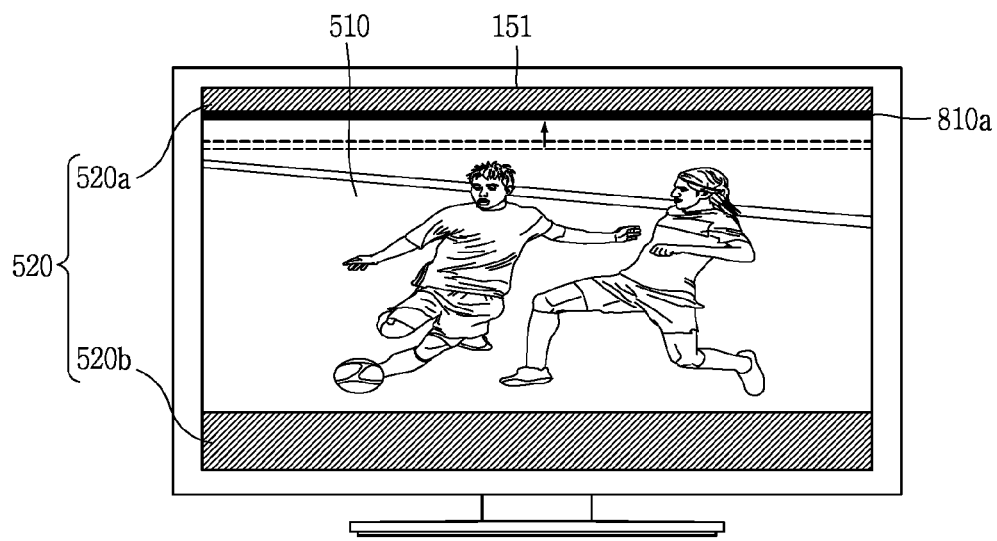
Figure 8E:
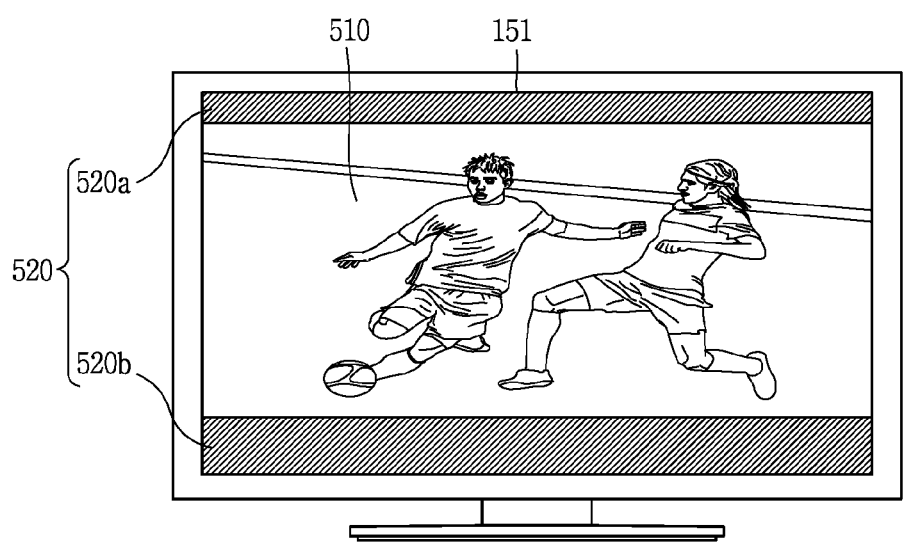
Figure 8F:
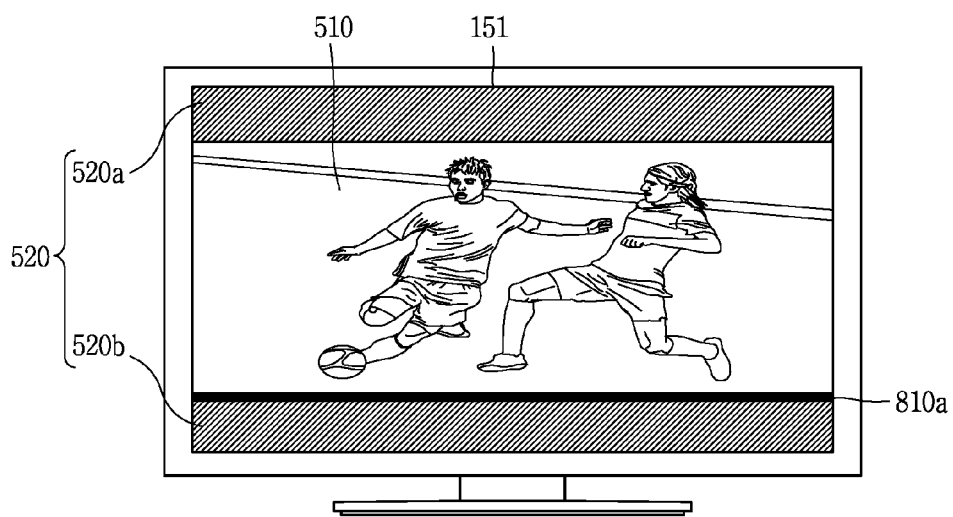
Figure 8F:
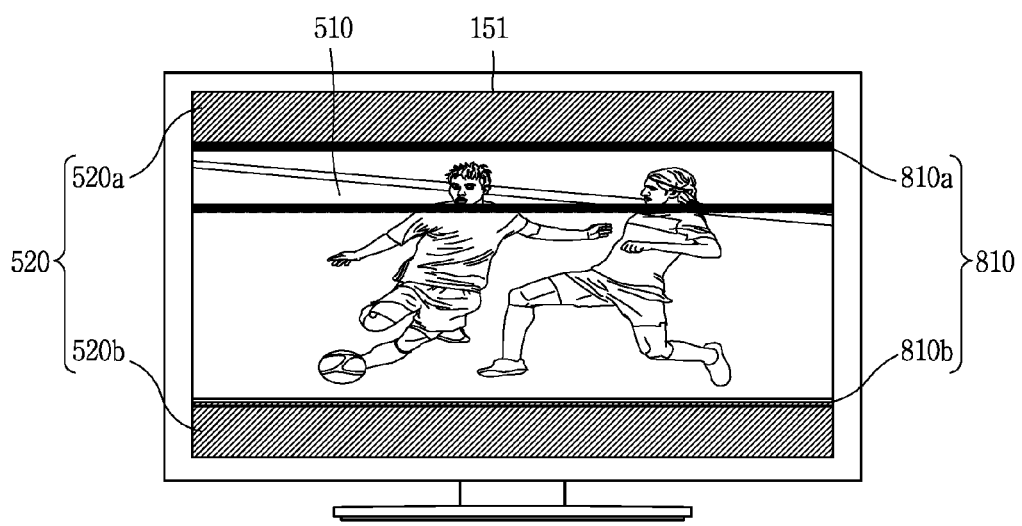
Figure 8G:
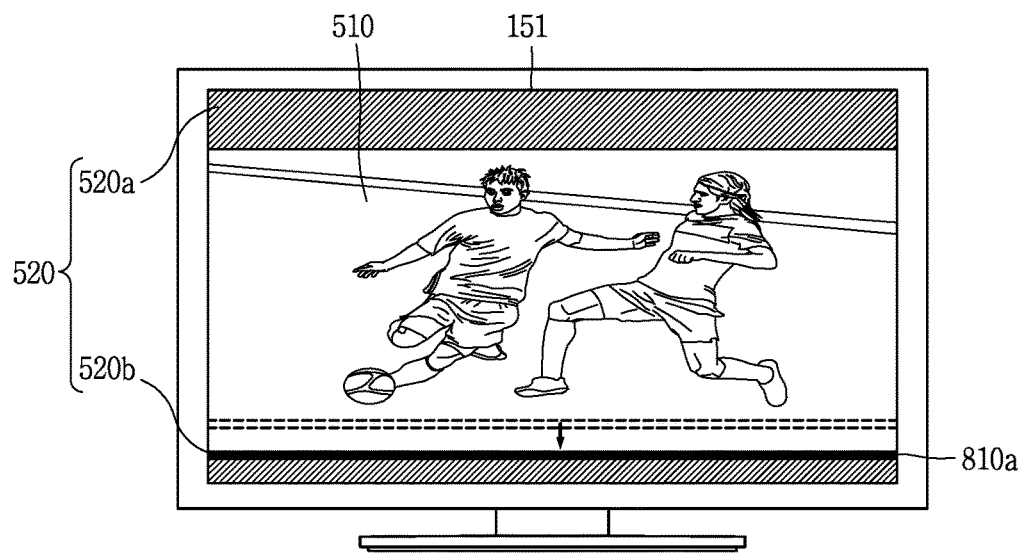
Figure 8G:
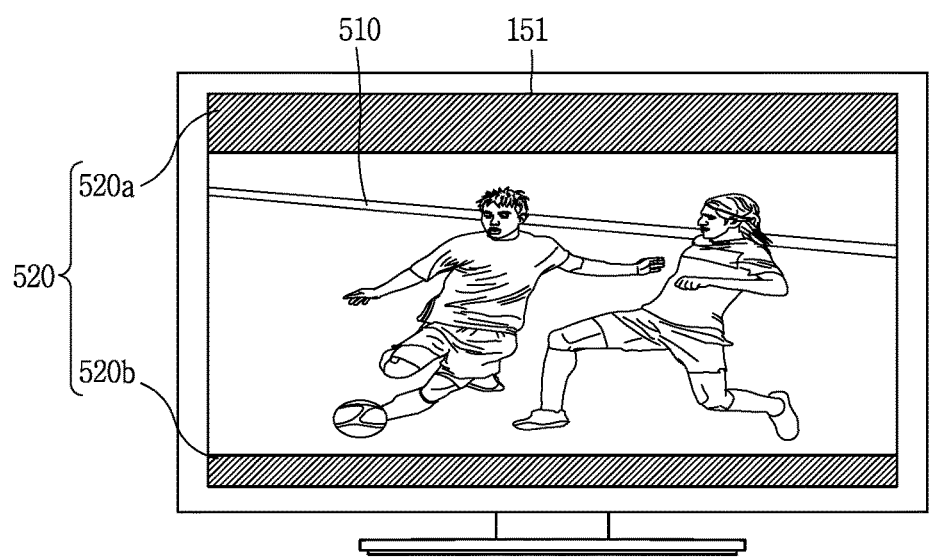

As illustrated in the drawing, when the guide image 810*a* is displayed only at either one of both boundary portions between the first and the second letterboxes 520*a* and 520*b* and image display region 510, the controller 180 can adjust the size of the letterbox 510*a* or 510*b* corresponding to a position at which the guide image 810*a* is displayed as illustrated in FIGS. 8E(*a*) and 8E(*b*) or 8G(*a*) and 8G(*b*). In other words, the size of the letterbox 510*b* or 510*a* at a side on which the guide image 810*a* not displayed may not be changed even if the guide image 810*a* moves.

Further, when the guide image is displayed to correspond to only either one of the first and the second letterboxes 520*a* and 520*b* as illustrated in FIGS. 8D(*a*) and 8F(*a*), the controller 180 can additionally display a guide image even in a region on which the guide image is not displayed within the first and the second letterboxes 520*a* and 520*b* as illustrated in FIGS. 8D(*b*) and 8F(*b*). Thus, when a guide image is displayed in both the first and the second letterbox 520*a*, 520*b*, the size of the first and the second letterboxes 520*a* and 520*b* can be changed at the same time in response to the movement of the guide image.

As described above, an electronic device according to the present invention can display a guide image for adjusting the size of the image display region and letterbox region in response to a user request. Furthermore, it is possible to adjust the size of the letterbox or remove the letterbox through the movement of the guide image due to a user request. Accordingly, the user can easily find the extent of changing the letterbox, and intuitively control the letterbox.

Hereinafter, a method of controlling a guide image in response to a control signal received from the remote control to control the image display region and letterbox region will be described in more detail with reference to the accompanying drawings. FIGS. 9A-9D and 10A-10C are conceptual views illustrating a method of controlling a guide image using a remote control device.

A user request for displaying the guide image 810 as described above can be received from the remote control (or remote control device 200) illustrated in FIGS. 1 and 3. In other words, the controller 180 can display a guide image based on a control signal received from the remote control.

Figure 9A:
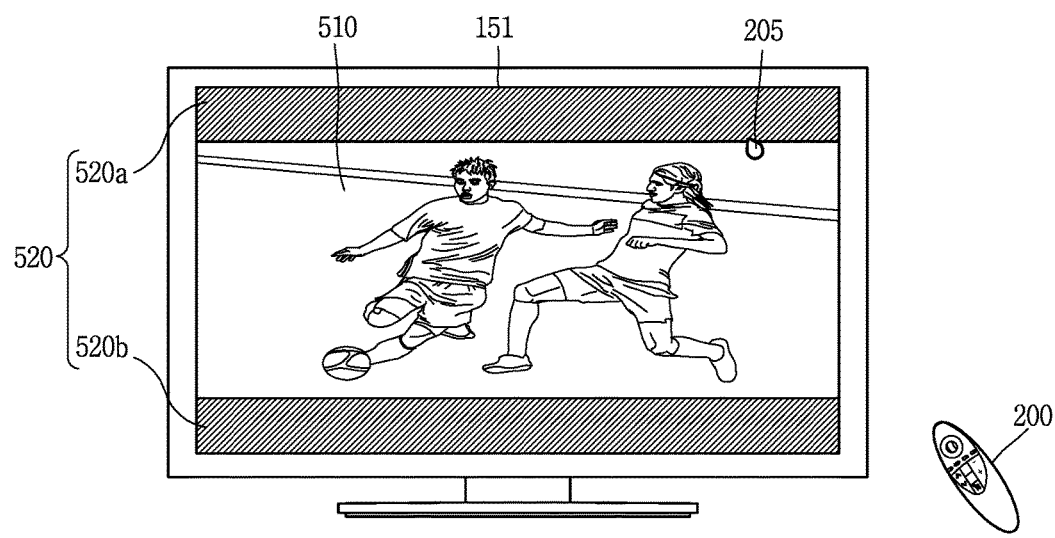
FIGS. 9A-9D, and 10A-10C are conceptual views illustrating a method of controlling a guide image using a remote control device.
Figure 9A:
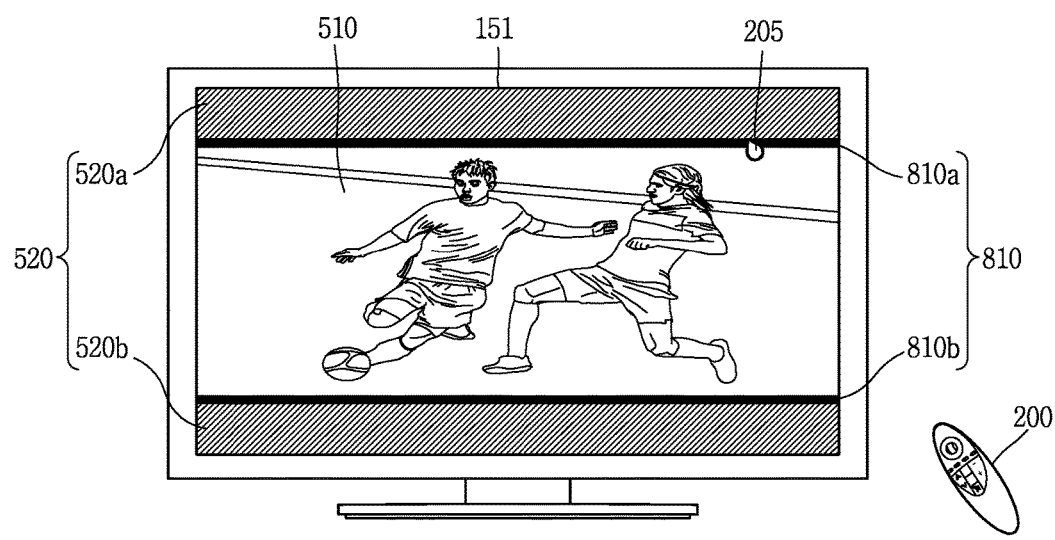

For example, the pointer image 205 can be displayed on the display unit 151 as illustrated in FIG. 9A(*a*), and the pointer image 205 moves in response to a control signal received from the remote control 200. Here, the controller 180 can perform control associated with a region indicated by the pointer image 205.

The pointer image 205 may be displayed by a user's request or displayed when a user's movement (for example, when the remote control 200 moves, when a user's hand holding the remote control is sensed, etc.) desired to use the remote control 200 is sensed. A user request for displaying the pointer image 205 includes when a specific button provided in the remote control 200 is selected.

Further, a control signal for moving the pointer image 205 can be received in response to the movement of the remote control 200. In other words, sensors for sensing the movement of the remote control 200 may be disposed in the remote control 200. The sensor may be at least one of an acceleration sensor, a magnetic sensor, a gravity sensor (G-sensor), a gyroscope sensor and a motion sensor. Accordingly, when the user moves while holding the remote control, the remote control can generate a control signal corresponding to the user's movement. Moreover, the controller 180 can control the movement of the pointer image 205 based on the control signal. Thus, it is possible to sense the user's movement in a three-dimensional space using sensors for sensing the movement of the remote control 200, and control the movement of the graphic object in response to this.

In another example, a control signal for moving the pointer image 205 can be generated in response to a user manipulation with respect to a wheel, a touch pad, a direction key button, and the like mounted on the remote control 200. Further, the controller 180 can display the guide image 810 at a boundary portion between the image display region 510 and letterbox region 520 as illustrated in FIG. 9A(*b*) in response to the pointer image 205 located at the boundary portion thereof as illustrated in FIG. 9A(*a*).

Furthermore, when there is an additional user request in addition to the pointer image 205 located at the boundary portion, the controller 180 can display the guide image 810 at the boundary portion. Here, the additional user request includes when a specific button provided in the remote control 200 is selected. Furthermore, when the pointer image 205 is located at the boundary portion for a preset period of time, the controller 180 can display the guide image.

Further, as illustrated in FIG. 9A(*b*), the controller 180 displays a first guide image 810*a* at a boundary portion between a first letterbox region 520*a* and the image display region 510, and displays a second guide image 810*b* at a boundary portion between a second letterbox region 520*b* and the image display region 510. Thus, when the guide image 810 is displayed on the display unit 151, the user can recognize that the letterbox region 520 is in a controllable state.

Figure 9B:
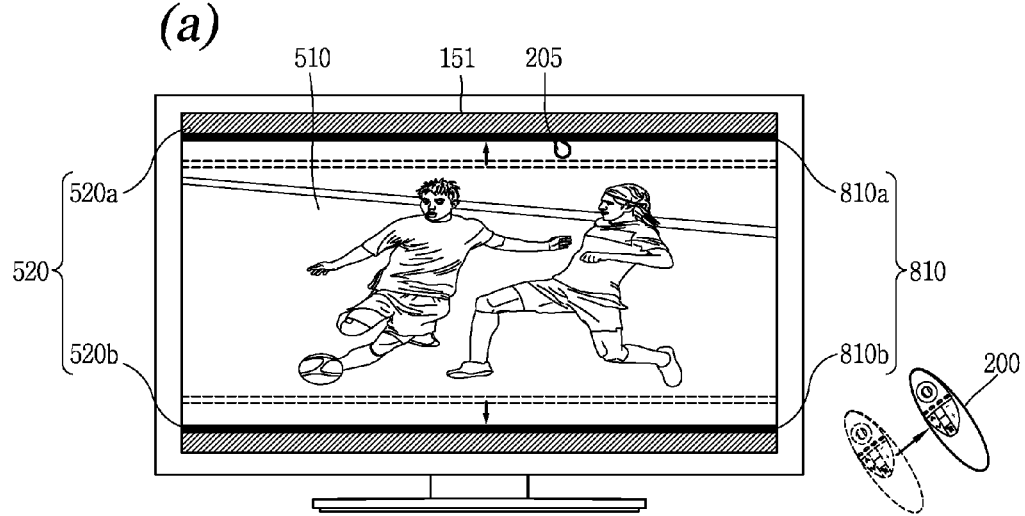
Figure 9B:
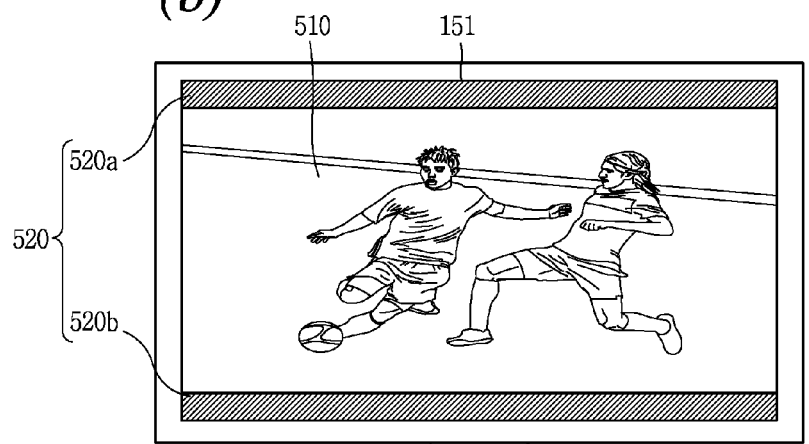
Figure 9B:
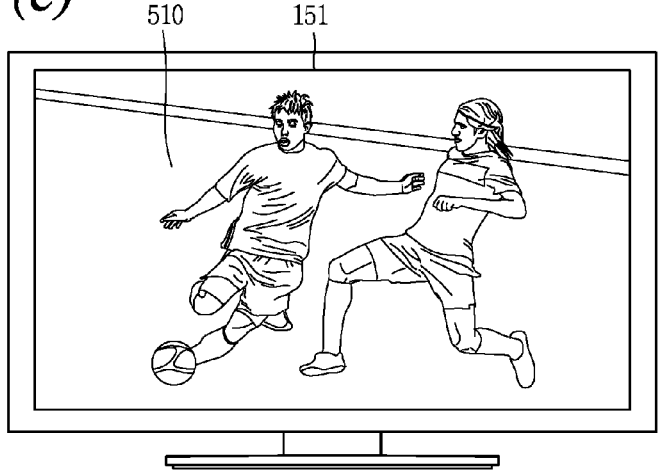

Moreover, the guide image 810 moves within the display unit 151 in response to the motion of the remote control 200 as illustrated in FIG. 9B(*a*). A control signal received from the remote control 200 may include information associated with the motion of the remote control 200. As illustrated in the drawing, when the remote control 200 moves in one direction, the guide image 810 moves on the display unit 151 to correspond to the one direction.

Further, when the motion of the remote control 200 is sensed when the guide image 810 is displayed, the controller 180 can use it as a movement request of the guide image 810. On the contrary, the controller 180 can move the guide image 810 only when there is a motion of the remote control 200 in a state the guide image 810 is selected by the pointer image 205. Here, the state in which the guide image 810 is selected by the pointer image 205 includes when a specific button of the remote control 200 is selected when the pointer image 205 is located in one region on the guide image 810. In other words, when the remote control moves when a specific button of the remote control 200 is pressed, the controller 180 can move a guide image in response to receiving motion information associated with the movement of the remote control.

Furthermore, the controller 180 can move the guide image only when the motion information of the remote control is received when the specific button is pressed. Alternatively, when the specific button is selected once, the controller 180 can move the guide image 810 according to the motion of the remote control even if the selection is released. In addition, when the guide image 810 moves only when the motion information of the remote control is received when the specific button is pressed, the controller 180 can terminate the movement of the guide image 810 if the selection of the specific button is released, and adjust the size of the image display region 510 and letterbox region 520 based on a region in which the guide image 810 has moved.

Further, the guide image 810 can move only in a length direction (or vertical direction) of the display unit 151. More specifically, the first and the second guide images 810*a* and 810*b* may move away from or closer to each other in response to the motion of the remote control. FIG. 9B(*a*) illustrates that the first and the second guide images 810*a* and 810*b* are far away from each other.

The user can move the guide image 810 within the display unit 151 to adjust the size of the letterbox region 520. The controller 180 determines the size of the image display region 510 and letterbox region 520 based on a region in which the guide image 810 has moved. For example, when the guide image 810 moves toward both ends of the display unit, the size of the image display region 510 is enlarged. Furthermore, when the guide image 810 moves away from both ends of the display unit, the size of the image display region 510 is reduced. When the size of the image display region 510 is enlarged, an image displayed in the image display region 510 is displayed in an enlarged manner in proportion to the enlargement of the image display region or displayed in a reduced manner in proportion to the reduction of the image display region.

When the size adjustment of the letterbox region 520 is completed through the movement of the guide image 810, the controller 180 can adjust the size of the letterbox region 520 and the size of the image display region 510 as illustrated in FIG. 9B(b) in response to the extent of moving the guide image 810.

When the guide image 810 moves to an end of the display region of the display unit 151, the controller 180 can allow only the image display region 510 to remain, and remove the image display region 510 as illustrated in FIG. 9B(c). Thus, a full image can be displayed in the display region on the display unit 151.

Furthermore, when a moving distance of the guide image 810 is above a preset distance, the controller 180 can allow only the image display region 510 to remain, and remove the letterbox region 520 as illustrated in FIG. 9B(c). Also, the moving speed of the guide image 810 is proportional to the movement speed of the remote control, and the controller 180 can allow only the image display region 510 to remain, and remove the letterbox region 520 as illustrated in FIG. 9B(c) when the movement speed of the remote control is above a preset speed.

When the size adjustment of the image display region 510 and letterbox region 520 is completed, the display of the guide image 810 on the display unit 151 may be terminated. A complete request for the size adjustment of the image display region 510 and letterbox region 520 may be performed by a control signal received from the remote control. A control signal associated with the complete request may be received when a specific button provided in the remote control is selected.

Further, even when the guide image 810 moves as illustrated in FIG. 9B(a), the controller 180 can not change the display size of an image displayed in the image display region 510 if it is prior to the completion of the size adjustment of the letterbox region 520. In other words, even when the guide image 810 moves, the controller 180 can display an image in the relevant region while maintaining the size of the image display region 510 prior to displaying the guide image 810.

Figure 9C:
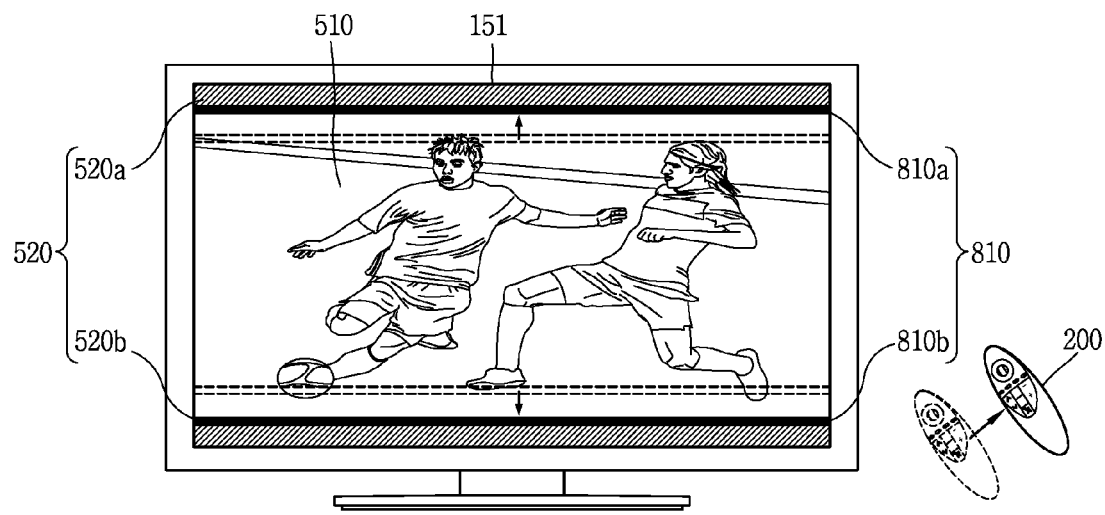
Figure 9C:
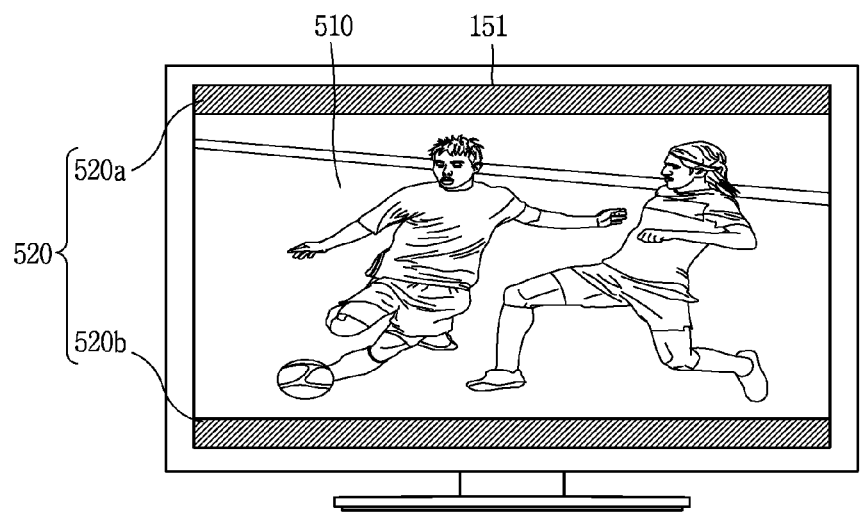

In another example, as illustrated in FIG. 9C(a), the controller 180 can adjust the size of the image display region 510 in conjunction with the movement of the guide image 810 even prior to the completion of the size adjustment of the letterbox region 520, and display an image displayed on the image display region 510 in an enlarged or reduced manner in proportion to the adjusted size. Thus, when the size of the letterbox region 520 is changed, the user can know the extent of enlargement or reduction of the image in advance, and find which size of the letterbox region 520 is an optimized image for himself or herself. The guide image 810 can also no longer be displayed as shown in FIG. 9C(b).

Figure 9D:
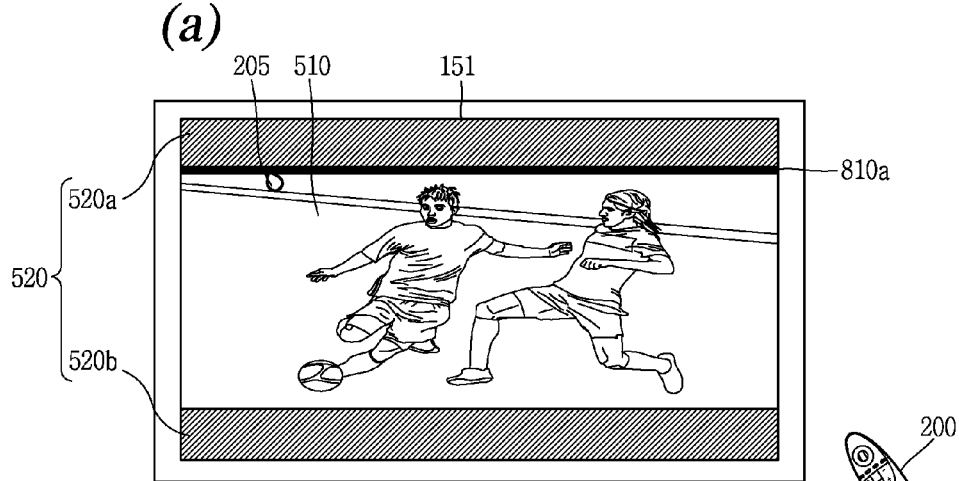
Figure 9D:
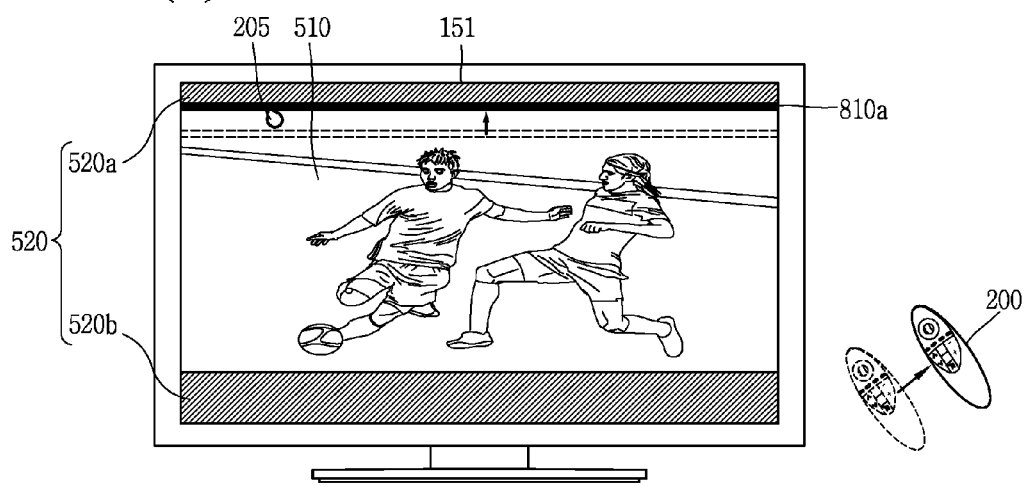
Figure 9D:
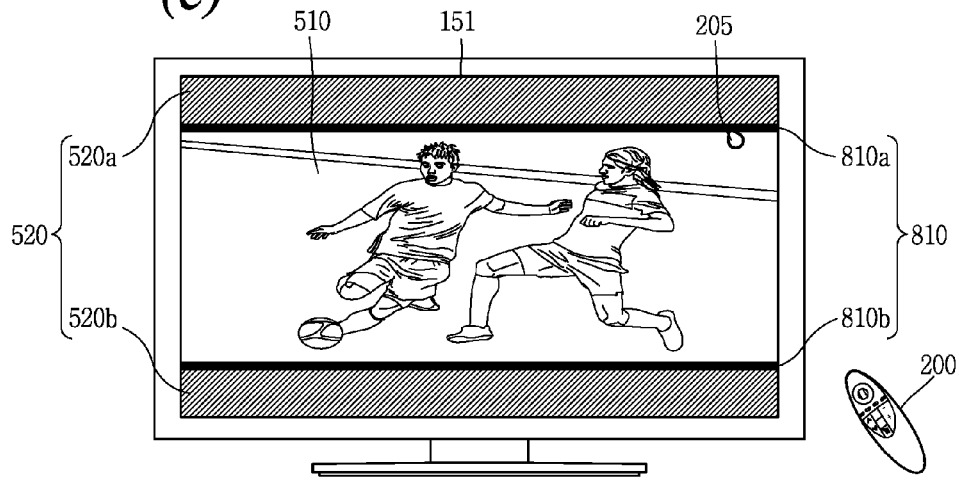

Further, as illustrated in FIG. 9D(a), when the first and the second letterboxes 520a and 520b are contained at both sides of the display unit 151, respectively, and the image display region 510 is contained between the first and the second letterbox 520a, 520b, the controller 180 can adjust either one size of the first and the second letterboxes 520a and 520b or adjust the size of both the first and the second letterboxes 520a and 520b based on the user's selection.

For example, when the pointer image 205 is located at a boundary portion between the first letterbox region 520 and image display region, the controller 180 can display the guide image 810a only at a boundary portion between the first letterbox region 520a and image display region 510. Thus, when the guide image 810a is moved by any one of the foregoing schemes, the controller 180 can change the size of the first letterbox region 520a. At this time, the size of the first letterbox 520a may be maintained as it is.

In other words, when the guide image 810a moves when the guide image 810a is displayed only at either one of both boundary portions between the first and the second letterboxes 520a and 520b and image display region 510, the controller 180 can adjust the size of the letterbox region 510a or 510b corresponding to a position at which the guide image 810a is displayed. In other words, the size of the letterbox region 510b or 510a at a side on which the guide image 810a is not displayed may not be changed even if the guide image 810a moves.

Further, when the guide image is displayed to correspond to only either one of the first and the second letterboxes 520a and 520b as illustrated in FIG. 9D(b), the controller 180 can additionally display a guide image even in a region on which the guide image is not displayed within the first and the second letterboxes 520a and 520b as illustrated in FIG. 9D(c). Thus, when a guide image is displayed in both the first and the second letterbox 520a, 520b, the size of the first and the second letterboxes 520a and 520b can be changed at the same time in response to the movement of the guide image.

Further, the controller 180 can cancel the size adjustment of the letterbox in response to a user's request. For example, when the motion information of the remote control corresponding to a cancel request is received while the guide image is moving in response to the motion of the remote control, the controller 180 can control the display unit 151 to a state prior to adjusting the size of the letterbox region.

More specifically, when the remote control moves a plural number of times above a preset speed, the controller 180 can move the guide image 810 to its original position, or terminate the display of the guide image 810, and display the letterbox region 520 with its original size. Meanwhile, the motion of the remote control corresponding to a cancel request may be set in various ways.

Figure 10A:
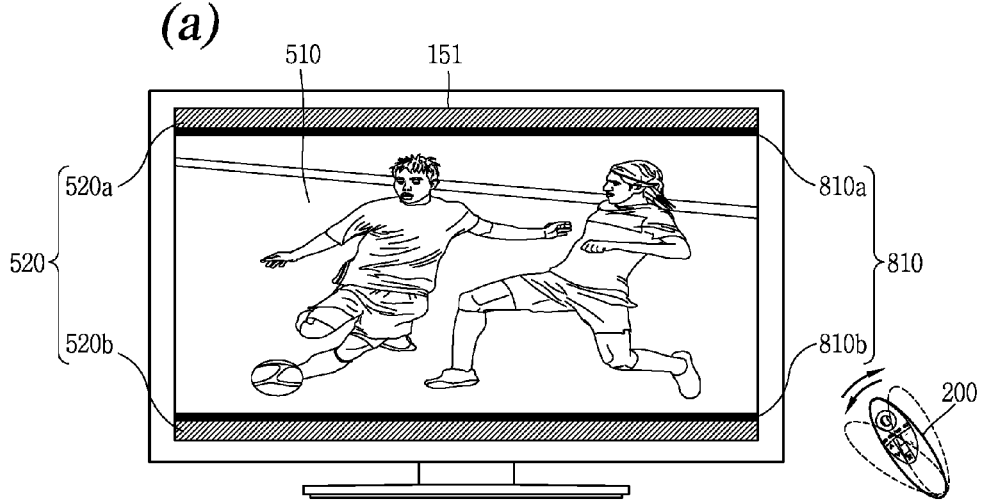
Figure 10A:
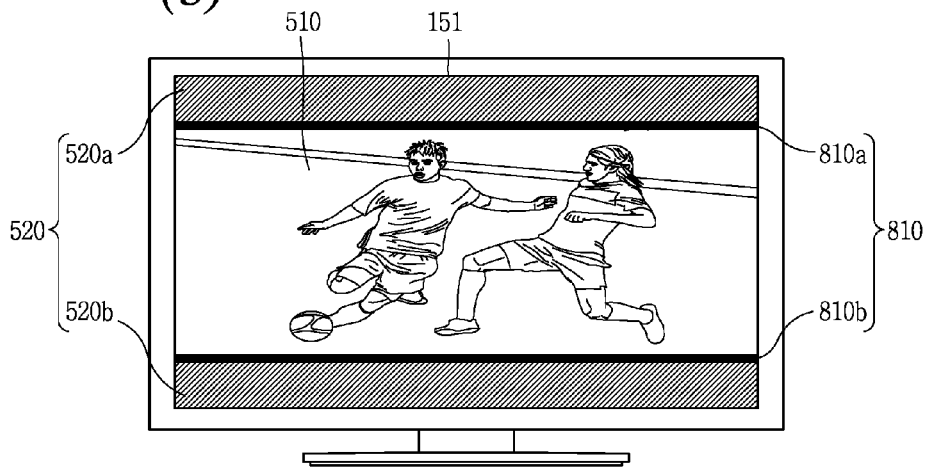
Figure 10A:
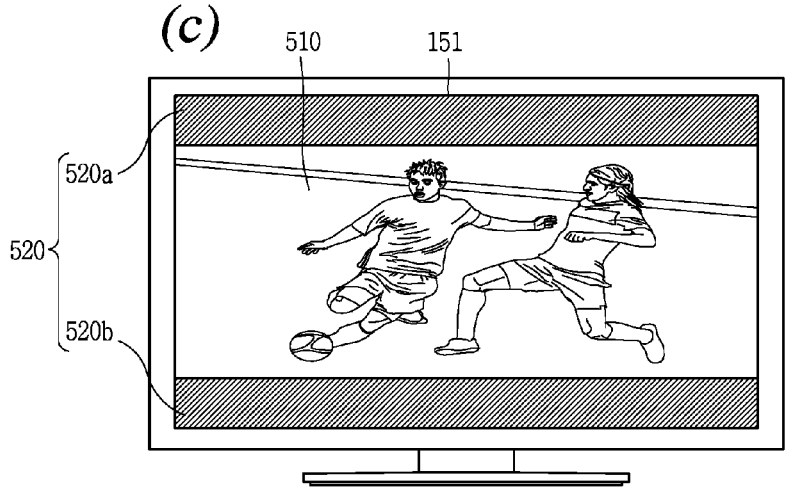

Further, as described above, subsequent to changing or removing the size of the letterbox region, the controller 180 can readjust or redisplay the size of the letterbox region in response to a user's request. For example, as illustrated in FIG. 10A(a), when the pointer image 205 is located in a preset region of the display unit 151 for a preset period of time, the controller 180 can redisplay the guide image 810 on the display unit 151 to readjust the size of the letterbox region. When the motion of the remote control corresponds to a preset movement when the guide image 810 is displayed, the controller 180 can redisplay the letterbox region 520 as illustrated in FIGS. 10A(b) and 10A(c). At this time, the size of the letterbox region 520 can be adjusted to the size of the letterbox region initially contained in the display unit during the reproduction of the image. Here, the motion of the remote control corresponding to a preset movement may be a movement of shaking the remote control above a preset speed.

Figure 10B:
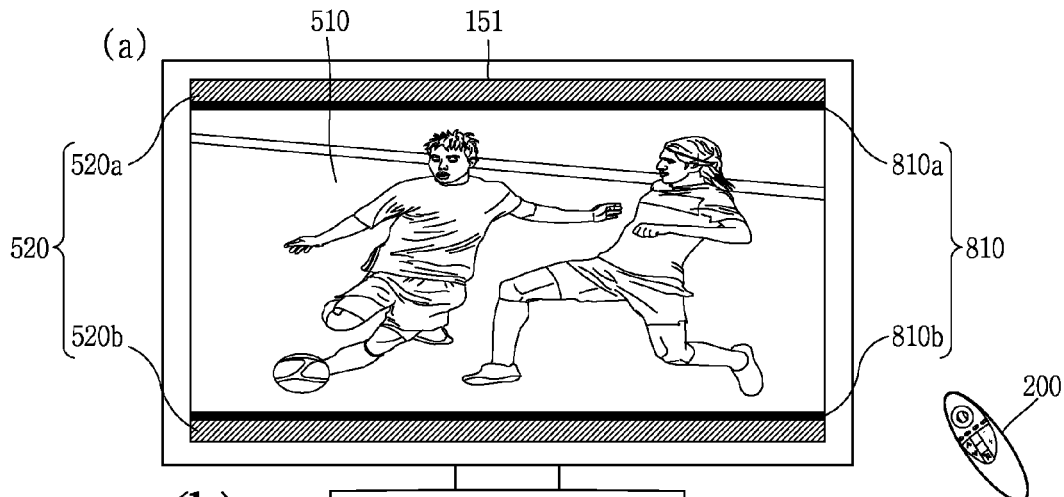
Figure 10B:
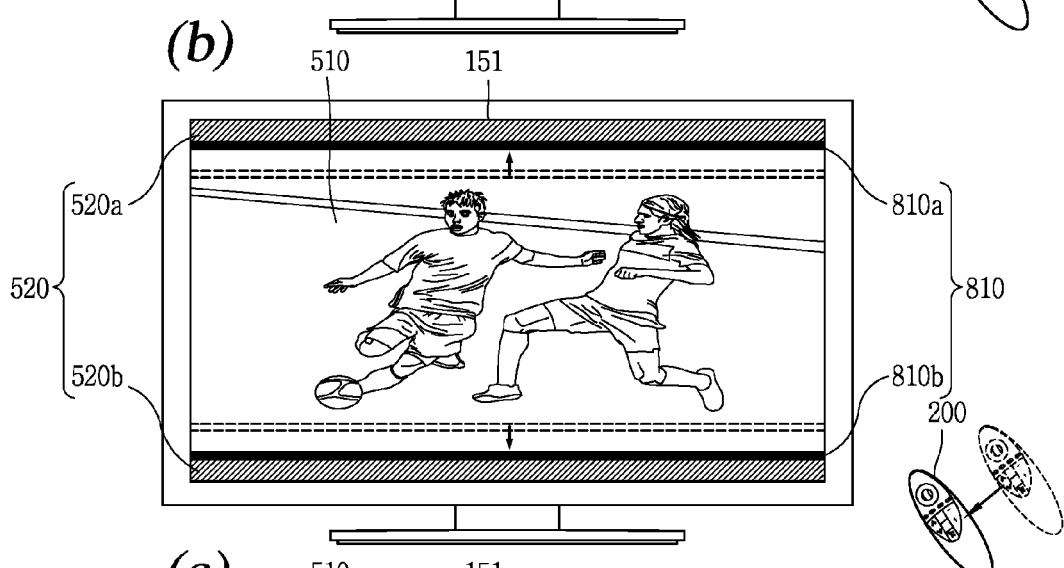
Figure 10B:
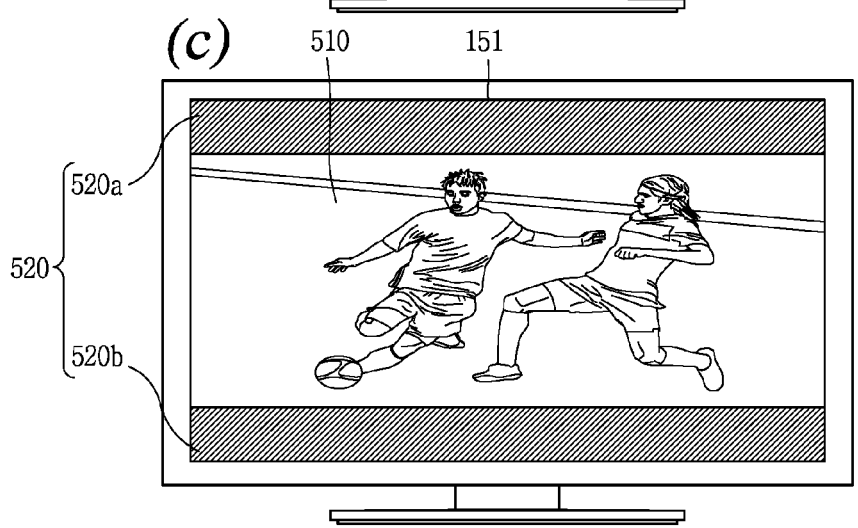

Further, while the guide image 810 is displayed, the controller 180 can display the letterbox region 520 in response to the motion of the remote control regardless of the pointer image 205 being located on the guide image 810. In another example, as illustrated in FIGS. 10B(a) and 10B(b), the guide image 810 may move within the display unit 151 as illustrated in the foregoing method. The controller 180 can change the size of the letterbox region 520, as illustrated in FIGS. 10B(b) and 10B(c), in response to the movement of the guide image 810. The size of the image display region 510 may be also readjusted, and the display ratio of an image that has been displayed in the image display region 510 may be also changed depending on a size change of the letterbox region 520.

Figure 10C:
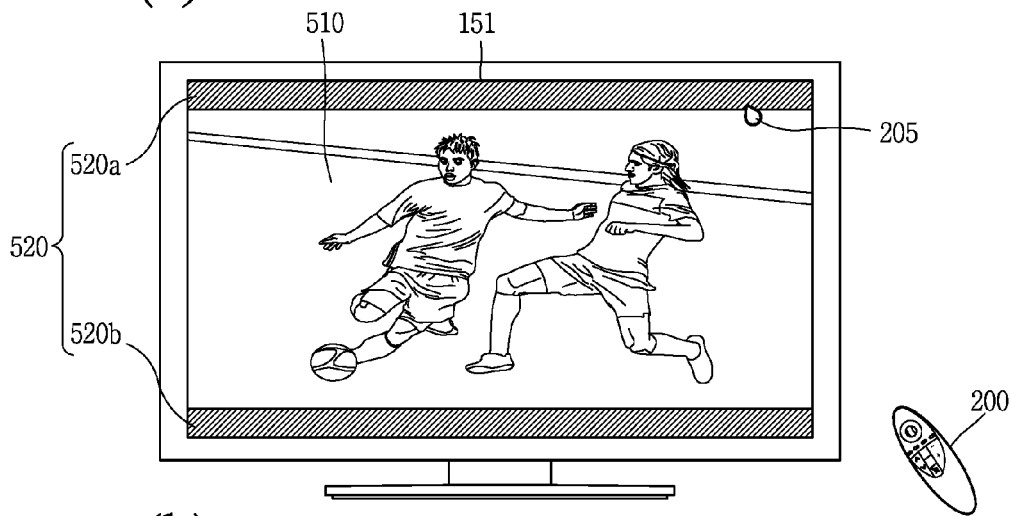
Figure 10C:
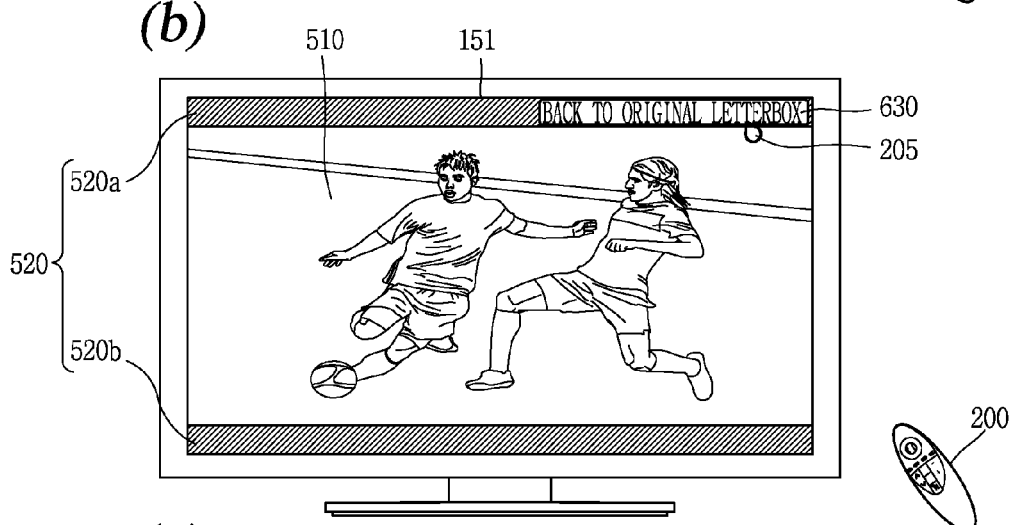
Figure 10C:
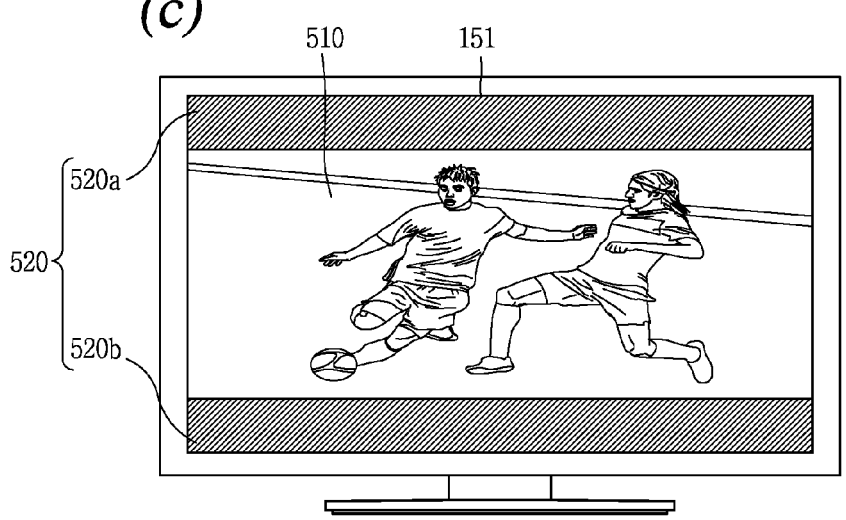

In still another example, as illustrated in FIGS. 10C(a) and 10C(b), the controller 180 can display a graphic object 630 for selecting the display of the letterbox region 520 in one region of the display unit. Furthermore, when the graphic object 630 is selected, the controller 180 can redisplay the letterbox region as illustrated in FIG. 10C(c). Here, the movement of the preview information and the selection of the graphic object 630 may be performed by selecting a specific button of the remote control 200.

Furthermore, when the pointer image 205 is dragged in one direction within a preset region, the controller 180 can redisplay the letterbox region. Here, the drag of the pointer image 205 may be performed through the motion of the remote control 200. The drag through the remote control 200 may be performed when the remote control moves while a specific button of the remote control 200 is selected.

Here, the preset region may be a region in which the letterbox region 520 is displayed, and the direction of the drag may correspond to a direction of pulling down the letterbox region 520 from an end of the display unit 151 to the other end thereof.

In the above, a method of controlling the letterbox region through a remote control has been described. Hereinafter, a method of controlling the letterbox region in response to a user's gesture will be described in more detail with reference to the accompanying drawings. FIGS. 11A-11C, 12A and 12B are conceptual views illustrating a method of controlling a guide image using a user motion.

In an electronic device according to the present invention, a user' motion or user's gesture can be sensed a sensing unit provided in the electronic device 100 itself or sensed through a sensing unit separately provided from the electronic device 100. The sensing unit may include various sensing means such as a camera, an ultraviolet sensor, a motion sensor or the like configured to sense the user's motion or gesture. The sensing unit separately provided from the electronic device 100 may sense the user's gesture to transmit the sensed information to the electronic device 100. Such a communication method between the sensing unit separately provided therein and the electronic device 100 may be the same or similar to that between the remote control 200 and the electronic device 100, and thus the detailed description thereof will be omitted.

A user request for displaying the guide image 810 as described above can be performed based on a user's gesture. In other words, the controller 180 can display a guide image based on a user's gesture. More specifically, the pointer image 205 can be displayed on the display unit 151 based on a user's gesture.

For example, the pointer image 205 can be displayed on the display unit 151 as illustrated in FIG. 11 A(a), and the pointer image 205 can be moved on the display unit 151 based on a user's gesture. Here, the controller 180 can perform control associated with a region indicated by the pointer image 205. A user request for displaying the pointer image 205 may be performed when a preset user's gesture is sensed. For example, the preset user's gesture may be a gesture in which the user raises his or her hand above a preset level.

Figure 11A:
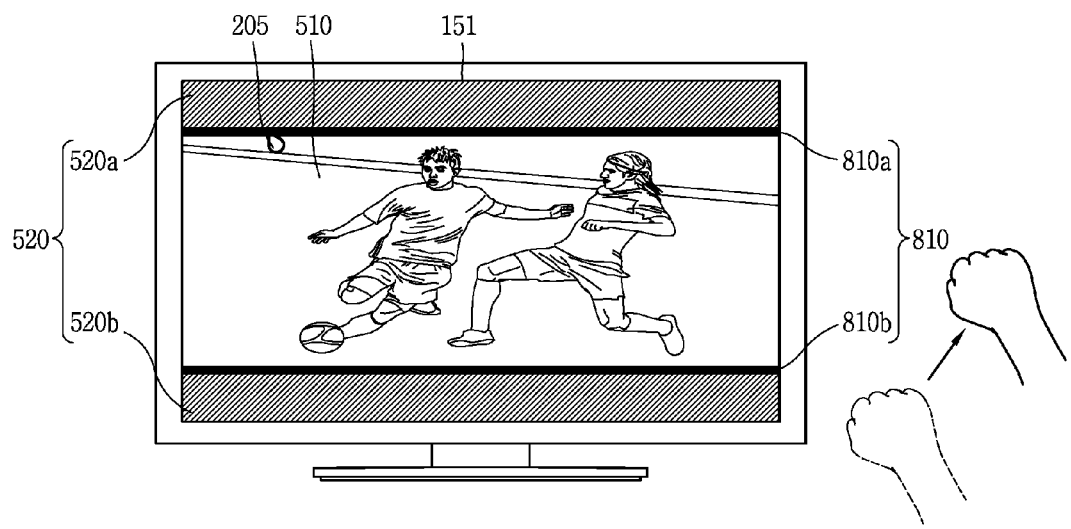
FIGS. 11A-11C, 12A and 12B are conceptual views illustrating a method of controlling a guide image using a user motion.
Figure 11A:
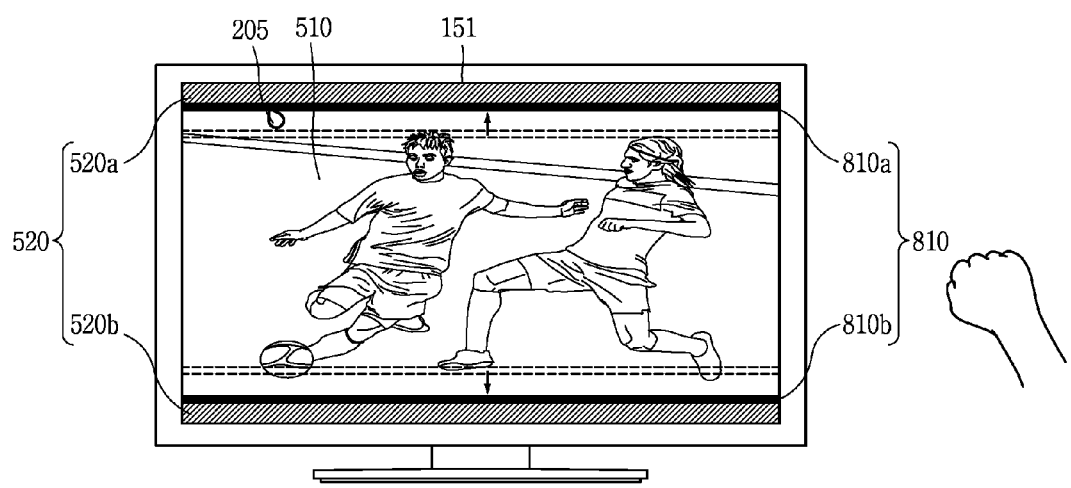

The controller 180 can display the guide image 810 at a boundary portion as illustrated in FIG. 11A(a) in response to the pointer image 205 being located at the boundary portion between the image display region 510 and letterbox region 520 in response to a user gesture as illustrated in FIG. 11 A(a). Furthermore, when there is an additional user gesture in addition to the pointer image 205 located at the boundary portion, the controller 180 can display the guide image 810 at the boundary portion. Here, the additional user gesture may be when the pointer image 205 is located at the boundary portion, and then a user's hand takes a preset motion. For example, when a user's hand with unfolded fingers is folded when the pointer image 205 is located at the boundary portion, the controller 180 can display the guide image 810. Furthermore, when the pointer image 205 is located at the boundary portion for a preset period of time, the controller 180 can display the guide image.

Further, as illustrated in the drawing, when the letterbox regions 520 are contained at both sides of the display unit 151, respectively, the controller 180 displays a first guide image 810a at a boundary portion between a first letterbox 520a and the image display region 510, and displays a second guide image 810b at a boundary portion between a second letterbox 520b and the image display region 510. Thus, when the guide image 810 is displayed on the display unit 151, the user can recognize that the letterbox region 520 is in a controllable state.

Moreover, the guide image 810 moves within the display unit 151 in response to a user's moving direction as illustrated in FIGS. 11A(a) and 11A(b). When the user's hand moves in one direction, the guide image 810 moves on the display unit 151 to correspond to said one direction.

In another example, the controller 180 can move the guide image 810 only when there is a user's motion for moving the guide image 810 and the guide image 810 is selected by the pointer image 205. Here, when the guide image 810 is selected by the pointer image 205 includes when a user's gesture, for example, moving the pointer image 205 onto the guide image 810 while the pointer image 205 is located in one region on the guide image 810 and when his or her fingers are unfolded, and then folding the user's fingers, the controller 180 can determine that as the selection of the guide image 810. Thus, when a user's gesture is sensed when the guide image 810 is selected, the controller 180 can move the guide image in response to such a gesture. The guide image can move within the display unit 151 along a user's gesture as illustrated in FIGS. 11A(a) and 11A(b).

Figure 11B:
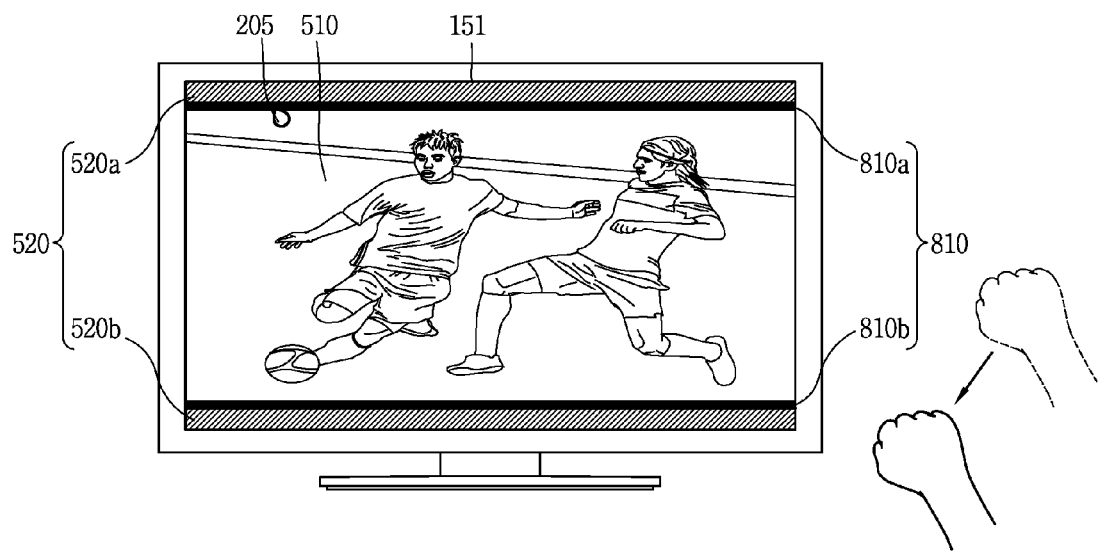
Figure 11B:
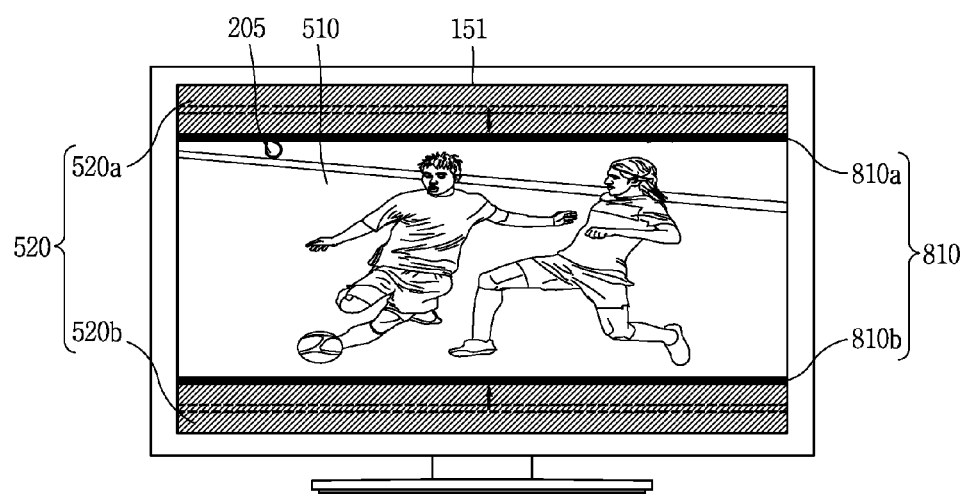

More specifically, the first and the second guide images 810a and 810b can move away from or closer to each other in response to the user's gesture. FIGS. 11A(a) and 11A(b) illustrate that the first and the second guide images 810a and 810b are far away from each other. Furthermore, FIGS. 11B(a) and 11B(b) illustrate that the first and the second guide images 810a and 810b are closer to each other in response to the user's gesture. Thus, the size of the letterbox region is reduced when the guide images are far away from each other, and the size of the letterbox region is enlarged when the guide images are closer to each other In other words, the controller 180 determines the size of the image display region 510 and letterbox region 520 based on a region in which the guide image 810 has moved. For example, when the guide image 810 moves toward both ends of the display unit as illustrated in FIGS. 11A(a) and 11A(b), the size of the image display region 510 is enlarged. Furthermore, when the guide image 810 moves away from both ends of the display unit as illustrated in FIGS. 11B(a) and 11B(b), the size of the image display region 510 is reduced. When the size of the image display region 510 is enlarged, an image displayed in the image display region 510 is displayed in an enlarged manner in proportion to the enlargement of the image display region or displayed in a reduced manner in proportion to the reduction of the image display region.

When the size adjustment of the letterbox region 520 is completed through the movement of the guide image 810, the controller 180 can adjust the size of the letterbox region 520 and the size of the image display region 510 as illustrated in FIG. 9B(*b*) in response to the extent of moving the guide image 810.

When the guide image 810 moves to an end of the display region of the display unit 151, the controller 180 can allow only the image display region 510 to remain, and remove the letterbox region 520 as illustrated in FIG. 9B(*c*). Here, a full image can be displayed in the display region on the display unit 151. Furthermore, when a moving distance of the guide image 810 is above a preset distance, the controller 180 can allow only the image display region 510 to remain, and remove the letterbox region 520.

Furthermore, the moving speed of the guide image 810 is proportional to the movement speed of the remote control, and the controller 180 can allow only the image display region 510 to remain, and remove the letterbox region 520 when the movement speed of the remote control is above a preset speed.

When the size adjustment of the image display region 510 and letterbox region 520 is completed, the display of the guide image 810 on the display unit 151 may be terminated. A complete request for the size adjustment of the image display region 510 and letterbox region 520 can be performed by a user's gesture. The user can take a preset gesture to apply a size adjustment complete request.

In addition, the size adjustment complete request may be performed in a similar manner to the guide image move request, and for example, when a user's movement speed is above a preset speed, the controller 180 can remove the letterbox region 520 to complete the size adjustment of the letterbox region.

Further, the controller 180 can cancel the size adjustment of the letterbox in response to a user's request. For example, when a user's gesture corresponding to a cancel request is sensed while the guide image is moving based on a user's gesture as illustrated in FIG. 11C(*a*), the controller 180 can control the display unit 151 to a state prior to adjusting the size of the letterbox region as illustrated in FIGS. 11C(*b*) and 11C(*c*).

Figure 11C:
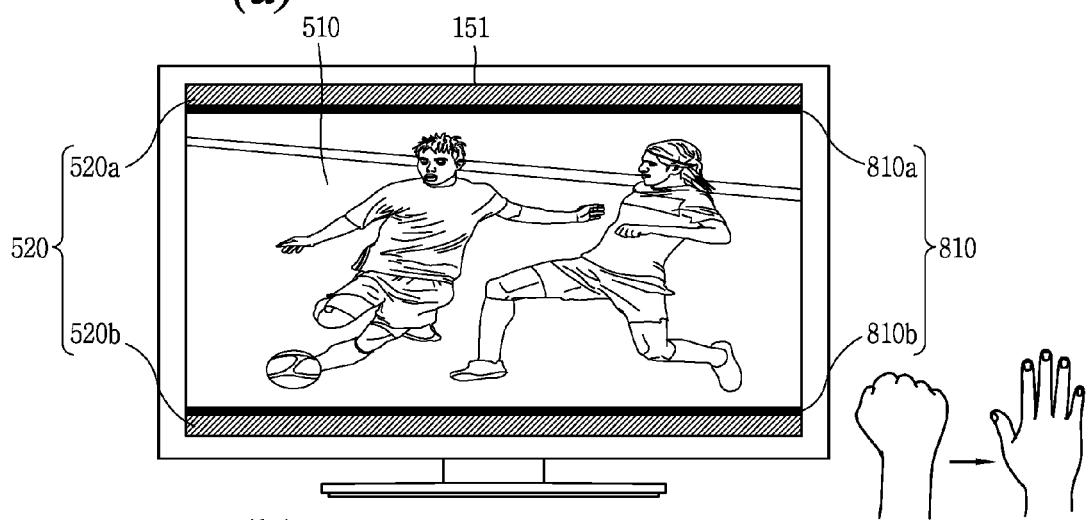
Figure 11C:
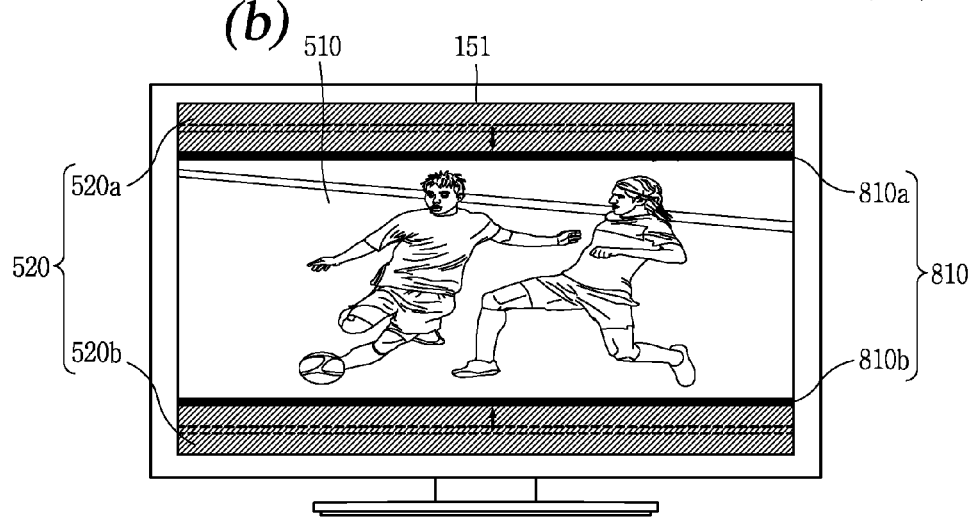
Figure 11C:
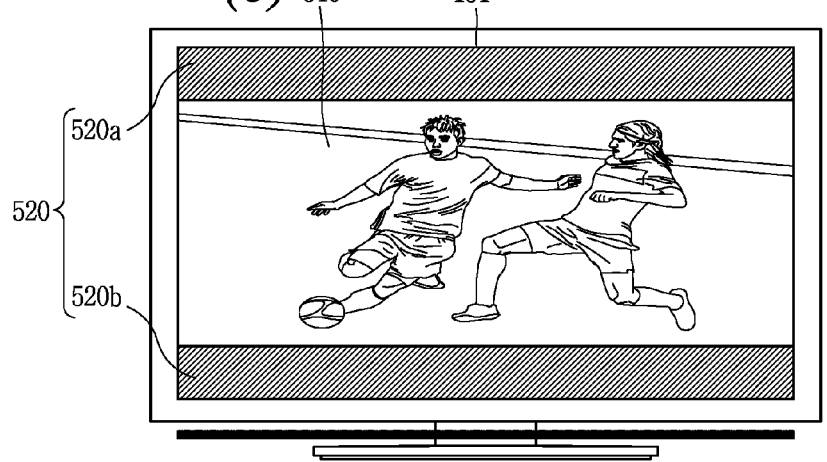

More specifically, when a user unfolds his or her hand while moving the guide image 810 in response to the movement of the user's fisted hand, the controller 180 can move the guide image 810 to its original position as illustrated in FIG. 11 C(*b*), or terminate the display of the guide image 810, and display the letterbox region 520 with its original size as illustrated in FIG. 11C(*c*). Meanwhile, the motion of the remote control corresponding to a cancel request may be set in various ways.

Figure 12A:
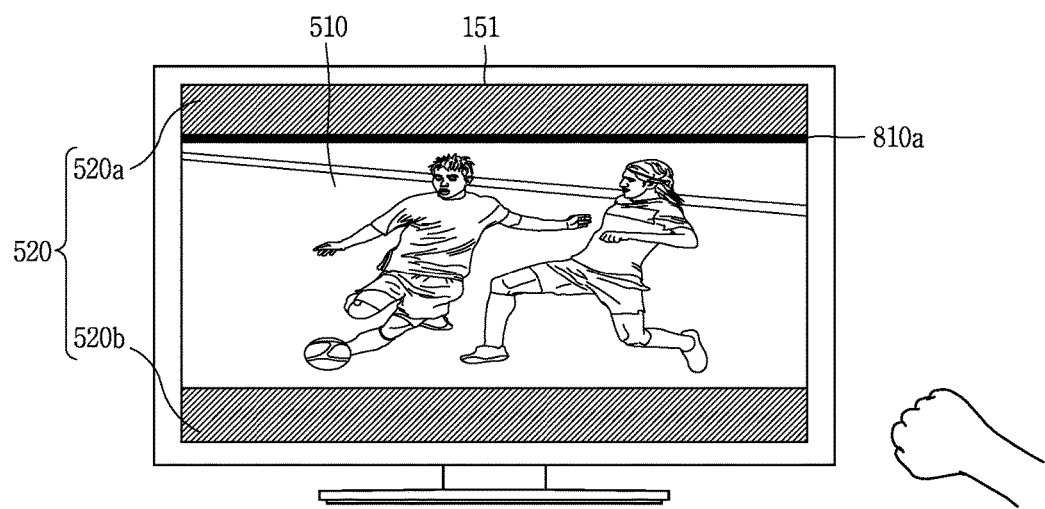
Figure 12A:
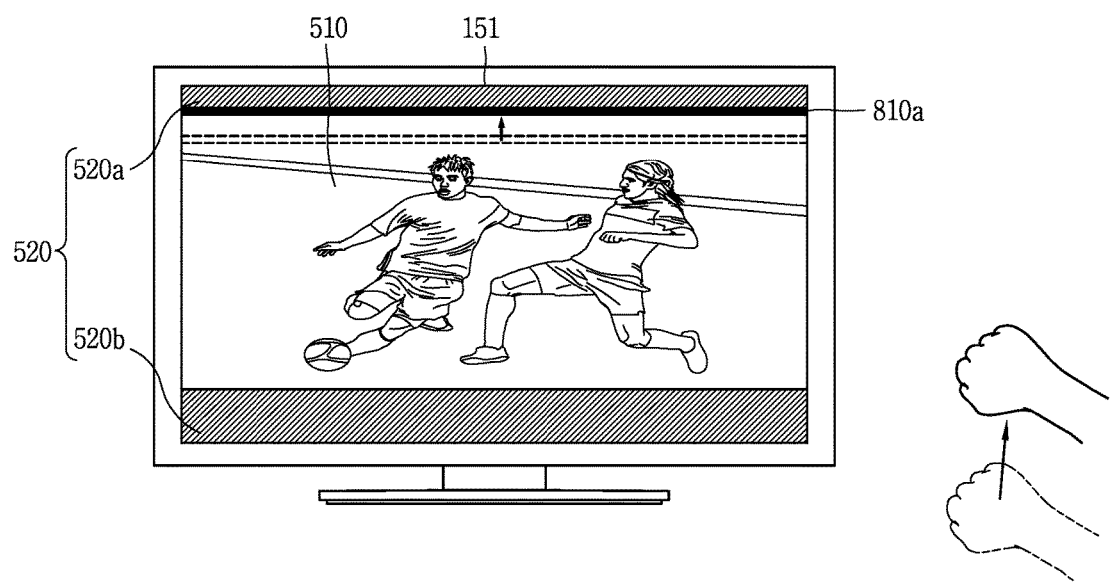

Further, as illustrated in FIG. 12A(*a*) and 12B(*a*), when the first and the second letterboxes 520*a* and 520*b* are contained at both sides of the display unit 151, respectively, and the image display region 510 is contained between the first and the second letterboxes 520*a* and 520*b*, the controller 180 can adjust either one size of the first and the second letterboxes 520*a* and 520*b* or adjust the size of both the first and the second letterboxes 520*a* and 520*b* based on the user's gesture.

For example, when a user's gesture for displaying the guide image is applied, the controller 180 can display the guide image 810*a* only at a boundary portion between the first letterbox 520*a* and image display region 510 or at a boundary portion between the second letterbox 520*b* and image display region 510. Whether to first display the guide image at which boundary portion to the first and the second letterboxes 520*a* and 520*b* can be determined based on default information or according to a location at which the user's gesture is sensed. For example, the guide image can be displayed at a boundary portion to the side of the first letterbox 520*a* when the user's hand is located at the height level of user's eyes, and the guide image may be displayed at a boundary portion to the side of the second letterbox 520*b* when the user's hand is located at the height level of user's chest.

For an example, when the guide image 810*a* is moved by any one of the foregoing schemes based on a user's gesture when the guide image 810*a* is located at a boundary portion between the first letterbox 520*a* and image display region 510, the controller 180 can change the size of the first letterbox 520*a* as illustrated in FIG. 12A(*b*). At this time, the size of the first letterbox 520*a* may be maintained as it is.

In other words, when the guide image 810*a* moves when the guide image 810*a* is displayed only at either one of both boundary portions between the first and the second letterboxes 520*a* and 520*b* and image display region 510, the controller 180 can adjust the size of the letterbox region 510*a* or 510*b* corresponding to a position at which the guide image 810*a* is displayed. In other words, the size of the letterbox region 510*b* or 510*a* at a side on which the guide image 810*a* is not displayed may not be changed even if the guide image 810*a* moves.

Figure 12B:
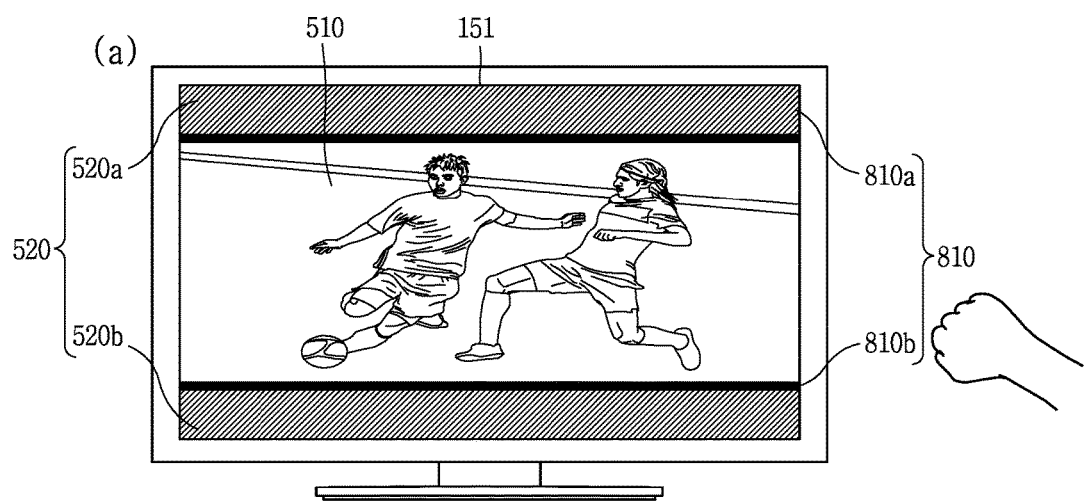
Figure 12B:
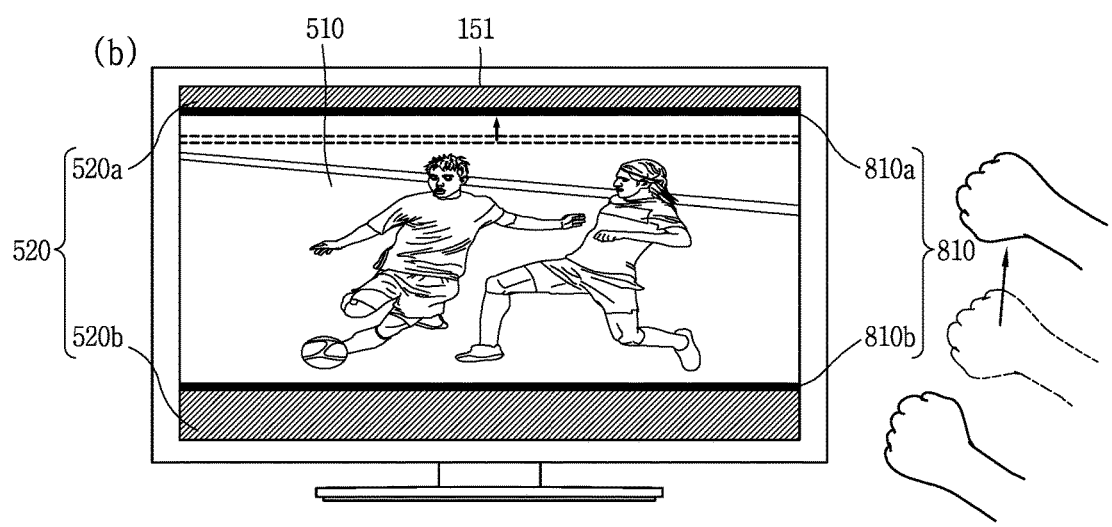

Further, when the guide image is displayed to correspond to only either one of the first and the second letterboxes 520*a* and 520*b* as illustrated in FIG. 12B(*a*), the controller 180 can additionally display a guide image even in a region on which the guide image is not displayed within the first and the second letterboxes 520*a* and 520*b* as illustrated in FIG. 12B(*b*). Thus, when a guide image is displayed in both the first and the second letterboxes 520*a* and 520*b*, the size of the first and the second letterboxes 520*a* and 520*b* can be changed at the same time in response to the movement of the guide image.

In addition, the guide image can be individually controlled in response to a user's gesture. For example, the controller 180 controls the first guide image 810*a* based on a gesture of either one of user's hands, and controls the second guide image 810*b* based on a gesture of the other one of user's hands. When a gesture of either one of user's hands is sensed at a height lower than that of the other one when the first guide image 810*a* is displayed in response to a gesture of the other one of user's hands, the controller 180 can display the second guide image 810*b*.

In addition, the controller 180 can move the first guide image 810*a* in response to the movement of either one hand as illustrated in FIG. 12B(*b*). Furthermore, similarly to that, the controller 180 can move the second guide image 810*b* in response to the movement of the other hand. Thus, the controller 180 can control the first and the second guide images 810*a* and 810*b*, respectively, according to a gesture of the other hand.

Further, as described above, subsequent to changing or removing the size of the letterbox region, the controller 180 can readjust or redisplay the size of the letterbox region in response to a user's request. When the pointer image 205 is located in a preset region of the display unit 151 for a preset period of time in response to a user's gesture, the controller 180 can redisplay the guide image 810 on the display unit 151 to readjust the size of the letterbox region.

When the user's gesture corresponds to a preset movement when the guide image 810 is displayed, the controller 180 can redisplay the letterbox region 520. In addition, the size of the letterbox region 520 can be adjusted to the size of the letterbox region initially contained in the display unit 151 during the reproduction of the image or adjusted to a size corresponding to the extent of moving the guide image.

Further, the size of the image display region 510 can be also readjusted, and the display ratio of an image that has been displayed in the image display region 510 can be also changed depending on a size change of the letterbox region 520. In still another example, the controller 180 can display a graphic object 630 for selecting the display of the letterbox region 520 in one region of the display unit. Furthermore, when the graphic object 630 is selected, the controller 180 can redisplay the letterbox region.

Here, the movement of the preview information and the selection of the graphic object 630 may be performed by a user's gesture. Furthermore, when the pointer image 205 is dragged by a user's gesture in one direction within a preset region, the controller 180 can redisplay the letterbox region. In addition, the preset region may be a region in which the letterbox region 520 is displayed, and the direction of the drag may correspond to a direction of pulling down the letterbox region 520 from an end of the display unit 151 to the other end thereof.

Hereinafter, a method of displaying guide information associated with an enlarged range of the image display region will be described with reference to FIGS. 13A-13C. As described above, when the size of the letterbox region is reduced or the letterbox region itself is removed, the size of the image display region is enlarged, and moreover, the display size of an image displayed in the image display region is also enlarged. When an image is enlarged as described above, the image may be displayed in a broken or distorted manner. Accordingly, one embodiment of the present invention provides information on the extent capable of enlarging the size of the image display region, thereby preventing the distortion of the image from being generated.

Figure 13A:
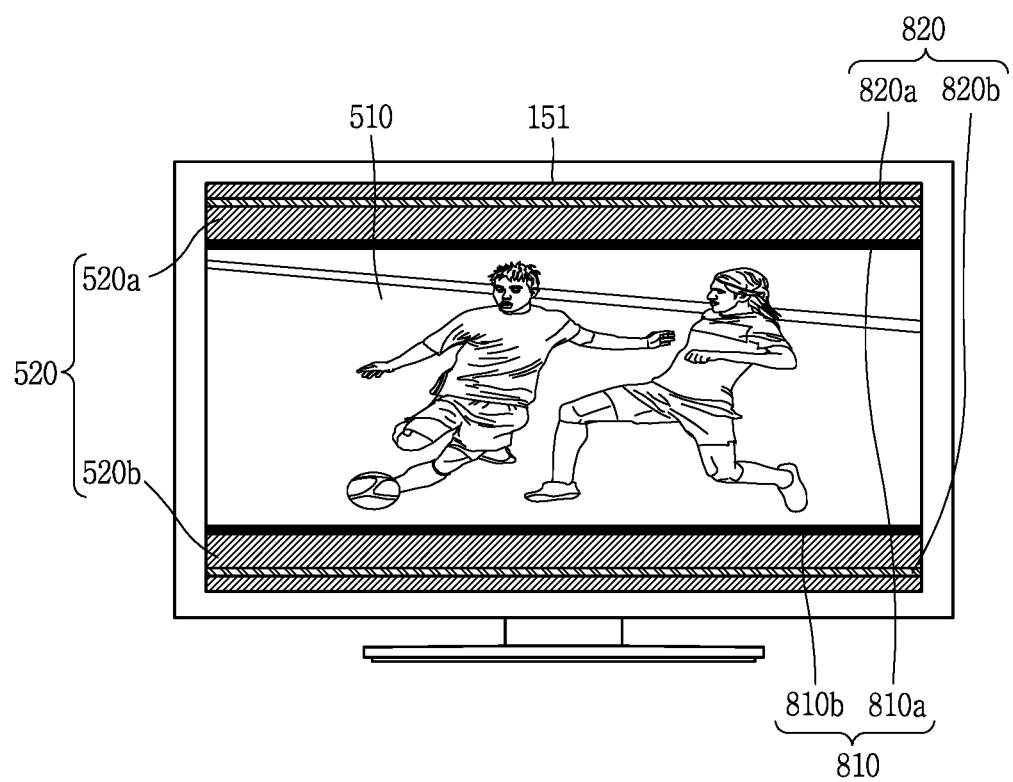
FIGS. 13A-13C are conceptual views illustrating a method of displaying guide information associated with an enlarged range of the image display region.

For example, as illustrated in FIG. 13A, when there is a request associated with the adjustment of the letterbox region 520, the controller 180 can display a notification image 820 for notifying an enlarged range of the image display region 510 in the letterbox region 520 along with the guide image 810. The location of the notification image 820 can be set based on the extent of distorting an image displayed by the enlargement of the image display region 510.

Figure 13B:
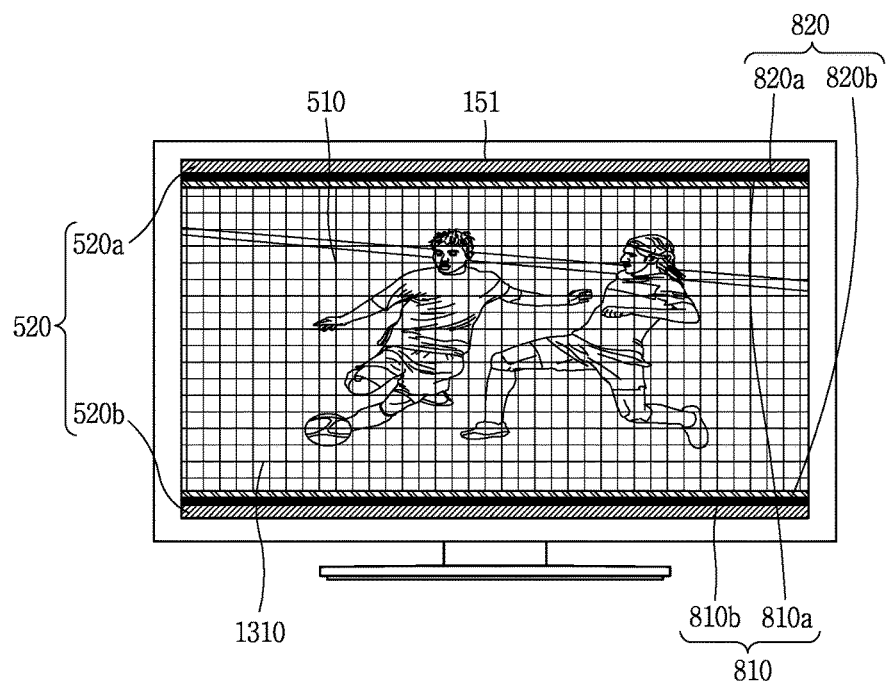
Figure 13B:
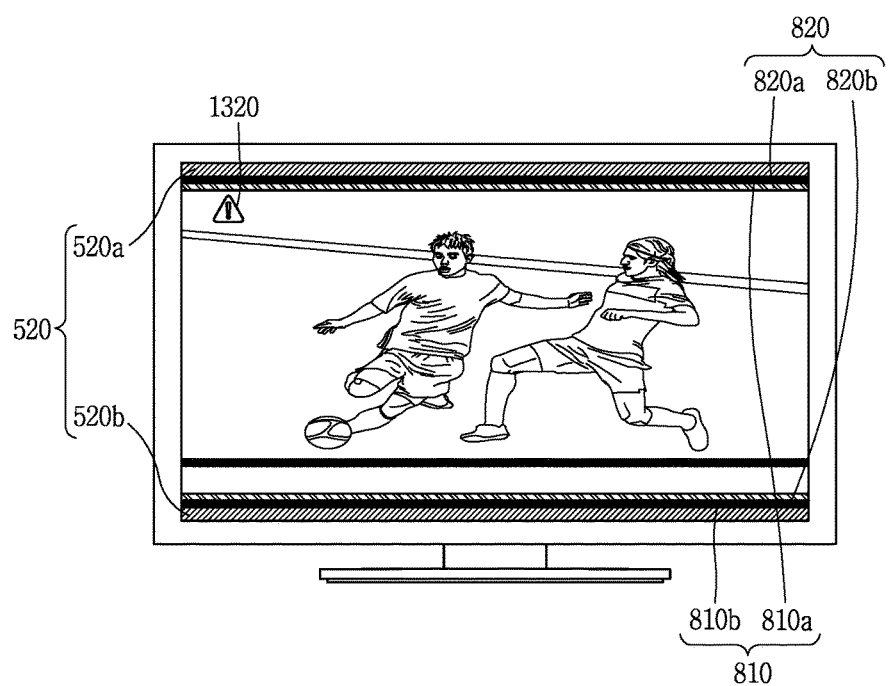
Figure 13C:
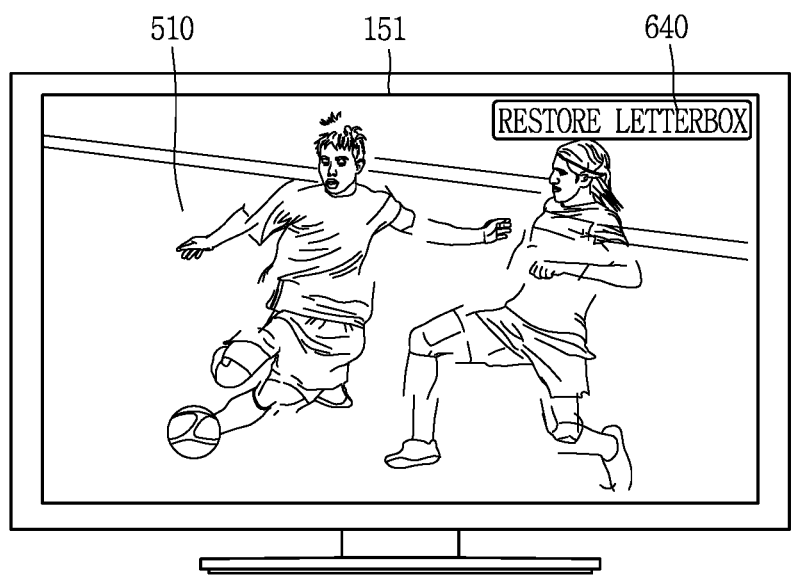

When the size of the letterbox region 520 is reduced beyond a region located with the notification image 820, an image displayed in the image display region 510 may be distorted as illustrated in FIG. 13C. Further, when the guide image 810 moves to a region beyond the notification image 820 based on a user's request, the controller 180 can display warning information as illustrated in FIGS. 13B(a) and 13B(b).

More specifically, the controller 180 can display a warning image 1310 to be overlapped with the display unit 151 as a whole as illustrated in FIG. 13B(a), or display a warning image 1320 in one region of the display unit 151 as illustrated in FIG. 13B(b). Through this warning image, the user can recognize that the image is displayed in a distorted manner. Meanwhile, the controller 180 can display text information to notify that an output image may be displayed in a distorted manner when the letterbox region 520 is reduced above a preset level.

Further, when the letterbox region 520 is adjusted above a preset level in spite of the warning information, and the image is displayed in a distorted manner as illustrated in FIG. 13C, the controller 180 can display a graphic object 640 for selecting the redisplay of the letterbox in one region of the display unit 151. When the graphic object 640 is selected through the remote control or user's gesture, the controller 180 can redisplay the letterbox region 520 in the original size or adjust the size of the letterbox region 520 within a non-distorted range of the image.

Further, when the image of the graphic object 640 is distorted due to the adjustment of the letterbox region, the graphic object 640 can be continuously displayed on the display unit 151 or displayed for a preset period of time and then disappear. Moreover, as illustrated in FIG. 13C, when an image is displayed in a distorted manner, motion information corresponding to a preset motion of the remote control is received or a user's gesture is sensed, the controller 180 can redisplay the letterbox region 520 in the original size or adjust the size of the letterbox region 520 within a non-distorted range of the image.

Hereinafter, a method of displaying subtitles in conjunction with the control of the letterbox region will be described in more detail with reference to the accompanying drawings. FIGS. 14A, 14B, 15A, 15B, 16A-16C, 17A and 17B are conceptual views illustrating a method of controlling subtitles in association with a change of the letterbox region. When subtitles are displayed along with an image being reproduced, an electronic device according to an embodiment of the present invention can perform control over subtitles in response to a change of the letterbox region.

Figure 14A:
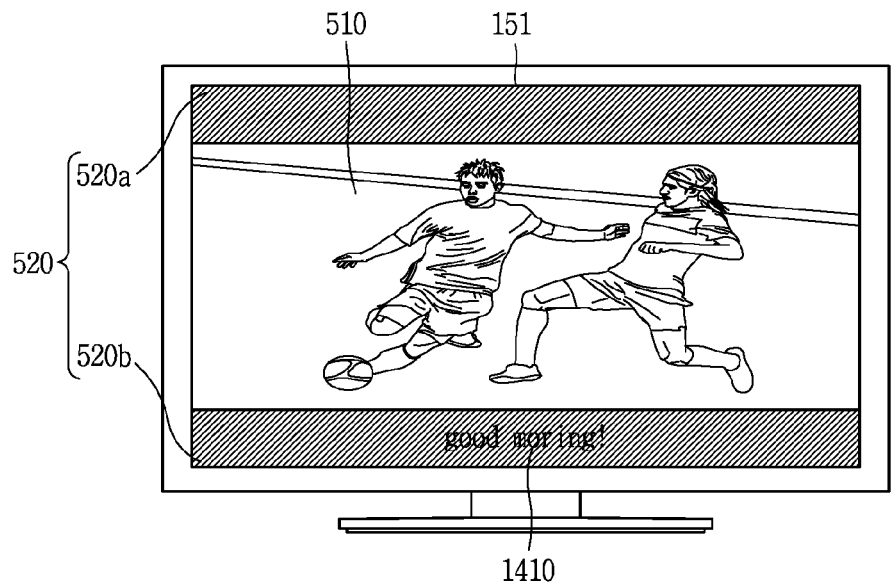
FIGS. 14A, 14B, 15A, 15B, 16A-16C, 17A and 17B are conceptual views illustrating a method of controlling subtitles in association with a change of the letterbox region.
Figure 14A:
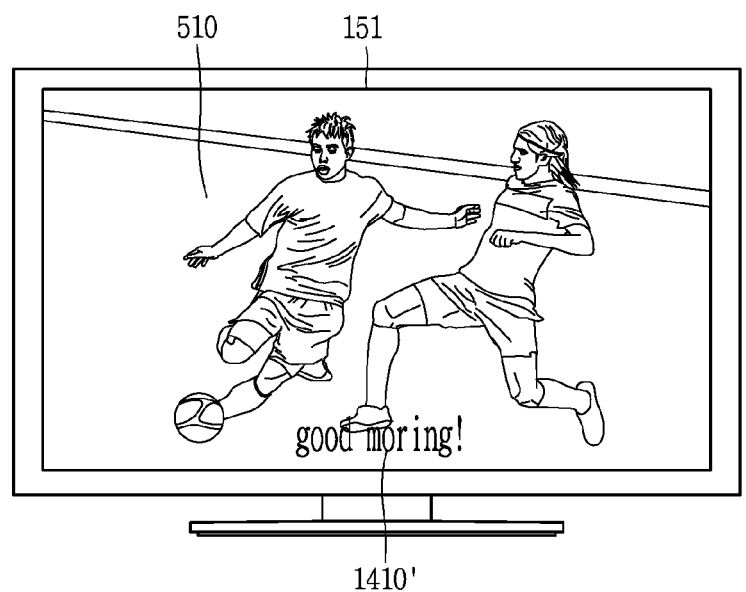
Figure 14B:
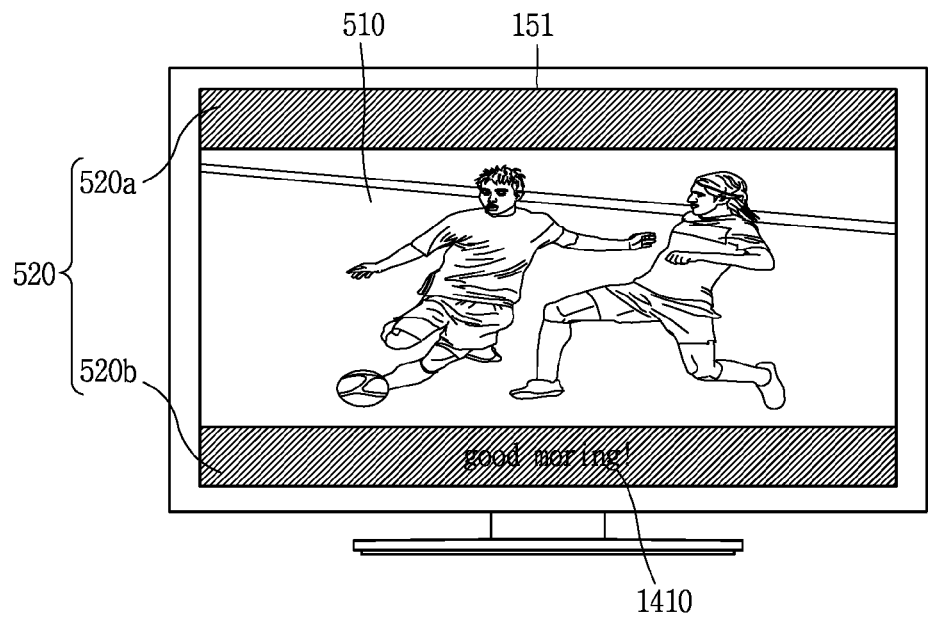
Figure 14B:
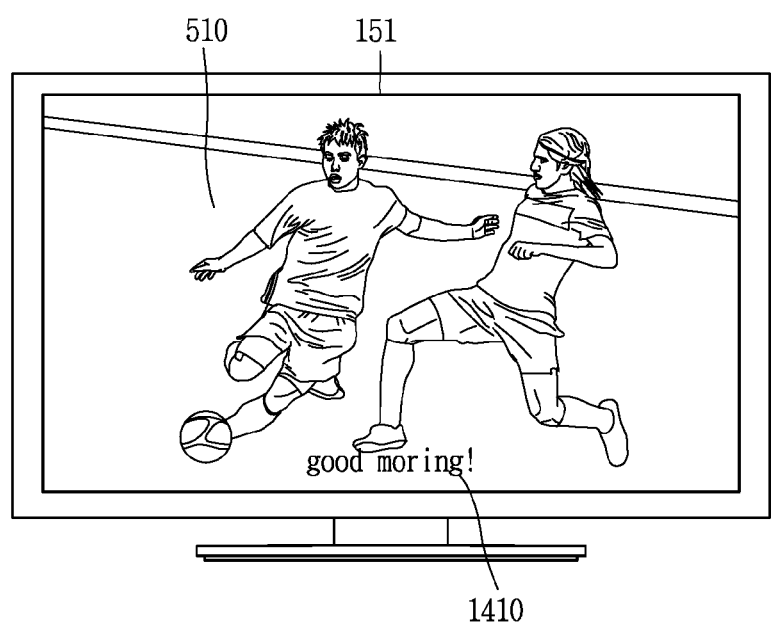

Further, subtitles displayed along with the image can be divided into being separated from the image and being non-separated from the image, and in being non-separated, the letterbox region 520 can be removed as illustrated in FIGS. 14A(a) and 14A(b) or enlarged in response to a change of the size as described above. In other words, the display size of subtitles 1410 and 1410' can be displayed in an enlarged or reduced manner in conjunction with the enlargement or reduction of the size of the image display region 510.

Further, when subtitles can be separately controlled from the image, namely, when subtitles are separated from the image, the controller 180 can maintain the display size or display ratio of subtitles to be the same as that prior to changing the letterbox region 520 even when the letterbox region 520 is removed or the size thereof is changed as illustrated in FIGS. 14A(a) and 14A(b).

Further, the controller 180 can separate subtitles from the image through the process of separating subtitles from the image. Thus, even when the size of the image display region 510 is changed, the display size or display ratio of subtitles can be maintained the same as that prior to changing the image display region 510. For example, when an image containing subtitles is received, the controller 180 can compare subtitle region data calculated based on the received frame in an image processing block for a predetermined number of frames to separate subtitles therefrom, and shift the separated subtitles to the image, thereby fully removing the letterbox region.

Further, there are various schemes for separating subtitles from an image, and in an electronic device according to an embodiment of the present invention, at least one of the various schemes for separating subtitles may be applied thereto, thereby separating subtitles from the image.

Figure 15A:
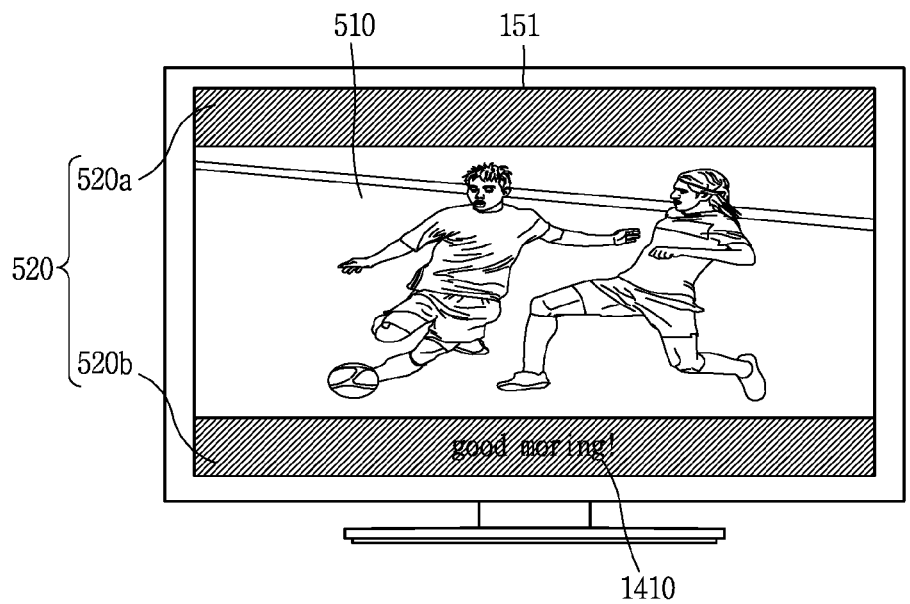
Figure 15A:
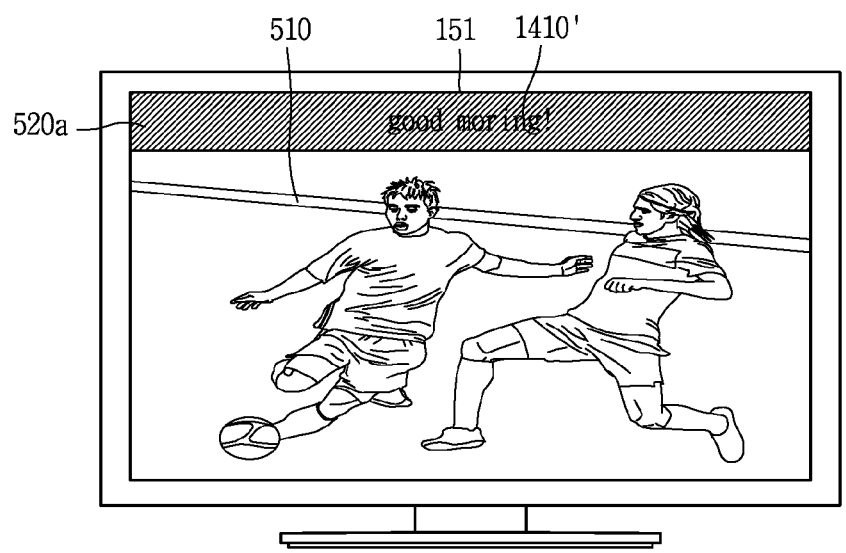

Further, when subtitles can be separated from an image, the controller 180 can change the display scheme, display location or the like of the image in association with the control of the letterbox region 520. For example, when the second letterbox 520b can be removed based on a user's request as illustrated in FIG. 15A(b) while a subtitle 1410 is displayed in the second letterbox 520b as illustrated in FIG. 15A(a), the controller 180 can display the subtitle that has been displayed in the second letterbox 520*b* on the first letterbox 520*a*. In this instance, even when the second letterbox 520*b* is removed, the subtitle 1410' may be displayed on the first letterbox region 520*a*, thereby maintaining the visibility of the subtitle.

Further, due to the removal of the letterbox region, a change of the subtitle display location may be automatically performed by the controller 180 or performed based on a user's request. A user's request associated with a change of the subtitle display location may be performed by a control signal received from the remote control or performed by a user gesture sensed through the sensing unit as described above.

Figure 15B:
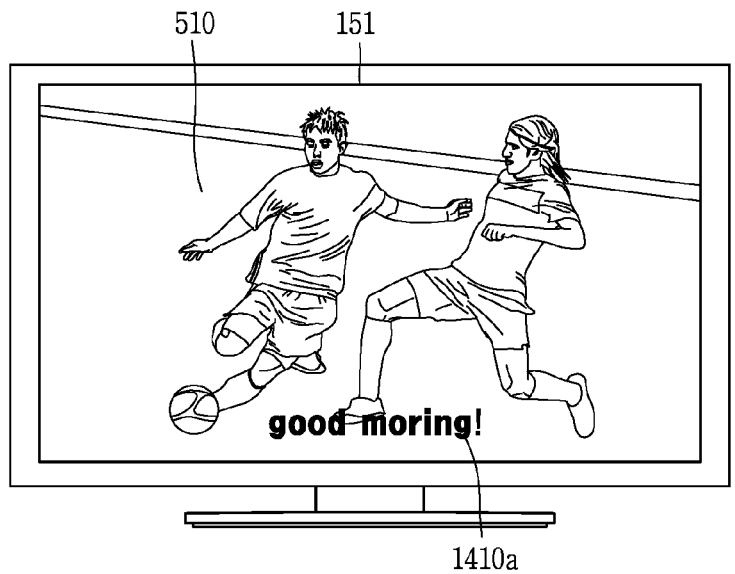
Figure 15B:
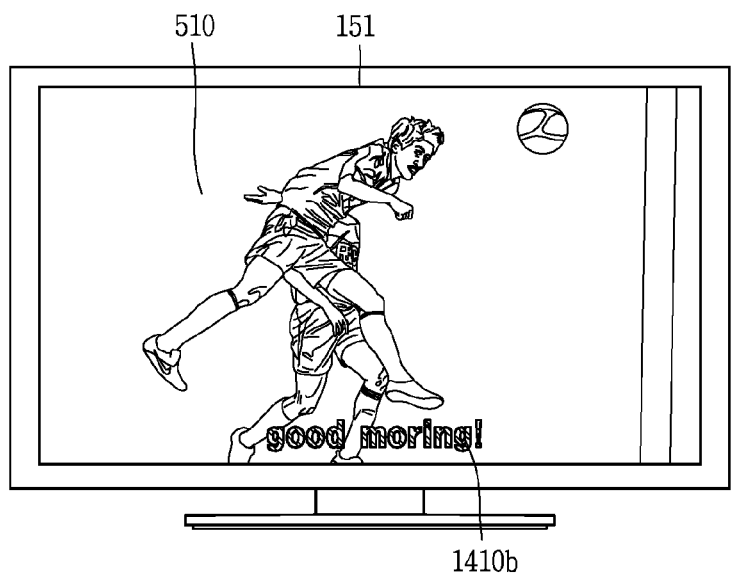

In another example, when the letterbox region 520 is removed, the controller 180 can change a subtitle display scheme to secure the visibility of subtitles as illustrated in FIGS. 15B(*a*) and 15B(*b*). The controller 180 can change the color of the subtitles 1410*a* and 1410*b* with a color contrast to the color constituting an image currently being displayed or change the display size, font weight or the like of the subtitle as illustrated in FIGS. 15B(*a*) and 15B(*b*), thereby securing the visibility of the subtitle.

Figure 16A:
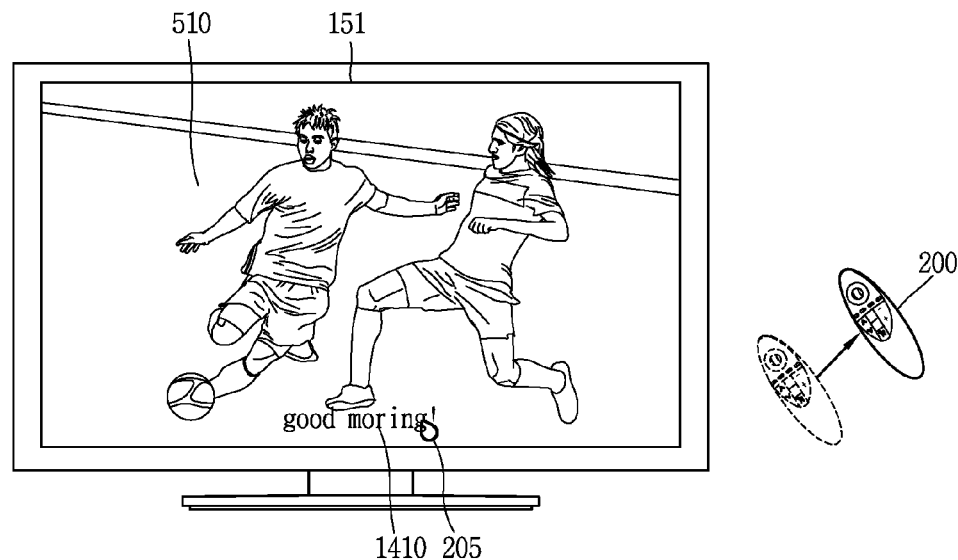
Figure 16A:
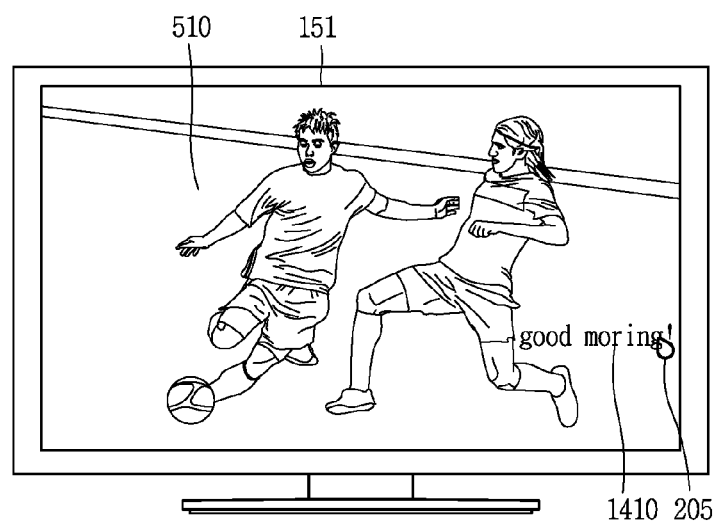

Further, in an electronic device according to an embodiment of the present invention, the controller 180 can change the display location of the subtitle as illustrated in FIGS. 16A(*a*) and 16A(*b*). The subtitle 1410 may be dragged based on a control signal received from the remote control 200 or dragged based on a user's gesture. The drag of the subtitle 1410 through a control signal received from the remote control 200 may be performed in response to the movement of the remote control subsequent to locating the pointer image 205 at the subtitle 1410 and then selecting a specific button on the remote control.

Figure 16B:
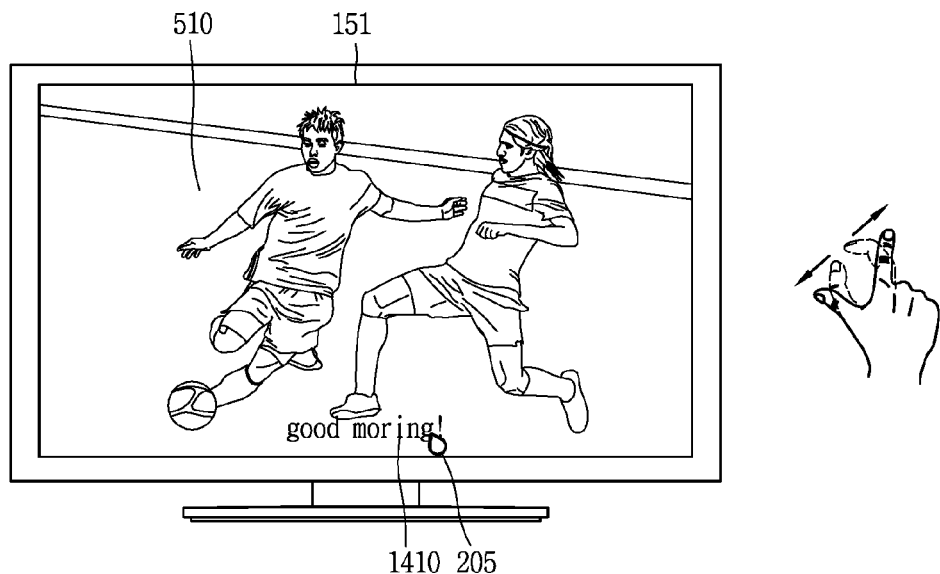
Figure 16B:
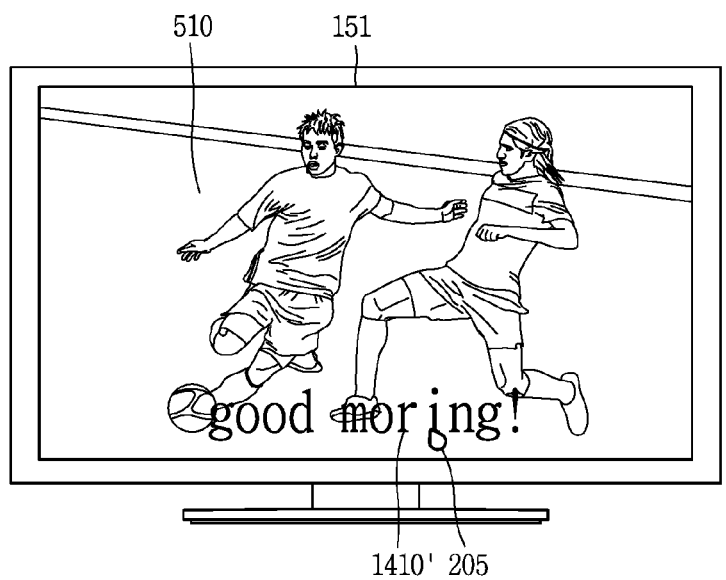

Further, when the subtitle 1410 is moved to a preset region as illustrated in FIG. 16B(*a*), the controller 180 can display the letterbox region 520 in the preset region as illustrated in FIG. 16B(*b*). Here, the preset region may be a region in which the letterbox region 520 has existed prior to removing the letterbox region 520. Furthermore, when the subtitle 1410 is moved to a preset region, the controller 180 can display guide information for asking whether or not to redisplay the letterbox region 520 in the preset region. Furthermore, when there is a user request for displaying the letterbox region 520 from the user, the controller 180 can display the letterbox region 520 as illustrated in FIG. 16B(*b*). Meanwhile, here, the user request may be received from the remote control or user gesture.

Figure 16C:
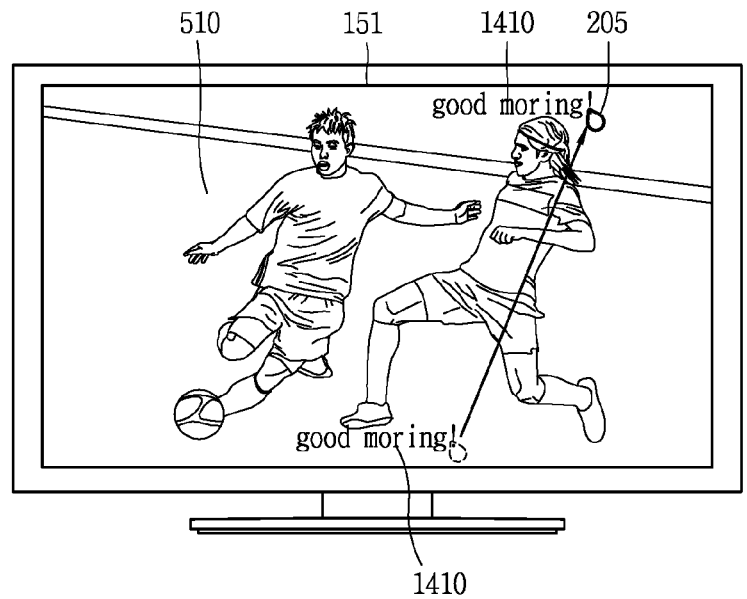
Figure 16C:
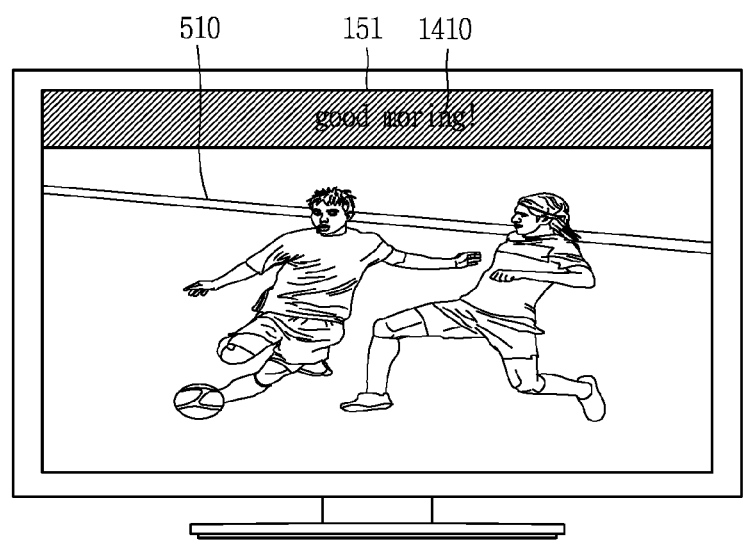

In another example, as illustrated in FIGS. 16C(*a*) and 16C(*b*), the controller 180 can change the display size of a subtitle based on a control signal received from a user's gesture or a control signal received from the remote control. For example, the user's gesture may correspond to a pinch-out gesture. Meanwhile, when the user gesture is sensed when the pointer image 205 is located at the subtitle 1410, the controller 180 can control the display size of the subtitle.

In still another example, when the motion of the remote control 200 is performed when the pointer image 205 is located on the subtitle 1410, the controller 180 can control the display size of the subtitle. Here, the motion of the remote control 200 may be a motion moving the remote control in a forward or backward direction to the electronic device. The controller 180 can enlarge the display size of the subtitle when the remote control 200 moves toward the electronic device, and reduce the display size of the subtitle when the remote control 200 moves backward to be far away from the electronic device.

Figure 17A:
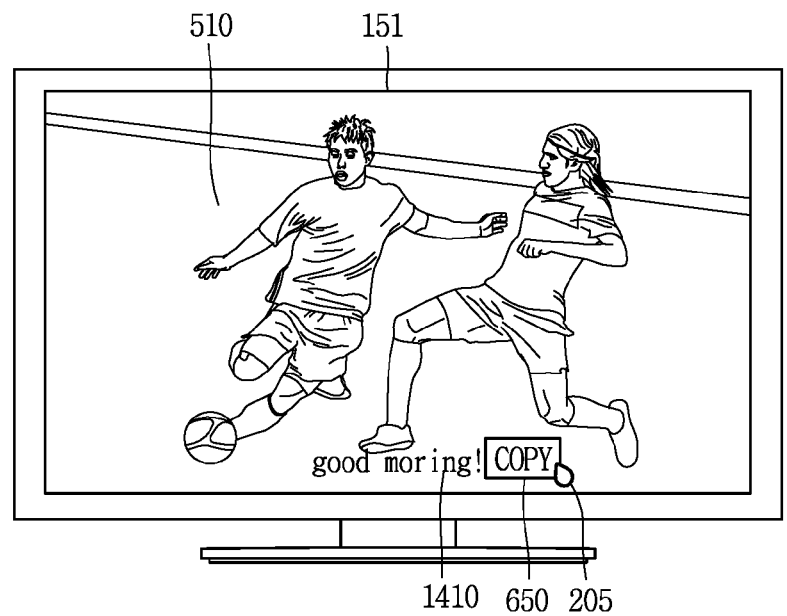
Figure 17A:
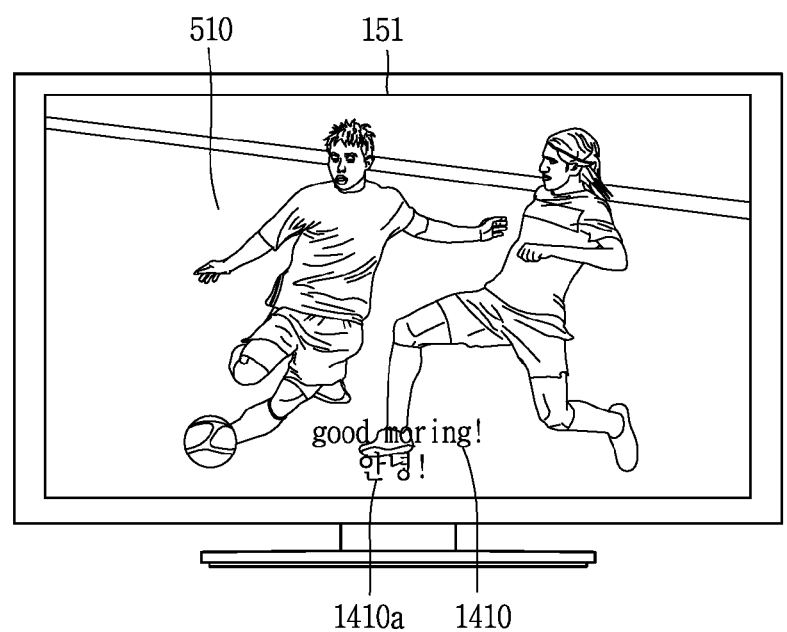
Figure 17B:
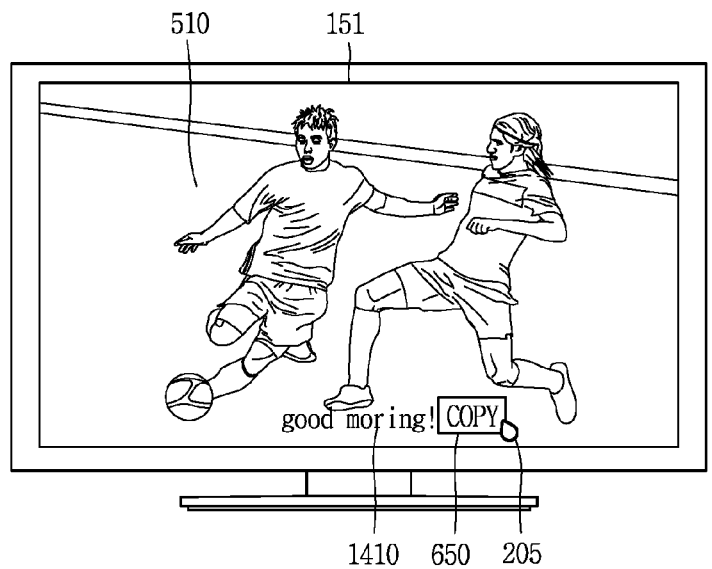
Figure 17B:
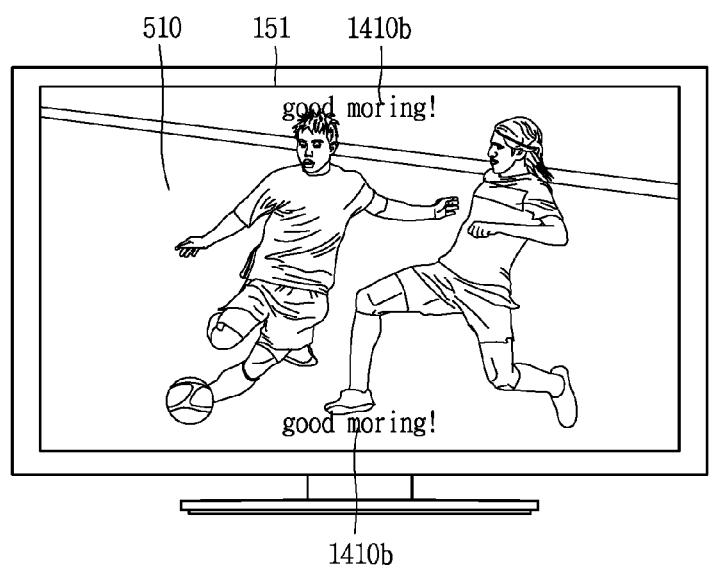

Further, an electronic device according to the present invention may perform a subtitle copy function to display a currently displayed subtitle in a redundant manner as illustrated in FIGS. 17A(*a*) and 17A(*b*). A request for the subtitle copy function may be performed in various ways, and for example, an icon 650 associated with copying a subtitle may be displayed when a specific button of the remote control is selected when the pointer image 205 is located on the subtitle, and a subtitle copy function request can be performed when the icon 650 is selected through the remote control.

When the subtitle copy function is performed, the controller 180 can display the redundant subtitles on one image at the same time. Here, the controller 180 can display the redundant subtitles with the same language or display the redundant subtitles with different languages as illustrated in FIG. 17A(*b*). Whether or not to display the redundant subtitles with the same language or display the redundant subtitles with different languages may be determined based on a user's selection.

In another example, when a subtitle copy function is selected, the controller 180 can set the display location of the redundant subtitle 1410*b* to be different from the original display location of the subtitle that has been displayed. Thus, when subtitles are displayed across a plurality of regions, it may be possible to solve inconvenience in which the user should view subtitles while at the same time viewing an image displayed on the display unit of a large-sized TV.

As described above, in an electronic device according to an embodiment of the present invention, the display scheme, display location or the like of subtitles may be controlled in response to a change of the letterbox region, thereby solving a problem that occurs in viewing subtitles due to the removal of the letterbox region.

Furthermore, in an electronic device according to an embodiment of the present invention and a control method thereof, an area in the letterbox region or at a boundary portion between the letterbox region and image display region may be used to remove the letterbox region or control the size of the letterbox region. Accordingly, the user can more intuitively control the letterbox region through applying a control signal, a gesture or the like to the letterbox region even when not entering a menu with a plurality of steps to control the letterbox region.

Furthermore, a user's motion using a remote control device or a user's motion sensed through the sensing unit can be used to adjust the size of the letterbox region or control whether or not to contain the letterbox region. Accordingly, the user can merely make a gesture to control the letterbox region, thereby enhancing convenience.

Moreover, in an electronic device according to the present invention and a control method thereof, the letterbox region may be contained or removed according to a user's request, thereby changing screen information at a portion corresponding to the letterbox region. Accordingly, a change of screen information in the letterbox region may prevent the burning (or screen image retention) problem of OLED.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An electronic device, comprising:
a display; and
a controller capable of:
displaying, via the display, an image being reproduced, a letterbox and a subtitle positioned at the letterbox;
receiving a control signal for removing at least part of the letterbox from the display; and
controlling the display to remove the letterbox from the display and enlarge the image to fill a region at which the letterbox has been displayed in response to the control signal, wherein the subtitle is positioned at the enlarged image though the letterbox is removed from the display.

2. The electronic device of claim 1, wherein the letterbox is displayed when aspect ratio of the image is different from aspect ratio of the display.

3. The electronic device of claim 1, wherein a display size of the subtitle is enlarged in conjunction with the enlargement of the size of the image.

4. The electronic device of claim 1, wherein a display size or display ratio of the subtitle is maintains to be same as that prior to enlarging the image even when the image is enlarged.

5. The electronic device of claim 1, wherein the controller controls the display to change a color of the subtitle with a color contrast to a color constituting the image currently being displayed on the display.

6. The electronic device of claim 1, wherein a guide image is displayed at between the letterbox and the image, and is moved on the display based on the control signal, and
the image is enlarged along with a movement of the guide image, wherein the control signal comprises information associated with the movement of the guide image.

7. The electronic device of claim 6, wherein the controller controls the display to remove the letterbox when the guide image moves by more than a preset distance based on the control signal.

8. The electronic device of claim 6, wherein a pointer image that moves in response to a motion of a remote control on the display is displayed on the display in a state where that the letterbox and the image are displayed on the display, and
wherein the guide image is displayed when the pointer image is located at a boundary portion between the letterbox and the image above a preset period of time.

9. The electronic device of claim 8, wherein the control signal is received from the remote control,
wherein the guide image is moved on the display according to the motion of the remote control, and
wherein display sizes of the letterbox and the image is changed according to a moving distance of the guide image.

10. The electronic device of claim 1, wherein the letterbox comprises a first letterbox and a second letterbox disposed at both sides of the display, respectively, and
the image is disposed between the first letterbox and the second letterbox disposed at both sides of the display.

* * * * *